(12) United States Patent
Nakamura et al.

(10) Patent No.: US 11,332,381 B2
(45) Date of Patent: May 17, 2022

(54) FUNCTIONAL ELEMENT AND TEMPERATURE SENSOR OF CRYSTAL GRAIN TRITITANIUM PENTOXIDE

(71) Applicant: PANASONIC INTELLECTUAL PROPERTY MANAGEMENT CO., LTD., Osaka (JP)

(72) Inventors: Yoshitaka Nakamura, Osaka (JP); Tsutomu Furuta, Hyogo (JP); Hiroyoshi Yoden, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 750 days.

(21) Appl. No.: 16/329,491

(22) PCT Filed: Aug. 25, 2017

(86) PCT No.: PCT/JP2017/030574
§ 371 (c)(1),
(2) Date: Feb. 28, 2019

(87) PCT Pub. No.: WO2018/043346
PCT Pub. Date: Mar. 8, 2018

(65) Prior Publication Data
US 2019/0185338 A1    Jun. 20, 2019

(30) Foreign Application Priority Data

Sep. 1, 2016  (JP) .............................. JP2016-170756
Sep. 27, 2016 (JP) .............................. JP2016-187923
Oct. 25, 2016 (JP) .............................. JP2016-208521

(51) Int. Cl.
*C01G 23/047*    (2006.01)
*G01K 7/16*      (2006.01)
(Continued)

(52) U.S. Cl.
CPC ............ *C01G 23/047* (2013.01); *B32B 9/041* (2013.01); *C01G 23/04* (2013.01); *C04B 35/46* (2013.01);
(Continued)

(58) Field of Classification Search
CPC ...... C01G 23/047; C01G 23/04; B32B 9/041; B32B 18/00; C04B 35/46; C04B 2235/76;
(Continued)

(56) References Cited

U.S. PATENT DOCUMENTS 3,872,418 A * 3/1975 Plough .................. H01C 7/047
                                                257/467
4,020,443 A * 4/1977 LeRoy ...................... G01K 1/18
                                                374/165
(Continued)

FOREIGN PATENT DOCUMENTS

CN   101458134 A    6/2009
JP   S49-024683 A   3/1974
(Continued)

OTHER PUBLICATIONS

First Office Action and Search Report dated Jun. 12, 2020, issued in the counterpart Chinese Patent Application No. 201780065568.3; with English translation.
(Continued)

*Primary Examiner* — Andrew Jordan
(74) *Attorney, Agent, or Firm* — McDermott Will & Emery LLP

(57) ABSTRACT

A functional element includes functional titanium oxide. The functional titanium oxide includes crystal grains of one or more of β-phase trititanium pentoxide (β-$Ti_3O_5$) and λ-phase trititanium pentoxide (λ-$Ti_3O_5$). The functional titanium oxide includes the property that at least a portion of crystal grains of one or more of β-phase trititanium pentox-
(Continued)

ide (β-Ti$_3$O$_5$) and λ-phase trititanium pentoxide (λ-Ti$_3$O$_5$) changes into crystal grains of titanium oxide (TiO$_2$) when the functional titanium oxide is heated to 350° C. or higher.

18 Claims, 18 Drawing Sheets

(51) Int. Cl.
    *C01G 23/04*     (2006.01)
    *C04B 35/46*     (2006.01)
    *B32B 9/04*     (2006.01)
    *G01K 11/12*     (2021.01)
    *B82Y 30/00*     (2011.01)

(52) U.S. Cl.
    CPC .............. *G01K 7/16* (2013.01); *G01K 11/12* (2013.01); *B82Y 30/00* (2013.01); *C04B 2235/76* (2013.01)

(58) Field of Classification Search
    CPC .......... G01K 7/16; G01K 11/12; B82Y 30/00; C01P 2002/72
    See application file for complete search history.

(56) References Cited

U.S. PATENT DOCUMENTS

| | | | |
|---|---|---|---|
| 10,108,117 B2* | 10/2018 | Shibuya | ................ G03G 15/50 |
| 2009/0146230 A1 | 6/2009 | Takizawa | |
| 2017/0235260 A1* | 8/2017 | Shibuya | ................ G03G 15/50 399/67 |
| 2019/0185338 A1* | 6/2019 | Nakamura | ........... C01G 23/047 |
| 2019/0285489 A1* | 9/2019 | Nakamura | ................ B32B 3/08 |
| 2020/0024150 A1* | 1/2020 | Nakamura | ............. G01K 11/00 |

FOREIGN PATENT DOCUMENTS

| | | |
|---|---|---|
| JP | 57-023362 B2 | 5/1982 |
| JP | 59-079821 A | 5/1984 |

OTHER PUBLICATIONS

Tokoro, Hiroko et al., "External stimulation-controllable heat-storage ceramics," Nature Communications [online], 6, Article No. 7037 (2015), 2015.05.1 2, [retrieval date Nov. 7, 2017] <DOI: 10.1038/ncomms8037>.

Takeuchi, Satoshi "Present Status and Future Trend of Thermopaint", Journal of JSCM, the Japan Society of Colour Material, Japan, 1978, vol. 51, No. 6, pp. 371-378; with partial English translation.

Shiba, Kamekichi et al., "Thermoelectric Resistance Thermometer", Oyo Buturi, the Japan Society of Applied Physics, Japan, 1977, vol. 46, No. 10, pp. 1004-1009; with partial English translation.

International Search Report and Written Opinion issued in International Patent Appication No. PCT/JP2017/030574, dated Nov. 21, 2017; with partial English translation.

* cited by examiner

FUNCTIONAL ELEMENT AND TEMPERATURE SENSOR OF CRYSTAL GRAIN TRITITANIUM PENTOXIDE

CROSS-REFERENCE OF RELATED APPLICATIONS

This application is the U.S. National Phase under 35 U.S.C. § 371 of International Patent Application No. PCT/JP2017/030574, filed on Aug. 25, 2017, which in turn claims the benefit of Japanese Application No. 2016-170756, filed on Sep. 1, 2016, Japanese Application No. 2016-187923, filed on Sep. 27, 2016, and Japanese Application No. 2016-208521, filed on Oct. 25, 2016, the entire disclosures of which Applications are incorporated by reference herein.

TECHNICAL FIELD

The invention relates to a functional element and a temperature sensor that change in physical property with changes in temperature.

The invention relates to a sensor that changes in physical property with changes in temperature, pressure, and the like, a temperature sensor that changes in physical property with changes in temperature, and a pressure sensor that changes in physical property with changes in pressure.

BACKGROUND ART

In order to measure temperature of heat generator, functional elements have been used, such as thermopaints utilizing changes in pigment color and thermocouples utilizing the Seebeck effect. Using thermopaints, the temperature of an object is measured through changes in pigment color. Using thermocouples, the temperature of an object is measured through electrical measurement using the Seebeck effect. These techniques are disclosed in Non-patent Literatures 1 and 2, for example.

CITATION LIST

Non-Patent Literature

Non-patent Literature 1: Satoshi Takeuchi, "Present Status and Future Trend of Thermopaint", Journal of JSCM, the Japan Society of Colour Material, Japan, 1978, Vol. 51, No. 6, pp 371-378

Non-patent Literature 2: Kamekichi Shiba, Masahumi Ueda, Yasuo Yagi, "Thermoelectric Resistance Thermometer", OYO BUTURI, the Japan Society of Applied Physics, Japan, 1977, Vol. 46, No. 10, pp. 1004-1009

SUMMARY OF INVENTION

Technical Problem

However, general thermopaints capable of measuring high temperatures are expensive. Thermocouples need to be made of noble metal, such as platinum or rhodium, depending on the range of temperature to be measured. In such a case, thermocouples are expensive. As described above, conventional thermometers using thermopaints and conventional thermometers using thermocouples containing noble metal have a first problem of high cost.

In the light of the first problem, the inventor of the application has proposed in recent years, an inexpensive functional element which uses nanoparticles of trititanium pentoxide and changes in physical property with changes in temperature and an inexpensive temperature sensor using the functional element.

Meanwhile, general trititanium pentoxide exhibits the crystalline structure of $\beta$-phase trititanium pentoxide in a low-temperature range and the crystalline structure of $\lambda$-phase trititanium pentoxide in a high-temperature range. These crystalline structures alternate with changes in temperature. In recent years, however, it has been revealed that in nanoparticles of trititanium pentoxide having a predetermined size, the crystalline structure of $\lambda$-phase trititanium pentoxide generated in a high-temperature range is maintained after cooling. The inventor of the application has found first in the world that when nanoparticles of trititanium pentoxide having a predetermined size are heated to 350° C. or higher, the crystalline form thereof changes into that of titanium dioxide ($TiO_2$), which is maintained after cooling.

$\beta$-phase trititanium pentoxide, $\lambda$-phase trititanium pentoxide, and titanium dioxide described above are different in physical properties, such as color and electric conductivity. The inventor of the application has proposed a temperature sensor including the aforementioned nanoparticles of trititanium pentoxide as the functional element which is the body of the temperature sensor. After the temperature sensor is exposed to heat, the color, electric conductivity, or the like of the functional element is measured. The temperature sensor is thereby able to measure the maximum temperature at which the trititanium pentoxide can take the corresponding crystalline form. When the temperature sensor is a type using electric conductivity, the functional element is provided with two or more electrodes.

A first example of the temperature sensor is illustrated in FIG. 15. A temperature sensor 100BA illustrated in FIG. 15 includes: a functional element 40B made of the aforementioned nanoparticles of trititanium pentoxide; and two electrodes 70B and 70B arranged to sandwich the functional element 40B. The functional element 40B is a pellet of nanoparticles of trititanium pentoxide, for example. The functional element 40B has a columnar shape like a functional element 40BA illustrated in FIG. 16 or a rectangular plate shape like a functional element 40BB illustrated in FIG. 17, for example. The electrodes 70B are made of metal, conducting oxide, conducting polymer, a carbon material, or the like, for example.

FIG. 18 is a schematic cross-sectional view illustrating a second example of the temperature sensor. A temperature sensor 100BB illustrated in FIG. 18 includes the aforementioned functional element 40B and the two electrodes 70B and 70B arranged on the same surface of the functional element 40B.

FIG. 27 illustrates a third example of the temperature sensor. A temperature sensor 100CA illustrated in FIG. 27 includes a substrate 150 and a functional element 40C which is laid on the substrate 150 and is made of the aforementioned nanoparticles of trititanium pentoxide. The functional element 40C is a pellet of the nanoparticles of trititanium pentoxide, for example. The functional element 40C has a columnar shape like a functional element 40CA illustrated in FIG. 28 or a rectangular plate shape like a functional element 40CB illustrated in FIG. 29, for example.

The nanoparticles of trititanium pentoxide of the functional element 40BA illustrated in FIG. 16 and the functional element 40CA illustrated in FIG. 28 may have either identical or different properties. The functional elements 40BA and 40CA are therefore indicated by different reference numerals. The nanoparticles of trititanium pentoxide of the functional element 40BB illustrated in FIG. 17 and the functional element 40CB illustrated in FIG. 29 may have either identical or different properties. The functional elements 40BB and 40CB are therefore indicated by different reference numerals.

FIG. 30 is a schematic cross-sectional view illustrating a fourth example of the temperature sensor. A temperature sensor 100CB illustrated in FIG. 30 includes: the substrate 150; the aforementioned functional element 40C which is laid on the substrate 150; and two electrodes 70C and 70C arranged on the same surface of the functional element 40C. The electrodes 70C are made of metal, conducting oxide, conducting polymer, a carbon material, or the like, for example.

FIG. 31 is a schematic cross-sectional view illustrating a fifth example of the temperature sensor. A temperature sensor 100CC illustrated in FIG. 31 includes: the substrate 150; the aforementioned functional element 40C which is laid on the substrate 150; the electrode 70C provided on the surface of the functional element 40C; and the electrode 70C provided in the interface between the substrate 150 and functional element 40C.

However, in the temperature sensors 100BA and 100BB illustrated in FIGS. 15 and 18, the functional element 40B, which is made of trititanium pentoxide, and the electrodes 70B, which are made of metal or the like, normally have a great difference in coefficient of thermal expansion. When these temperature sensors are used in an environment where the thermal expansion tends to be large, the functional element 40B could be separated from the electrodes 70B, or cracks could be produced in the functional element 40B and electrodes 70B. This is a second problem.

In the temperature sensors 100CA, 100CB, and 100CC, the substrate 150 and the functional element 40C, which is made of trititanium pentoxide, normally have a great difference in coefficient of thermal expansion. When those temperature sensors are used in an environment where the thermal expansion tends to be large, therefore, the substrate 150 could be separated from the functional element 40C or electrodes 70C, or cracks could be produced in the functional element 40C and electrodes 70C. This is a third issue.

The invention is made in the light of the aforementioned first problem. An object of the invention is to provide an inexpensive functional element that changes in physical property with changes in temperature and an inexpensive temperature sensor including the functional element.

The invention is made in the light of the aforementioned second problem. Another object of the invention is to provide an inexpensive temperature sensor including an inexpensive functional element which changes in physical property with changes in temperature and is prevented from causing separation of the functional element from the electrodes and cracks in the functional element and electrodes.

The invention is made in the light of the aforementioned third problem. Still another object of the invention is to provide an inexpensive sensor, such as a temperature sensor or a pressure sensor, which includes an inexpensive functional element that changes in physical property with changes in temperature and is prevented from causing separation of the substrate from the functional element or electrodes or cracks in the functional element and electrodes.

Solution to Problem

To solve the aforementioned first problem, a functional element according to an aspect of the invention includes functional titanium oxide. The functional titanium oxide includes crystal grains of one or more of β-phase trititanium pentoxide ($\beta$-$Ti_3O_5$) and λ-phase trititanium pentoxide ($\lambda$-$Ti_3O_5$). The functional titanium oxide includes the property that at least a portion of crystal grains of one or more of β-phase trititanium pentoxide ($\beta$-$Ti_3O_5$) and λ-phase trititanium pentoxide ($\lambda$-$Ti_3O_5$) changes into crystal grains of titanium oxide ($TiO_2$) when the functional titanium oxide is heated to 350° C. or higher.

A temperature sensor according to another aspect includes a temperature sensor body which includes the aforementioned functional element and changes in physical property with changes in temperature.

To solve the aforementioned second problem, a temperature sensor according to still another aspect of the invention includes: the aforementioned functional element; an electrode provided on at least a part of the surface of the functional element; and a thermal stress relaxing layer which is interposed between the functional element and the electrode and relaxes thermal stress produced between the functional element and the electrode.

To solve the aforementioned third problem, a temperature sensor according to a first aspect of the invention includes: a substrate; and a functional element that is laid on the substrate and is composed of functional titanium oxide which includes crystal grains of one or more of β-phase trititanium pentoxide ($\beta$-$Ti_3O_5$) and λ-phase trititanium pentoxide ($\lambda$-$Ti_3O_5$) and which includes the property that at least a portion of crystal grains of one or more of β-phase trititanium pentoxide ($\beta$-$Ti_3O_5$) and λ-phase trititanium pentoxide ($\lambda$-$Ti_3O_5$) changes into crystal grains of titanium oxide ($TiO_2$) when the functional titanium oxide is heated to 350° C. or higher. The substrate includes a substrate thin-film section having a thin-film form with a small thickness in the stacking direction of the substrate and the functional element.

DESCRIPTION OF EMBODIMENTS (First Temperature Sensor)

Hereinafter, a description is given of functional elements according to embodiments and temperature sensors including the functional elements with reference to the drawings. First, first temperature sensors are described.

(Temperature Sensor)

First Embodiment

Figure 1:
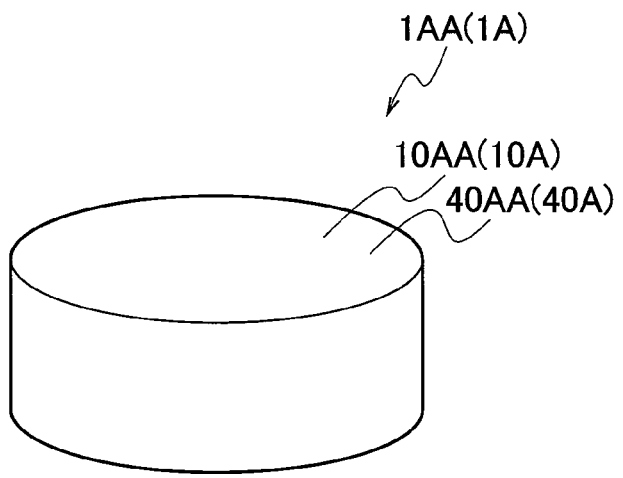
FIG. 1 is a schematic perspective view illustrating a temperature sensor and a functional element according to a first embodiment.

FIG. 1 is a schematic perspective view illustrating a temperature sensor according to a first embodiment. A temperature sensor 1AA (1A) illustrated in FIG. 1 includes a temperature sensor body 10AA (10A). The temperature sensor 1AA needs to include at least the temperature sensor body 10AA illustrated in FIG. 1 and may further include not-illustrated peripheral members. Temperature sensors 1AB to 1AM according to second to 13th embodiments described later include temperature sensor bodies 10AB to 10AM, respectively, in a similar manner to the temperature sensor 1AA according to the first embodiment.

(Temperature Sensor Body)

The temperature sensor body 10AA is a member that includes the functional element 40A and changes in physical property with changes in temperature. The temperature sensor body 10AA illustrated in FIG. 1 is composed of the functional element 40AA (40A) and substantially does not include any material other than the functional element 40AA. In the temperature sensor 1AC according to the later-described third embodiment, for example, the temperature sensor body 10A includes a base material 30, which is made of a material other than that of the functional element 40A.

(Functional Element)

The functional element 40A is an element that changes in physical property with changes in temperature. Specifically, the functional element 40A is an element made of functional titanium oxide which changes in physical property with variations in crystalline structure of crystal grains due to changes in temperature. The physical properties that vary as the temperature changes are one or more of electric conductivity and color, for example.

The functional titanium oxide as the material of the functional element 40A is described. The functional titanium oxide normally includes crystal grains of one or more of β-phase trititanium pentoxide (β-Ti$_3$O$_5$) and λ-phase trititanium pentoxide (λ-Ti$_3$O$_5$) at 450° C. or lower. The functional titanium oxide includes the property that causes at least a portion of crystal grains of one or more of β-phase trititanium pentoxide (β-Ti$_3$O$_5$) and λ-phase trititanium pentoxide (λ-Ti$_3$O$_5$) to change into crystal grains of titanium dioxide (TiO$_2$) when the functional titanium oxide is heated to 350° C. or higher.

The functional titanium oxide is described concretely. In the following description, it is assumed that crystal grains constituting the functional titanium oxide have not been heated to 190° C. or higher. The functional titanium oxide can take three forms of β-phase trititanium pentoxide, λ-phase trititanium pentoxide, and titanium dioxide from a low-temperature range to a high-temperature range.

Specifically, the functional titanium oxide normally includes only crystal grains of β-phase trititanium pentoxide at temperatures lower than 190° C. The functional titanium oxide made of β-phase trititanium pentoxide is normally polycrystal composed of crystal grains of β-phase trititanium pentoxide. At least a portion of a large number of crystal grains of β-phase trititanium pentoxide constituting the functional titanium oxide undergoes phase transition into crystal grains of λ-phase trititanium pentoxide when the functional titanium oxide is heated to a temperature of not lower than 190° C. and lower than 350° C.

When the functional titanium oxide is heated to a temperature of not lower than 350° C. and not higher than 450° C., at least a portion of the large number of crystal grains of λ-phase trititanium pentoxide constituting the functional titanium oxide changes in crystalline composition into crystal grains of titanium dioxide.

The temperature at which all of the large number of crystal grains of λ-phase trititanium pentoxide constituting the functional titanium oxide change into crystal grains of titanium dioxide is about 550° C. or higher. When heated to 550° C. or higher, the functional titanium oxide normally includes only crystal grains of titanium dioxide ($TiO_2$).

As described above, the stable crystalline structure of the functional titanium oxide depends the temperature. Once heated, the functional titanium oxide has the property of maintaining after cooling, the crystalline structure of crystal grains generated by heating. Once the functional titanium oxide is heated to a high-temperature range and crystal grains of titanium dioxide are formed among crystal grains constituting the functional titanium oxide, for example, the composition of the generated titanium dioxide is maintained even when the functional titanium oxide is cooled to room temperature. The functional element 40A composed of the functional titanium oxide is generally used as follows: the functional element 40A is normally treated at room temperature and measures the maximum temperature when functional element 40A is placed at high temperature. In the following description, it is assumed that the functional titanium oxide has not been heated to 190° C. or higher in the thermal history and includes only β-phase trititanium pentoxide.

As described above, the functional titanium oxide as the material of the functional element 40A normally includes only crystal grains of β-phase trititanium pentoxide at temperature lower than 190° C. In the functional titanium oxide including the composition of β-phase trititanium pentoxide, the minimum unit including the function as the functional titanium oxide is crystal grains which are nanoparticles. Herein, the function as the functional titanium oxide refers to the function of: at heating, generating crystal grains having a crystalline structure different from that before heating; and maintaining the crystal grains of the crystalline structure after cooling.

The average grain size (median size) of crystal grains of the functional titanium oxide including the composition of β-phase trititanium pentoxide is normally 1 to 1000 nm, preferably 5 to 50 nm, and more preferably 10 to 20 nm. When the average grain size of crystal grains of the functional titanium oxide including the composition of β-phase trititanium pentoxide is in the aforementioned range, the functional titanium oxide includes the aforementioned function as the functional titanium oxide. The functional titanium oxide includes the function of: at heating, generating crystal grains having a crystalline structure different from that before heating; and maintaining the crystal grains of the crystalline structure after cooled. The functional titanium oxide is suitable for a temperature sensor that shows the maximum temperature in the thermal history after cooling. The crystal grains of the functional titanium oxide may have different sizes between before and after heating of the functional titanium oxide.

The minimum unit functioning as the functional titanium oxide is crystal grains having an average grain size within the aforementioned range. However, nanoparticles of crystal grains are difficult to handle, and the functional titanium oxide is preferably polycrystal of nanoparticles of crystal grains. This polycrystal of nanoparticles of crystal grains can take any form and is granular, for example. The granular polycrystal of crystal grains has an average particle size (median size) of typically 50 nm to 500 μm, preferably 1 to 50 μm, and more preferably 3 to 8 μm. Granular polycrystal of crystal grains having an average particle size (median size) in the aforementioned range is easy to handle.

The polycrystal of crystal grains of the functional titanium oxide, such as the granular polycrystal of crystal grains, can be used directly and also can be formed into a compact of polycrystal of crystal grains, such as a pellet obtained by compressing polycrystal of crystal grains, or can be contained in a base material 30. The compact may be a molded body produced by using a mold. The functional element 40AA of the temperature sensor body 10AA of the temperature sensor 1AA according to the first embodiment is a compact made of the functional titanium oxide. Specifically, the functional element 40AA is a pellet obtained by compressing polycrystal of crystal grains of the functional titanium oxide.

The size of crystal grains of β-phase trititanium pentoxide constituting the functional titanium oxide is substantially thought to not change even if phase transition from β- to λ-phase trititanium pentoxide occurs at heating. The aforementioned size of crystal grains of β-phase trititanium pentoxide constituting the functional titanium oxide can be therefore considered equal to the size of crystal grains of β- and λ-phase trititanium pentoxides constituting the functional titanium oxide.

On the other hand, normal trititanium pentoxide, such as trititanium pentoxide composed of polycrystal of crystal grains which are not nanoparticles or single crystal trititanium pentoxide, does not have the property of maintaining, after cooling, the crystalline structure of crystal grains generated at heating, unlike the functional titanium oxide. This is considered to be because, the crystalline structure of crystal grains of normal trititanium pentoxide changes reversibly and easily between β-phase trititanium pentoxide, λ-phase trititanium pentoxide, and titanium dioxide. Normal trititanium pentoxide is therefore not a suitable material for temperature sensors that show the maximum temperature in the thermal history after cooling.

When the functional titanium oxide is heated to a temperature of not lower than 190° C. and lower than 350° C., at least a portion of the large number of crystal grains of β-phase trititanium pentoxide constituting the functional titanium oxide undergoes phase transition into crystal grains of λ-phase trititanium pentoxide. In the temperature range not lower than 190° C. and lower than 350° C., the large number of crystal grains constituting the functional titanium oxide undergo phase transition from β- to λ-phase trititanium pentoxide at varying times. The functional titanium oxide heated to a temperature of not lower than 190° C. and lower than 350° C. normally includes mainly crystal grains of λ-phase trititanium pentoxide and also includes crystal grains of β-phase trititanium pentoxide.

When the functional titanium oxide is heated to a temperature of not lower than 350° C. and not higher than 450° C., at least a portion of the large number of crystal grains of λ-phase trititanium pentoxide constituting the functional titanium oxide changes in crystalline composition into crystal grains of titanium dioxide. Herein, titanium dioxide ($TiO_2$) is an idea including rutile, anatase, and brookite. In the temperature range not lower than 350° C. and not higher than 450° C., the large number of crystal grains constituting the functional titanium oxide change in crystalline composition from λ-phase trititanium pentoxide to titanium dioxide at varying times. The functional titanium oxide heated to a temperature of not lower than 350° C. and not higher than 450° C. normally includes mainly crystal grains of titanium dioxide and also includes λ- and β-phase trititanium pentoxides.

When the functional titanium oxide mainly including crystal grains of λ-phase trititanium pentoxide and also includes crystal grains of β-phase trititanium pentoxide is heated to a temperature of not lower than 350° C. and not higher than 450° C., crystal grains of titanium dioxide are generated in the functional titanium oxide. Specifically, crystal grains of β-phase trititanium pentoxide are heated to undergo phase transition into crystal grains of λ-phase trititanium pentoxide and then further change into crystal grains of titanium dioxide.

As described above, the temperature at which all of the large number of crystal grains of λ-phase trititanium pentoxide constituting the functional titanium oxide change to crystal grains of titanium dioxide is about 550° C. or higher. When the functional titanium oxide is heated to a temperature of higher than 450° C. and lower than 550° C., basically, most of the crystal grains of λ-phase trititanium pentoxide constituting the functional titanium oxide change in crystalline composition into crystal grains of titanium dioxide. In the temperature range higher than 450° C. and lower than 550° C., a large number of crystal grains constituting the functional titanium oxide change in crystalline composition from λ-phase trititanium pentoxide to titanium dioxide at varying times. The functional titanium oxide heated to a temperature of higher than 450° C. and lower than 550° C. normally includes mainly crystal grains of titanium dioxide and also includes very small amounts of λ- and β-phase trititanium pentoxides.

The functional titanium oxide heated to 550° C. or higher normally includes only crystal grains of titanium dioxide. The functional titanium oxide heated to 550° C. or higher does not substantially include any crystal grains of λ-phase and β-phase trititanium pentoxides.

As described above, the functional titanium oxide can include crystal grains of one or more of β- and λ-phase trititanium pentoxides in the temperature ranges lower than 190° C., not lower than 190° C. and lower than 350° C., and not lower than 350° C. and not higher than 450° C. On the other hand, the functional titanium oxide substantially does not include crystal grains of β- and λ-phase trititanium pentoxides in the temperature range higher than 450° C. and lower than 550° C. This means that the functional titanium oxide substantially includes crystal grains of one or more of β- and λ-phase trititanium pentoxides at temperatures of not higher than 450° C.

(General Operation of Functional Element)

In terms of the functional titanium oxide constituting the functional element 40A, when the crystal grains constituting the functional titanium oxide change in crystalline structure due to heating of the functional titanium oxide, the crystalline structure of the crystal grains having changed is maintained after the functional titanium oxide is cooled.

When the functional titanium oxide at room temperature is heated to a temperature of not lower than 190° C. and lower than 350° C., for example, at least a portion of a large number of crystal grains constituting the functional titanium oxide changes from β- to λ-phase trititanium pentoxide at the heating. The crystal grains of λ-phase trititanium pentoxide generated at the heating are maintained in the functional titanium oxide even after the functional titanium oxide is cooled to room temperature.

When the functional titanium oxide at room temperature is heated to a temperature of not lower than 350° C. and not higher than 450° C., at least a portion of a large number of crystal grains constituting the functional titanium oxide changes from λ- or β-phase trititanium pentoxide to titanium dioxide. Crystal grains of β-phase trititanium pentoxide undergo phase transition into crystal grains of λ-phase trititanium pentoxide and then further change into titanium dioxide at the heating. The crystal grains of titanium dioxide generated at the heating are maintained in the functional titanium oxide even after the functional titanium oxide is cooled to room temperature.

When the functional titanium oxide at room temperature is heated to a temperature of higher than 450° C. and lower than 550° C., most of the large number of crystal grains constituting the functional titanium oxide change to crystal grains of titanium dioxide. The crystal grains of titanium dioxide generated at the heating are maintained in the functional titanium oxide even after the functional titanium oxide is cooled to room temperature.

When the functional titanium oxide at room temperature is heated to a temperature of 550° C. or higher, substantially all of the large number of crystal grains constituting the functional titanium oxide change to crystal grains of titanium dioxide. The crystal grains of titanium dioxide generated at the heating are maintained in the functional titanium oxide even after the functional titanium oxide is cooled to room temperature.

β-phase trititanium pentoxide, λ-phase trititanium pentoxide, and titanium dioxide described above are different in physical properties. In terms of color among the physical properties, for example, β-phase trititanium pentoxide, λ-phase trititanium pentoxide, and titanium dioxide are different in color, which are red, blue, and white, respectively. When the functional element 40A is red, it is found that the functional element 40A was heated to a temperature in a temperature range lower than 190° C. When the functional element 40A is blue, it is found that the functional element 40 was heated to a temperature in a temperature range not lower than 190° C. and lower than 350° C. When the functional element 40A is white, it is found that the functional element 40 was heated to a temperature in a temperature range not lower than 350° C. The functional element 40A can be therefore used as a temperature sensor. The color is evaluated visually or evaluated based on an adsorption spectrum of the functional element 40A.

In terms of electric conductivity among the physical properties, for example, β-phase trititanium pentoxide, λ-phase trititanium pentoxide, and titanium dioxide are different in electric conductivity. For example, β-phase trititanium pentoxide has an electric conductivity in the same range as that of many semiconductors while the λ-trititanium pentoxide has an electric conductivity in the same range as that of many metals. Titanium dioxide has an electric conductivity in the same range as that of many insulators. Such differences in electric conductivity are maintained after the functional titanium oxide is cooled to room temperature. Measurement of the electric conductivity of the functional element 40A shows that the functional element 40A was heated to a temperature in a temperature range lower than 190° C., a temperature range not lower than 190° C. and lower than 350° C., or a temperature range not lower than 350° C., respectively. The functional element 40A can be therefore used as a temperature sensor.

Changes in crystalline structure of the functional titanium oxide between β-phase trititanium pentoxide, λ-phase trititanium pentoxide, and titanium dioxide are substantially not influenced by the atmosphere of the functional titanium oxide. The functional element made of the functional titanium oxide can be used in an atmosphere, such as air, oxygen atmosphere, and nitrogen atmosphere, for example.

(Specific Operation of Functional Element)

The functional element 40A exhibits the operations of the aforementioned "General Operation of Functional Element" independently of the form thereof, including a compact form or a granular form. Hereinafter, a description is given of specific operations of the functional element used in the temperature sensor 1AA according to the first embodiment.

The functional element 40AA used in the temperature sensor body 10AA of the temperature sensor 1AA according to the first embodiment (illustrated in FIG. 1) is composed of a pellet of polycrystal of crystal grains of the functional titanium oxide. The functional element 40AA is fabricated by compressing a powder or granular material of polycrystal of crystal grains of the functional titanium oxide so as to have cylindrical shape, for example.

The operations of the functional element 40AA are the same as the aforementioned general operations of the functional element. In terms of color among the physical properties, for example, β-phase trititanium pentoxide, λ-phase trititanium pentoxide, and titanium dioxide are different in color, which are red, blue, and white, respectively. When the functional element 40AA is red, blue, or white, it is found that the functional element 40AA was heated to a temperature in a temperature range lower than 190° C., a temperature range not lower than 190° C. and lower than 350° C., or a temperature range not lower than 350° C., respectively. The functional element 40AA can be therefore used as a temperature sensor.

In terms of electric conductivity among the physical properties, for example, β-phase trititanium pentoxide, λ-phase trititanium pentoxide, and titanium dioxide are different in electric conductivity. Measurement of the electric conductivity of the functional element 40AA shows that the functional element 40AA was heated to a temperature in a temperature range lower than 190° C., a temperature range not lower than 190° C. and lower than 350° C., or a temperature range not lower than 350° C., respectively. The functional element 40AA can be therefore used as a temperature sensor.

(Specific Mode of Temperature Sensor Body)

The temperature sensor body 10AA of the temperature sensor 1AA according to the first embodiment (illustrated in FIG. 1) is the same as the functional element 40AA.

(Operation of Temperature Sensor Body)

The operations of the temperature sensor body 10AA are the same as the specific operations of the functional element 40AA, and the description thereof is omitted.

(Specific Mode of Temperature Sensor)

As for the temperature sensor 1AA according to the first embodiment (illustrated in FIG. 1), the temperature sensor body 10AA is just used as the temperature sensor 1AA.

(Operation of Temperature Sensor)

The operations of the temperature sensor 1AA are the same as those of the temperature sensor body 10AA, and the description thereof is omitted.

<Effect of Functional Element and Temperature Sensor>

According to the functional element 40AA and temperature sensor 1AA, it is possible to measure temperature by using changes in physical property due to changes in the crystalline structure of crystal grains of the functional titanium oxide constituting the functional element 40AA.

According to the functional element 40AA and temperature sensor 1AA, it is possible to measure temperature in a high-temperature range not lower than 350° C. According to the functional element 40AA and temperature sensor 1AA, it is therefore possible to measure temperature in electric furnaces, switchboards, and the like, which require temperature measurement in a high-temperature range not lower than 350° C.

Second Embodiment

Figure 2:
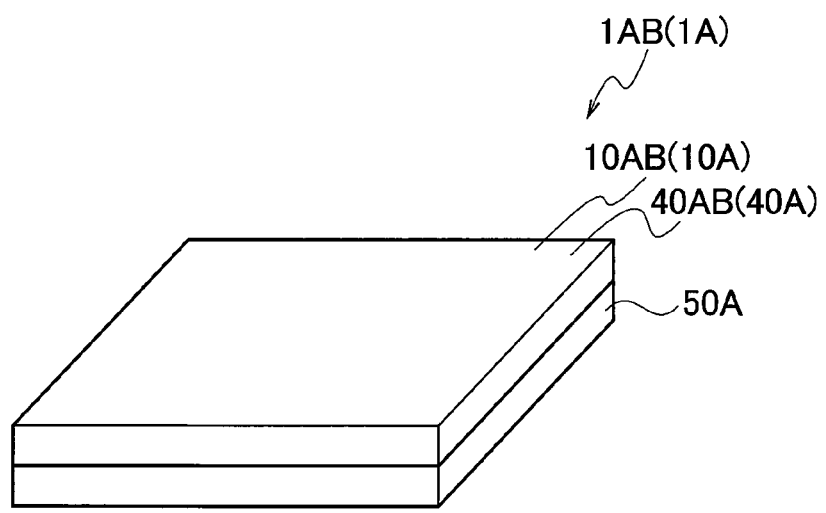
FIG. 2 is a schematic perspective view illustrating a temperature sensor according to a second embodiment.

FIG. 2 is a schematic perspective view illustrating a temperature sensor according to a second embodiment. A temperature sensor 1AB (1A) (illustrated in FIG. 2) includes a temperature sensor body 10AB (10A). The temperature sensor body 10AB is composed of a functional element 40AB (40A), which is a thin film 40AB made of the functional titanium oxide. The thin film 40AB is formed on a substrate 50A. In other words, the temperature sensor 1AB includes the substrate 50A and the thin film 40AB as the functional element formed on the substrate 50A.

The temperature sensor 1AB according to the second embodiment, (illustrated in FIG. 2) is the same as the temperature sensor 1AA according to the first embodiment (illustrated in FIG. 1) excepting the shape of the temperature sensor body 10AB and the presence of the substrate 50. The same members of the temperature sensor 1AB according of the second embodiment (illustrated in FIG. 2) as the members of the temperature sensor 1AA according to the first embodiment (illustrated in FIG. 1) are given the same reference symbols, and the description of the configurations and operations thereof are omitted or simplified.

<Temperature Sensor Body>

A temperature sensor body 10B is composed of the functional element 40AB (40A) and does not include substantially any material other than the functional element 40AB, similarly to the temperature sensor body 10AA of the temperature sensor 1AA according to the first embodiment (illustrated in FIG. 1). The functional element 40AB is made of the functional titanium oxide which is the same material as that of the functional element 40AA of the temperature sensor 1AA according to the first embodiment (illustrated in FIG. 1). The functional element 40AB is formed on the substrate 50A.

The functional element 40AB is a thin film of the functional titanium oxide unlike the functional element 40AA (illustrated in FIG. 1). According to the thin-film functional element 40AB, the thin film improves visibility and facilitates visual evaluation while facilitating evaluation of the absorption spectrum. The thin-film functional element 40AB is formed on the substrate 50A by using spin coating, dip coating, sputtering, CVD, laser application, aerosol deposition, or the like, for example.

The material of the substrate 50A is not limited particularly. Examples of the material of the substrate 50A are glass, semiconductors such as Si, SiC, and GaN, inorganic oxides such as sapphire, metals such as Al, Cu, Ti, Ni, Sn, Au, Ag, and SUS, and resins such as polyimide resin.

(Operation of Temperature Sensor)

The operations of the temperature sensor 1AB are the same as those of the temperature sensor body 1AA according to the first embodiment (illustrated in FIG. 1), and the description thereof is omitted.

The temperature sensor 1AB includes the substrate 50A. The temperature sensor 1AB has high mechanical strength. The thermal conduction, electric conduction, and the like of the temperature sensor 1AB can be controlled by adjusting the thermal conduction, electric conduction, and the like of the substrate 50A.

(Effect of Temperature Sensor)

The temperature sensor 1AB exerts the same effects as those of the temperature sensor 1AA according to the first embodiment (illustrated in FIG. 1).

According to the temperature sensor 1AB, the functional element 40AB is composed of a thin film, so that the visibility of the temperature sensor 1AB is higher than that of the temperature sensor 1AA.

In addition, the temperature sensor 1AB includes the substrate 50A. The temperature sensor 1AB therefore has high mechanical strength. According to the temperature sensor 1AB, the thermal conduction, electric conduction, and the like thereof can be controlled by adjusting the thermal conduction, electric conduction, and the like of the substrate 50A.

Third Embodiment

Figure 3A:
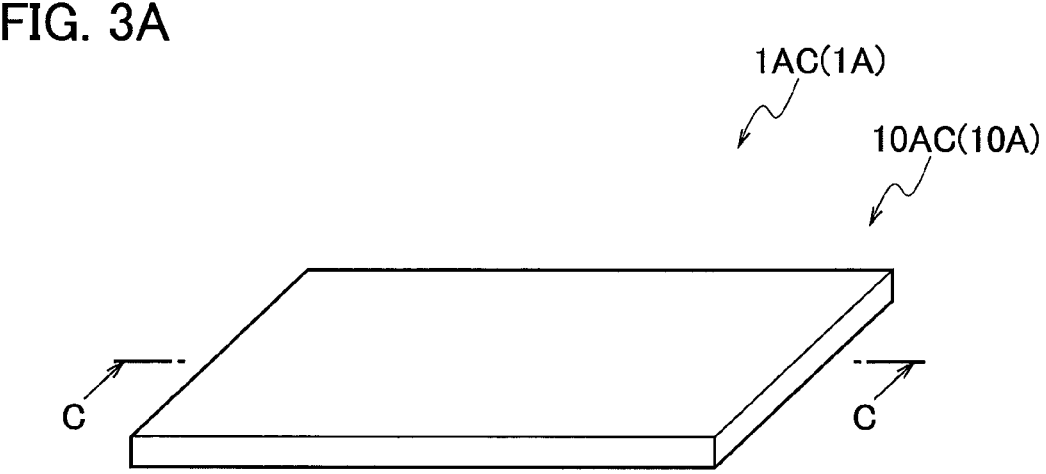
FIG. 3A is a schematic perspective view illustrating a temperature sensor according to a third embodiment.
Figure 3B:
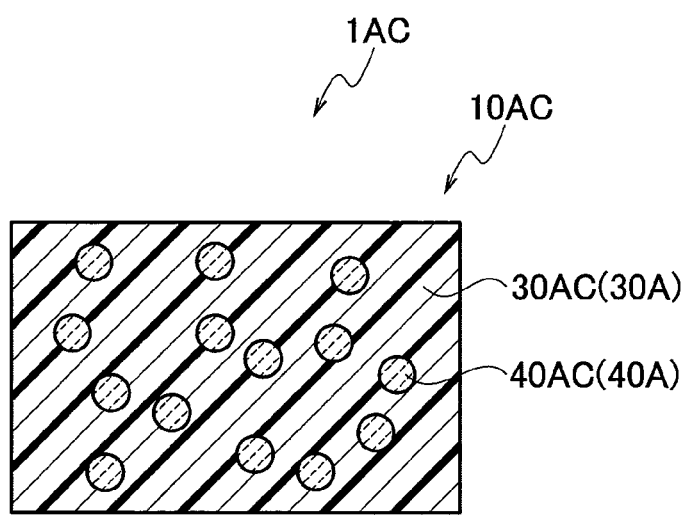
FIG. 3B is a schematic cross-sectional view along a line C-C of FIG. 3A.

FIG. 3A is a schematic perspective view illustrating a temperature sensor according to a third embodiment. FIG. 3B is a schematic cross-sectional view along a line C-C of FIG. 3A. A temperature sensor 1AC (1A) (illustrated in FIG. 3) includes a temperature sensor body 10AC (10A). The temperature sensor body 10AC includes a base material 30AC (30A) and a functional element 40AC (40A) included in the base material 30AC.

The temperature sensor 1AC according to the third embodiment (illustrated in FIGS. 3A and 3B) is the same as the temperature sensor 1AA according to the first embodiment (illustrated in FIG. 1) excepting the configuration of the temperature sensor body 10AC. The same members of the temperature sensor 1AC according to the third embodiment (illustrated in FIG. 3) as those of the temperature sensor 1AA according to the first embodiment (illustrated in FIG. 1) are given the same reference symbols, and the description of the configurations and operations thereof are omitted or simplified.

(Temperature Sensor Body)

The temperature sensor body 10AC includes the base material 30AC and the functional element 40AC contained in the base material 30AC. The base material 30AC (illustrated in FIG. 3) has a plate shape but the shape thereof is not limited particularly.

In the temperature sensor body 10AC, the functional element 40AC is particles 40AC made of the functional titanium oxide. The particles 40AC made of the functional titanium oxide are granular polycrystal of crystal grains of the functional titanium oxide. The average particle size (median size) of the particles 40AC made of the functional titanium oxide is typically 100 nm to 500 μm preferably 1 to 50 μm, and more preferably 3 to 8 μm, for example. The granular polycrystal with an average particle size (median size) in the aforementioned ranges are easy to handle.

In the temperature sensor body 10AC, the base material 30AC is used to fix the particles 40AC made of the functional titanium oxide. Specifically, the base material 30AC is made of resin. Examples of the resin used for the base material 30AC include heat-resistant resin such as polyimide, for example. When the base material 30AC is made of heat-resistant resin, the temperature sensor 1AC can be used at high temperatures because of the high heat resistance thereof. The resin constituting the base material 30AC may be hardened resin which is completely hardened or may be gel resin.

As illustrated in FIG. 3B, in the temperature sensor body 10AC, the particles 40AC made of the functional titanium oxide are dispersed in the base material 30AC. The temperature sensor body 10AC is obtained by adding the particles 40AC made of the functional titanium oxide to the base material 30AC which is fluid, followed by mixing and shape forming, for example.

(Operation of Temperature Sensor)

The operations of the temperature sensor 1AC are the same as those of the temperature sensor 1AA (illustrated in FIG. 1), excepting that the operations of the functional element 40A as the element that changes in physical property with changes in temperature are exerted in the granular functional element 40AC and the operation due to the base material 30AC is exerted. The description of the operations of the temperature sensor 1AC is omitted.

A brief description is given of the matter that the operation of the functional element 40A as the element that changes in physical property with changes in temperature are exerted in the granular functional element 40AC. The granular functional element 40AC changes in physical property with changes in temperature in a similar manner to the functional element 40AA of the temperature sensor 1AA according to the first embodiment (illustrated in FIG. 1). The functional element 40AA, which is substantially contained in the base material 30A, receives heat of an object through the base material 30AC. The operations of the temperature sensor 1AC are the same as those of the temperature sensor 1AA according to the first embodiment (illustrated in FIG. 1) excepting the operation of receiving heat of an object through the base material 30AC.

When the physical property that changes with changes in temperature is color, the difference in color due to the difference in crystalline structure between β-phase trititanium pentoxide and the like is observed or measured through the base material 30AC. When the physical property that changes with changes in temperature is electric conductivity, the difference in electric conductivity due to the difference in crystalline structure between β-phase trititanium pentoxide and the like is measured through the base material 30AC.

(Effect of Temperature Sensor)

The temperature sensor 1AC exerts the same effects as those of the temperature sensor 1AA according to the first embodiment (illustrated in FIG. 1).

The temperature sensor 1AC includes the base material 30AC made of resin. The temperature sensor 1AC therefore has high mechanical strength. According to the temperature sensor 1AC, the thermal conduction, electric conduction, and the like of the temperature sensor 1AC can be controlled by adjusting the thermal conduction, electric conduction, and the like of the base material 30AC. The thermal conduction, electric conduction, and the like of the base material 30AC are controlled by adjusting the material of the resin of the base material 30AC, the amount of the base material 30AC relative to the functional element 40AC, or the like.

Furthermore, the temperature sensor 1AC includes the base material 30AC made of resin which is fluid at least in the process of manufacturing. This facilitates forming the temperature sensor 1AC into any shape.

Fourth Embodiment

Figure 4A:
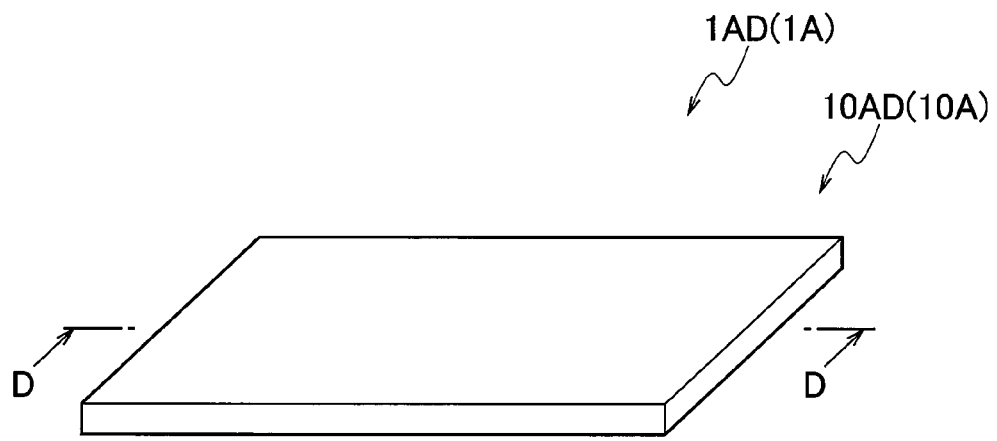
FIG. 4A is a schematic perspective view illustrating a temperature sensor according to a fourth embodiment.
Figure 4B:
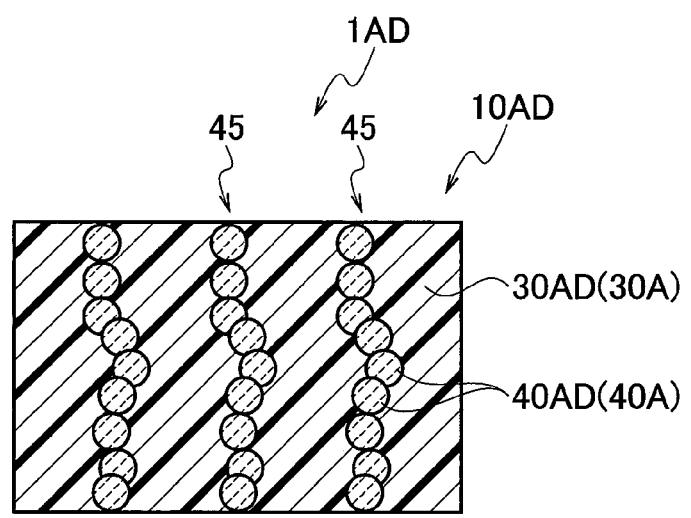
FIG. 4B is a schematic cross-sectional view along a line D-D of FIG. 4A.

FIG. 4A is a schematic perspective view illustrating a temperature sensor according to a fourth embodiment. FIG. 4B is a schematic cross-sectional view along a line D-D of FIG. 4A. A temperature sensor 1AD (1A) (illustrated in FIGS. 4A and 4B) includes a temperature sensor body 10AD (10A). The temperature sensor body 10AD includes a base material 30AD (30A) and a functional element 40AD (40A) contained in the base material 30AD.

The temperature sensor 1AD according to the fourth embodiment (illustrated in FIGS. 4A and 4B) is the same as the temperature sensor 1AC according to the third embodiment (illustrated in FIGS. 3A and 3B) excepting the configuration of the temperature sensor body 10AD. The same members of the temperature sensor 1AD according to the fourth embodiment (illustrated in FIGS. 4A and 4B) as those of the temperature sensor 1AC according to the third embodiment (illustrated in FIGS. 3A and 3B) are given the same reference symbols, and the description of the configurations and operations thereof are omitted or simplified.
(Temperature Sensor Body)

The temperature sensor body 10AD includes the base material 30AD and the functional element 40AD contained in the base material 30AD. The base material 30AD (illustrated in FIG. 4B) has a plate shape, but the shape thereof is not limited particularly.

The base material 30AD is the same resin as that of the base material 30AC used in the temperature sensor 1AC according to the third embodiment (illustrated in FIGS. 3A and 3B).

In the temperature sensor body 10AD, the functional element 40AD is particles 40AD made of the functional titanium oxide in a similar manner to the functional element 40AC used in the temperature sensor 1AC according to the third embodiment (illustrated in FIGS. 3A and 3B). The particles 40AD made of the functional titanium oxide may be the same as the particles 40AC, which are made of the functional titanium oxide and are used in the temperature sensor 1AC according to the third embodiment.

As illustrated in FIG. 4B, in the temperature sensor body 10AD, the particles 40AD made of the functional titanium oxide are interconnected in groups to form functional-titanium-oxide-particle connected bodies 45. In the temperature sensor body 10AD, the particles 40AD made of the functional titanium oxide are contained in the base material 30AD in such a manner that the particles 40AD are interconnected in groups. The number of particles 40AD interconnected in each functional-titanium-oxide-particle connected body 45 is any value not less than two. In the example of FIG. 4B, the number of particles 40AD interconnected in each functional-titanium-oxide-particle connected body 45 is nine.

As illustrated in FIG. 4B, the longitudinal direction of the functional-titanium-oxide-particle connected bodies 45 is vertical to the front and back surfaces of the temperature sensor body 10AD. The longitudinal direction of the functional-titanium-oxide-particle connected bodies 45 preferably extends in such a direction. This can improve the thermal conduction and electric conduction in the vertical direction to the front and back surfaces of the temperature sensor body 10AD and allows for quick observation of a change in temperature caused in the back surface, from the front side. In each functional-titanium-oxide-particle connected body 45, two or more particles 40AD made of the functional titanium oxide, which provides higher thermal conduction and higher electric conduction than those of the resin constituting the base material 30AD, are connected to each other, and the thermal conduction and electric conduction are higher between the particles 40AD.

The functional-titanium-oxide-particle connected bodies 45 may be arranged (not illustrated) so that the longitudinal direction of the functional-titanium-oxide-particle connected bodies 45 corresponds to the horizontal direction in FIG. 4B, that is, is perpendicular to the direction vertical to the front and back surfaces of the temperature sensor body 10AD. The longitudinal direction of the functional-titanium-oxide-particle connected bodies 45 preferably extends in such a direction. This can improve the thermal conduction and electric conduction along the front surface of the temperature sensor body 10AD and therefore reduce variation in measurement from one location to another in the front surface of the temperature sensor body 10AD.

The temperature sensor body 10AD is obtained by injecting the functional-titanium-oxide-particle connected bodies 45 into the base material 30AD which is fluid, followed by shape forming, for example.
(Operation of Temperature Sensor)

The operations of the temperature sensor 1AD are the same as those of the temperature sensor 1AC according to the third embodiment, (illustrated in FIGS. 3A and 3B). Since the temperature sensor body 10AD includes the functional-titanium-oxide-particle connected bodies 45, the temperature sensor 1AD allows for more quick observation of a change in temperature caused in the back surface, from the front side compared with the temperature sensor 1AC.
(Effect of Temperature Sensor)

The temperature sensor 1AD exerts the same effects as those of the temperature sensor 1AC according to the third embodiment (illustrated in FIGS. 3A and 3B).

In the temperature sensor 1AD, the temperature sensor body 10AD includes the functional-titanium-oxide-particle connected bodies 45. According to the temperature sensor 1AD, it is therefore possible to observe a change in temperature caused in the back surface from the front side more quickly than the temperature sensor 1AC.

Fifth Embodiment

Figure 5A:
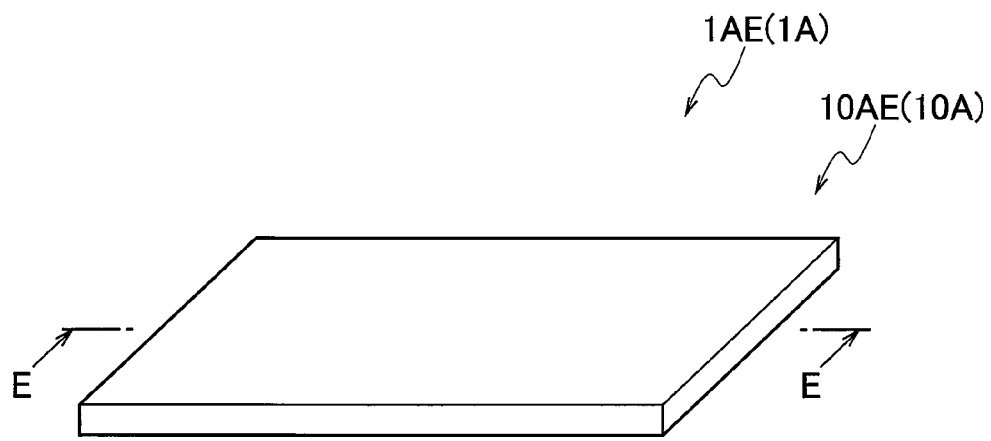
FIG. 5A is a schematic perspective view illustrating a temperature sensor according to a fifth embodiment.
Figure 5B:
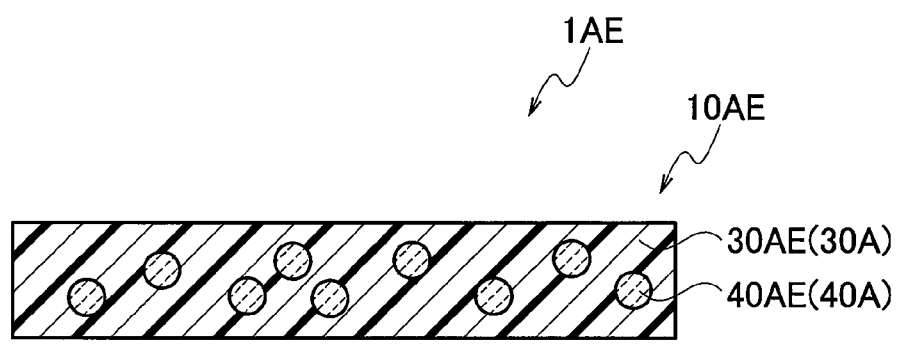
FIG. 5B is a schematic cross-sectional view along a line E-E of FIG. 5A.

FIG. 5A is a schematic perspective view illustrating a temperature sensor according to a fifth embodiment. FIG. 5B is a schematic cross-sectional view along a line E-E of FIG. 5A. A temperature sensor 1AE (1A) (illustrated in FIGS. 5A and 5B) includes a temperature sensor body 10AE (10A). The temperature sensor body 10AE includes a base material 30AE (30A) and a functional element 40AE (40A) contained in the base material 30AE.

The temperature sensor 1AE according to the fifth embodiment (illustrated in FIGS. 5A and 5B) is the same as the temperature sensor 1AC according to the third embodiment (illustrated in FIGS. 3A and 3B) excepting the configuration of the temperature sensor body 10AE. The same members of the temperature sensor 1AE according to the fifth embodiment (illustrated in FIGS. 5A and 5B) as those of the temperature sensor 1AC according to the third embodiment (illustrated in FIGS. 3A and 3B) are given the same reference symbols, and the description of the configurations and operations thereof are omitted or simplified.
(Temperature Sensor Body)

The temperature sensor body 10AE includes the base material 30AE and the functional element 40AE contained in the base material 30AE. The base material 30AE (illustrated in FIG. 5B) has a plate shape, but the shape thereof is not limited particularly.

The base material 30AE is made of film, that is, thin film. Herein, the film refers to a thin film of a dense structure not including substantially any void. The thickness of the base material 30AE is 1 mm or less and preferably 1 μm to 1 mm, for example. When the base material 30AE is made of a soft material, such as resin, the thickness of the base material 30AE is more preferably 1 μm or greater and less than 0.2 mm. When the base material 30AE is made of a hard material, such as metal, the thickness of the base material 30AE is more preferably 1 μm or greater and less than 0.5 mm. The material of the base material 30AE is not limited particularly, and examples thereof are metals, such as Al, Cu, Ti, Ni, Sn, Au, Ag, and SUS and heat-resistance resins such as polyimide. When the base material 30AE is made of such a material, the temperature sensor 1AE can be used at high temperatures because of the high heat resistance thereof.

As illustrated in FIG. 5B, in the temperature sensor body 10AE, the particles 40AE made of the functional titanium oxide are dispersed in the base material 30AE. The temperature sensor body 10AE is obtained by adding the particles 40AE made of the functional titanium oxide to the base material 30AE, which is fluid, followed by mixing and shape forming, for example.

(Operation of Temperature Sensor)

The operations of the temperature sensor 1AE are the same as those of the temperature sensor 1AC according to the third embodiment (illustrated in FIGS. 3A and 3B). The temperature sensor 1AE is excellent in flexibility since the temperature sensor 1AE is a film with the base material 30AE being thin. The temperature sensor 1AE is easily attached to or laid on a curved surface.

(Effect of Temperature Sensor)

The temperature sensor 1AE exerts the same effects as those of the temperature sensor 1AC according to the third embodiment (illustrated in FIGS. 3A and 3B).

The temperature sensor 1AE is excellent in flexibility since the temperature sensor 1AE is a film with the base material 30AE being thin. The temperature sensor 1AE is attached to or laid on a curved surface more easily than the temperature sensor 1AC.

Sixth Embodiment

Figure 6A:
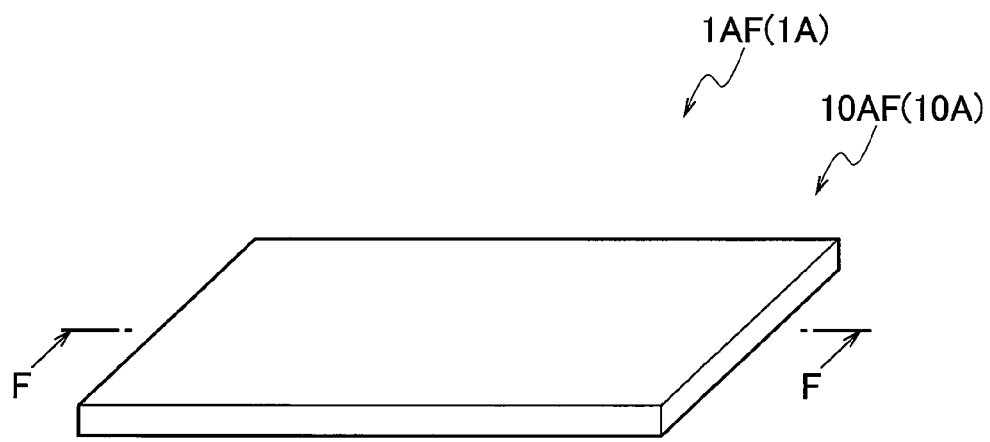
FIG. 6A is a schematic perspective view illustrating a temperature sensor according to a sixth embodiment.
Figure 6B:
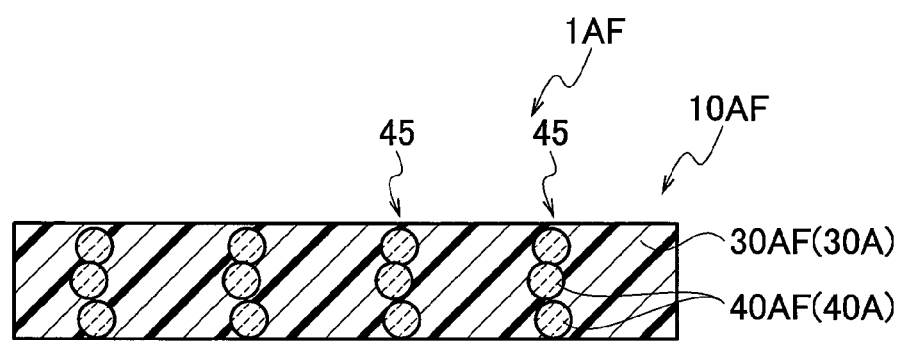
FIG. 6B is a schematic cross-sectional view along a line F-F of FIG. 6A.

FIG. 6A is a schematic perspective view illustrating a temperature sensor according to a sixth embodiment. FIG. 6B is a schematic cross-sectional view along a line F-F of FIG. 6A. A temperature sensor 1AF (1A) illustrated in FIGS. 6A and 6B includes a temperature sensor body 10AF (10A). The temperature sensor body 10AF includes a base material 30AF (30A) and a functional element 40AF (40A) contained in the base material 30AF.

The temperature sensor 1AF according to the sixth embodiment (illustrated in FIGS. 6A and 6B) is the same as the temperature sensor 1AE according to the fifth embodiment (illustrated in FIGS. 5A and 5B), excepting the configuration of the temperature sensor body 10AF. The same members of the temperature sensor 1AF according to the sixth embodiment (illustrated in FIGS. 6A and 6B) as those of the temperature sensor 1AE according to the fifth embodiment (illustrated in FIGS. 5A and 5B) are given the same reference symbols, and the description of the configurations and operations thereof are omitted or simplified.

(Temperature Sensor Body)

The temperature sensor body 10AF includes a base material 30AF and a functional element 40AF contained in the base material 30AF. The base material 30AF (illustrated in FIGS. 6A and 6B) has a plate shape, but the shape thereof is not limited particularly.

The base material 30AF is composed of the same film as that of the base material 30AE used in the temperature sensor 1AE according to the fifth embodiment (illustrated in FIGS. 5A and 5B).

In the temperature sensor body 10AF, the functional element 40AF is particles 40AF made of the functional titanium oxide, in a similar manner to the functional element 40AE used in the temperature sensor 1AE according to the fifth embodiment (illustrated in FIGS. 5A and 5B). The particles 40AF made of the functional titanium oxide can be the same as the particles 40AE, which is made of the functional titanium oxide and is used in the temperature sensor 1AE according to the fifth embodiment.

As illustrated in FIG. 6B, in the temperature sensor body 10AF, the particles 40AF made of the functional titanium oxide are interconnected in groups to form the functional-titanium-oxide-particle connected bodies 45. In the temperature sensor body 10AF, the particles 40AF made of the functional titanium oxide are contained in the base material 30AF in such a manner that the particles 40AF are interconnected in groups. The number of particles 40AF connected in each functional-titanium-oxide-particle connected body 45 is any value not less than two. In the example of FIG. 6B, the number of particles 40AF connected in each functional-titanium-oxide-particle connected body 45 is three.

As illustrated in FIG. 6B, the longitudinal direction of the functional-titanium-oxide-particle connected bodies 45 is vertical to the front and back surfaces of the temperature sensor body 10AF. The longitudinal direction of the functional-titanium-oxide-particle connected bodies 45 preferably extends in such a direction. This can improve the thermal conduction and electric conduction in the vertical direction to the front and back surfaces of the temperature sensor body 10AF and allow for quick observation of a change in temperature caused in the back surface from the front side. In each functional-titanium-oxide-particle connected body 45, two or more particles 40AF made of the functional titanium oxide, which provides higher thermal conduction and higher electric conduction than those of the resin constituting the base material 30AF, are connected to each other, and the thermal conduction and electric conduction are higher between the particles 40AF.

The functional-titanium-oxide-particle connected bodies 45 may be arranged (not illustrated) so that the longitudinal direction of the functional-titanium-oxide-particle connected bodies 45 corresponds to the horizontal direction in FIG. 6B, that is, is perpendicular to the direction vertical to the front and back surfaces of the temperature sensor body 10AF. The longitudinal direction of the functional-titanium-oxide-particle connected bodies 45 preferably extends in such a direction. This can improve the thermal conduction and electric conduction along the front surface of the temperature sensor body 10AF and therefore reduce variation in measurement from one location to another in the front surface of the temperature sensor body 10AF.

The temperature sensor body 10AF is obtained by injecting the functional-titanium-oxide-particle connected bodies 45 into the base material 30AF which is fluid, followed by shape forming, for example.

(Operation of Temperature Sensor)

The operations of the temperature sensor 1AF are the same as those of the temperature sensor 1AE according to the fifth embodiment (illustrated in FIGS. 5A and 5B). Since the temperature sensor 1AF includes the functional-titanium-oxide-particle connected bodies 45, the temperature sensor 1AF allows for more quick measurement of a change in temperature caused in the back surface, from the front side compared with the temperature sensor 1AE.

(Effect of Temperature Sensor)

The temperature sensor 1AF exerts the same effects as those of the temperature sensor 1AE according to the fifth embodiment (illustrated in FIGS. 5A and 5B).

In the temperature sensor 1AF, the temperature sensor body 10AF includes the functional-titanium-oxide-particle connected bodies 45. According to the temperature sensor 1AF, it is therefore possible to observe a change in temperature caused in the back surface, from the front side more quickly than the temperature sensor 1AE.

Seventh Embodiment

Figure 7A:
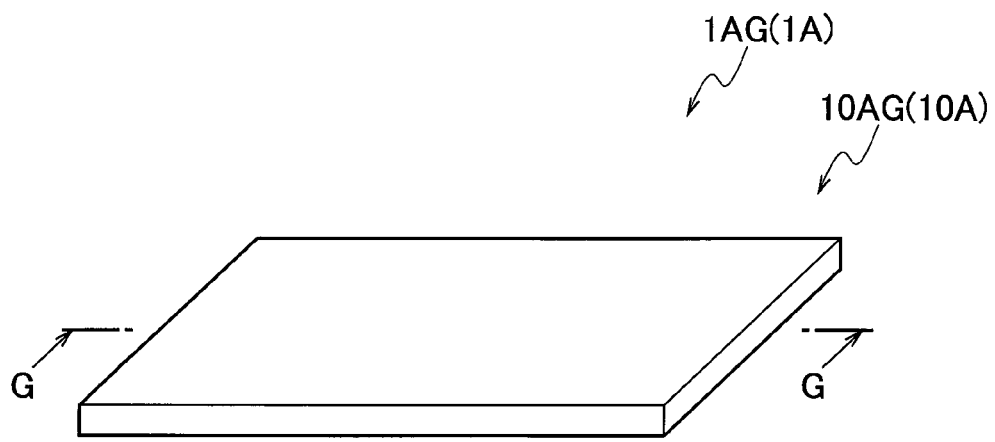
FIG. 7A is a schematic perspective view illustrating a temperature sensor according to a seventh embodiment.

FIG. 7A is a schematic perspective view illustrating a temperature sensor according to a seventh embodiment.

Figure 7B:
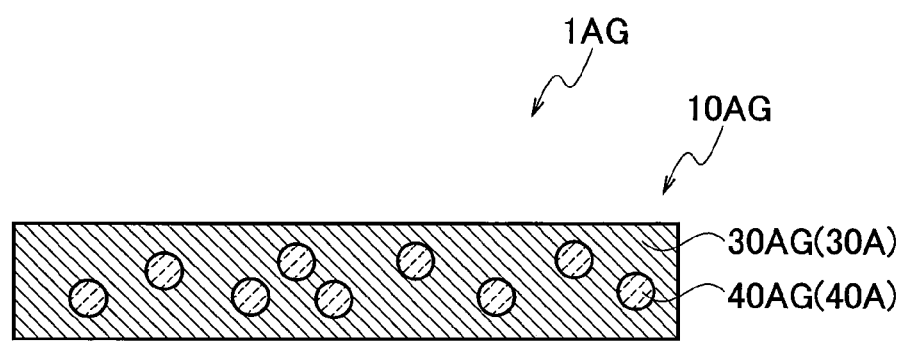
FIG. 7B is a schematic cross-sectional view along a line G-G of FIG. 7A.

FIG. 7B is a schematic cross-sectional view along a line G-G of FIG. 7A. A temperature sensor 1AG (1A) (illustrated in FIGS. 7A and 7B) includes a temperature sensor body 10AG (10A). The temperature sensor body 10AG includes a base material 30AG (30A) and a functional element 40AG (40A) contained in the base material 30AG.

The temperature sensor 1AG according to the seventh embodiment (illustrated in FIGS. 7A and 7B) is the same as the temperature sensor 1AC according to the third embodiment (illustrated in FIGS. 3A and 3B) excepting the configuration of the temperature sensor body 40AG. The same members of the temperature sensor 1AG according to the seventh embodiment (illustrated in FIGS. 7A and 7B,) as those of the temperature sensor 1AC according to the third embodiment (illustrated in FIGS. 3A and 3B) are given the same reference symbols, and the description of the configurations and operations thereof are omitted or simplified.
(Temperature Sensor Body)

The temperature sensor body 10AG includes the base material 30AG and the functional element 40AG contained in the base material 30AG.

The base material 30AG is a sheet made of woven or non-woven fabric. In this specification, sheets refer to woven or non-woven fabric. The material of the base material 30AG is not limited particularly, and examples thereof include glass fibers and carbon fibers. The base material 30AG is made of glass or carbon fiber woven fabric, glass or carbon fiber non-woven fabric, or the like, for example. When the base material 30AG is made of such a material, the temperature sensor 1AG can be used at high temperatures because of the high heat resistance thereof.

As illustrated in FIG. 7B, in the temperature sensor body 10AG, the particles 40AG made of the functional titanium oxide are dispersed in the base material 30AG. The particles 40AG made of the functional titanium oxide are dispersed in the base material 30AG in such a manner that the particles 40AG are trapped between fibers constituting the base material 30AG or fixed to the fibers constituting the base material 30AG, for example.

The temperature sensor body 10AG is obtained by immersing the base material 30AG in a solution or slurry including the particles 40AG made of functional titanium oxide and taking out the same so as to disperse and fix the particles 40AG made of the functional titanium oxide in voids between the fibers constituting the base material 30AG.
(Operation of Temperature Sensor)

The operations of the temperature sensor 1AG are the same as those of the temperature sensor 1AC according to the third embodiment (illustrated in FIGS. 3A and 3B). Since the base material 30AG is a sheet made of woven or non-woven fabric, the temperature sensor 1AG is excellent in flexibility. The temperature sensor 1AG is therefore easily attached to or laid on a curved surface.
(Effect of Temperature Sensor)

The temperature sensor 1AG exerts the same effects as those of the temperature sensor 1AC according to the third embodiment (illustrated in FIGS. 3A and 3B).

In addition, the base material 30AG is a sheet made of woven or non-woven fabric, and the temperature sensor 1AG is excellent in flexibility. The temperature sensor 1AG is therefore attached to or laid on a curved surface more easily than the temperature sensor 1AC.

Eighth Embodiment

Figure 8A:
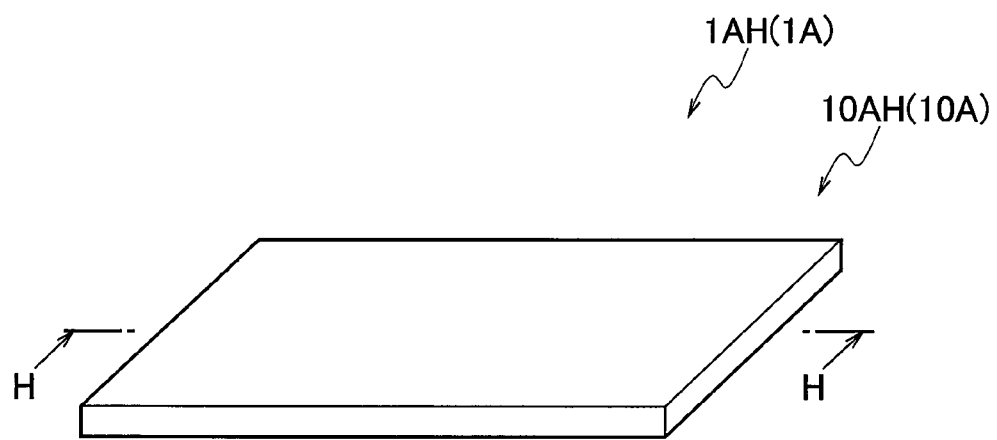
FIG. 8A is a schematic perspective view illustrating a temperature sensor according to an eighth embodiment.
Figure 8B:
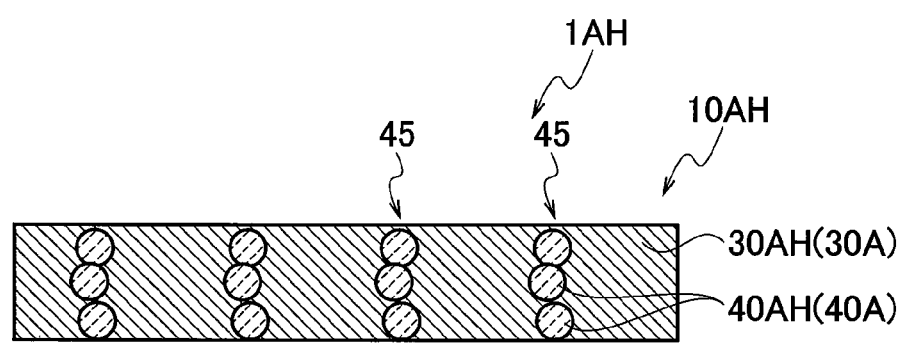
FIG. 8B is a schematic cross-sectional view along a line H-H of FIG. 8A.

FIG. 8A is a schematic perspective view illustrating a temperature sensor according to an eighth embodiment. FIG. 8B is a schematic cross-sectional view along a line H-H of FIG. 8A. A temperature sensor 1AH (1A) illustrated in FIGS. 8A and 8B includes a temperature sensor body 10AH (10A). The temperature sensor body 10AH includes a base material 30AH (30A) and a functional element 40AH (40A) contained in the base material 30AH.

The temperature sensor 1AH according to the eighth embodiment (illustrated in FIGS. 8A and 8B) is the same as the temperature sensor 1AG according to the seventh embodiment (illustrated in FIGS. 7A and 7B) excepting the configuration of the temperature sensor body 10AH. The same members of the temperature sensor 1AH according to the eighth embodiment (illustrated in FIGS. 8A and 8B) as those of the temperature sensor 1AG according to the seventh embodiment (illustrated in FIGS. 7A and 7B) are given the same reference symbols, and the description of the configurations and operations thereof are omitted or simplified.
(Temperature Sensor Body)

The temperature sensor body 10AH includes the base material 30AH and the functional element 40AH contained in the base material 30AH.

The base material 30AH is composed of the same sheet made of woven or non-woven fabric as that of the base material 30AG used in the temperature sensor 1AG according to the seventh embodiment (illustrated in FIGS. 7A and 7B).

In the temperature sensor body 10AH, the functional element 40AH is particles 40AH made of the functional titanium oxide, in a similar manner to the functional element 40AG used in the temperature sensor 1AG according to the seventh embodiment (illustrated in FIGS. 7A and 7B). The particles 40AH made of the functional titanium oxide can be the same as the particles 40AG made of the functional titanium oxide used in the temperature sensor 1AG according to the seventh embodiment.

As illustrated in FIG. 8B, in the temperature sensor body 10AH, the particles 40AH made of the functional titanium oxide are interconnected in groups to form the functional-titanium-oxide-particle connected bodies 45. In the temperature sensor body 10AH, the particles 40AH made of the functional titanium oxide are contained in the base material 30AH in such a manner that the particles 40AH are interconnected in groups. The functional-titanium-oxide-particle connected bodies 45 formed by interconnection of the particles 40AH made of the functional titanium oxide are trapped between fibers constituting the base material 30AH or fixed to the fibers constituting the material 30AH to be dispersed in the base material 30AH, for example.

The number of the particles 40AH interconnected in each functional-titanium-oxide-particle connected body 45 is any value not less than two. In the example of FIG. 8B, the number of particles 40AH interconnected in each functional-titanium-oxide-particle connected body 45 is three.

As illustrated in FIG. 8B, the longitudinal direction of the functional-titanium-oxide-particle connected bodies 45 is vertical to the front and back surfaces of the temperature sensor body 10AH. The longitudinal direction of the functional-titanium-oxide-particle connected bodies 45 preferably extends in such a direction. This can improve the thermal conduction and electric conduction in the perpendicular direction to the front and back surfaces of the temperature sensor body 10AH and allow for quick observation of a change in temperature caused in the back surface, from the front side. In each functional-titanium-oxide-particle connected body 45, two or more particles 40AH made of the functional titanium oxide, which provides higher thermal conduction and higher electric conduction than those of the resin constituting the base material 30AH, are connected each other, and the thermal conduction and electric conduction are higher between the particles 40AH.

The functional-titanium-oxide-particle connected bodies 45 may be arranged (not illustrated) so that the longitudinal direction of the functional-titanium-oxide-particle connected bodies 45 corresponds to the horizontal direction in FIG. 8B, that is, is perpendicular to the direction vertical to the front and back surfaces of the temperature sensor body 10AH. The longitudinal direction of the functional-titanium-oxide-particle connected bodies 45 preferably extends in such a direction. This can improve the thermal conduction and electric conduction along the front surface of the temperature sensor body 10AH and reduce variation in measurement from one location to another in the front surface of the temperature sensor body 10AH.

The temperature sensor body 10AH is obtained by immersing the base material 30AH in a solution or slurry including the functional-titanium-oxide-particle connected bodies 45 and taking out the same so that the functional-titanium-oxide-particle connected bodies 45 are fixed in voids between the fibers constituting the base material 30AH.

(Operation of Temperature Sensor)

The operations of the temperature sensor 1AH are the same as those of the temperature sensor 1AG according to the seventh embodiment (illustrated in FIGS. 7A and 7B). Since the temperature sensor body 10AH includes the functional-titanium-oxide-particle connected bodies 45, the temperature sensor 1AH allows for more quick observation of a change in temperature caused in the back surface, from the front side than the temperature sensor 1AG.

(Effect of Temperature Sensor)

The temperature sensor 1AH exerts the same effects as those of the temperature sensor 1AG according to the seventh embodiment (illustrated in FIGS. 7A and 7B).

In the temperature sensor 1AH, the temperature sensor body 10AH includes the functional-titanium-oxide-particle connected bodies 45. The temperature sensor 1AH therefore allows for quick observation of a change in temperature caused in the back surface from the front side, compared with the temperature sensor 1AG.

Ninth Embodiment

Figure 9:
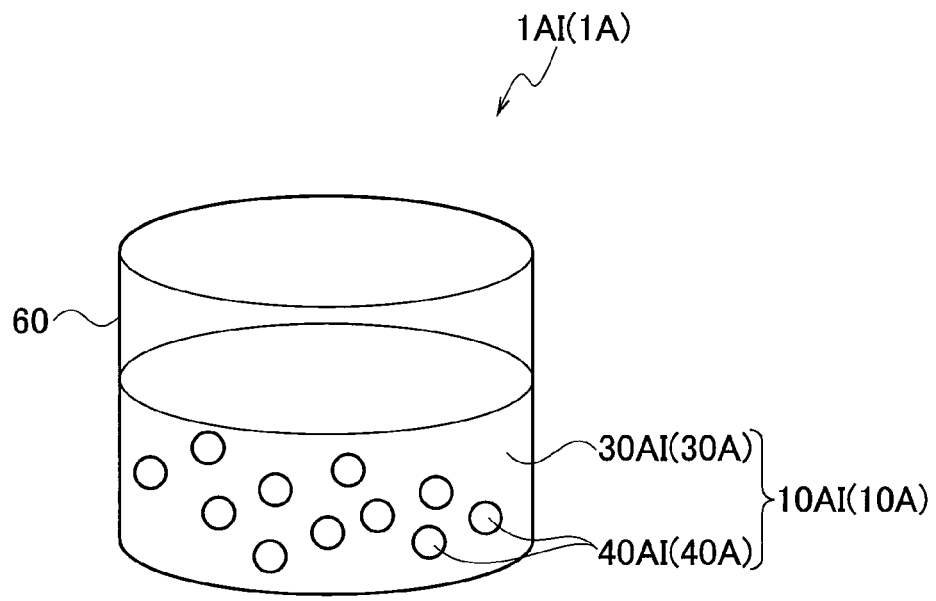
FIG. 9 is a schematic perspective view illustrating a temperature sensor according to a ninth embodiment.

FIG. 9 is a schematic perspective view illustrating a temperature sensor according to a ninth embodiment. A temperature sensor 1AI (1A) illustrated in FIG. 9 includes a temperature sensor body 10AI (10A). The temperature sensor body 10AI includes a base material 30AI (30A) and a functional element 40AI (40A) contained in the base material 30AI. The temperature sensor body 10AI is in the form of slurry or gel. The temperature sensor body 10AI, which is fluid, is accommodated in a container 60. The temperature sensor 1AI includes the temperature sensor body 10AI and the container 60 accommodating the temperature sensor body 10AI.

The temperature sensor 1AI according to the ninth embodiment (illustrated in FIG. 9) is the same as the temperature sensor 1AC according to the third embodiment (illustrated in FIGS. 3A and 3B) excepting the configuration of the temperature sensor body 10AI. The same members of the temperature sensor 1AI according to the ninth embodiment (illustrated in FIG. 9) as those of the temperature sensor 1AC according to the third embodiment (illustrated in FIGS. 3A and 3B) are given the same reference symbols, and the description of the configurations and operations thereof are omitted or simplified.

(Temperature Sensor Body)

The temperature sensor body 10AI includes the base material 30AI and the functional element 40AI contained in the base material 30AI.

The base material 30AI is liquid or gel. The material of the base material 30AI is not limited particularly, and examples thereof are publicly-known organic solvents and inorganic solvents. Examples of the inorganic solvents include water. It is preferred that the base material 30AI is made of an organic or inorganic solvent because when slurry including the base material 30AI and functional element 40AI is sprayed onto an object, the base material 30AI easily volatilizes while only the functional element 40AI is easily fixed to the object. When the base material 30AI is made of gel and the gel including the base material 30AI and functional element 40AI is sprayed onto an object, the functional element 40AI in the gel easily adheres to or is fixed to the object.

As illustrated in FIG. 9, in the temperature sensor body 10AI, the particles 40AI made of the functional titanium oxide are dispersed in the base material 30AI. The temperature sensor body 10AI is obtained by adding the particles 40AI made of the functional titanium oxide to the base material 30AI, followed by mixing, for example 1.

(Operation of Temperature Sensor)

The operations of the temperature sensor 1AI depend on whether the temperature sensor body 10AI includes the base material 30AI in the process of measuring the temperature of an object. Herein, the case where the temperature sensor body 10AI includes the base material 30AI in the process of measuring the temperature of an object includes a case where the temperature sensor body 10AI is used flowing within the object, such as a pipe, for example. The case where the temperature sensor body 10AI does not include the base material 30AI in the process of measuring the temperature of an object includes a case where the temperature sensor body 10AI is sprayed onto the object for use to vaporize the base material 30AI while fixing only the functional element 40AI.

The operations of the temperature sensor 1AI in the case where the temperature sensor body 10AI includes the base material 30AI in the process of measuring the temperature of an object are substantially the same as those of the temperature sensor 1AC according to the third embodiment (illustrated in FIGS. 3A and 3B). This is because the base material 30A is interposed between the temperature sensor 1AI and the object. The description of the operations in this case is omitted. The temperature sensor body 10AI is suitably used flowing within the object, such as a pipe, for temperature measurement. This allows for temperature measurement in sections where it is difficult to measure temperature from the outside of the pipe.

The operations of the temperature sensor 1AI in the case where the temperature sensor body 10AI does not include the base material 30AI in the process of measuring the temperature of the object are substantially the same as those of the temperature sensor 1AA according to the first embodiment illustrated in FIG. 1. This is because the base material 30A is not interposed between the temperature sensor 1AI and the object. The description of the operations in this case is omitted. The temperature sensor 1AI is suitably used in such a manner that the temperature sensor body 10AI is sprayed onto the object to vaporize the base material 30AI while fixing only the functional element 40AI. This allows for temperature measurement of just the section on which the temperature sensor body 10AI is sprayed.

(Effect of Temperature Sensor)

The temperature sensor 1AI exerts the same effects as those of the temperature sensor 1AA according to the first embodiment (illustrated in FIG. 1) or the temperature sensor 1AC according to the third embodiment (illustrated in FIGS. 3A and 3B).

10th Embodiment

Figure 10:
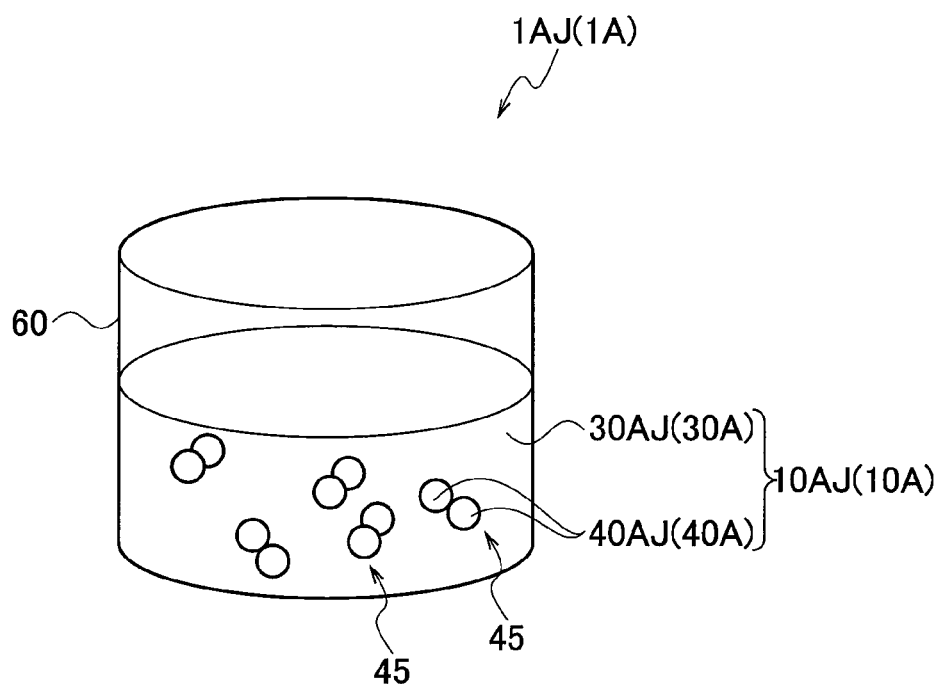
FIG. 10 is a schematic perspective view illustrating a temperature sensor according to a 10th embodiment.

FIG. 10 is a schematic perspective view illustrating a temperature sensor according to a 10th embodiment. A temperature sensor 1AJ (1A) illustrated in FIG. 10 includes a temperature sensor body 10AJ (10A). The temperature sensor body 10AJ includes a base material 30AJ (30A) and a functional element 40AJ (40A) contained in the base material 30AJ.

The temperature sensor 1AJ according to the 10th embodiment (illustrated in FIG. 10) is the same as the temperature sensor 1AI according to the ninth embodiment (illustrated in FIG. 9), excepting the configuration of the temperature sensor body 10AJ. The same members of the temperature sensor 1AJ according to the 10th embodiment (illustrated in FIG. 10) as those of the temperature sensor 1AI according to the ninth embodiment (illustrated in FIG. 9) are given the same reference symbols, and the description of the configurations and operations thereof are omitted or simplified.

(Temperature Sensor Body)

The temperature sensor body 10AJ includes the base material 30AJ and the functional element 40AJ contained in the base material 30AJ.

The base material 30AJ is the same as the base material 30AI used in the temperature sensor 1AI according to the ninth embodiment (illustrated in FIG. 9).

In the temperature sensor body 10AJ, the functional element 40AJ is particles 40AJ made of the functional titanium oxide, in a similar manner to the functional element 40AI used in the temperature sensor 1AI according to the ninth embodiment (illustrated in FIG. 9). The particles 40AJ made of the functional titanium oxide may be the same as the particles 40AI made of the functional titanium oxide used in the temperature sensor 1AI according to the ninth embodiment (illustrated in FIG. 9).

As illustrated in FIG. 10, in the temperature sensor body 10AJ, the particles 40AJ made of the functional titanium oxide are interconnected in groups to form the functional-titanium-oxide-particle connected bodies 45. In the temperature sensor body 10AJ, the particles 40AJ made of the functional titanium oxide are contained in the base material 30AJ so as to be interconnected in groups. The number of particles 40AJ connected in each functional-titanium-oxide-particle connected body 45 is any value not less than two. In the example of FIG. 10, the number of particles 40AJ connected in each functional-titanium-oxide-particle connected body 45 is two.

The temperature sensor body 10AJ is obtained by adding the functional-titanium-oxide-particle connected bodies 45 which are composed of the particles 40AJ made of the functional titanium oxide and interconnected in groups, to the base material 30AJ, followed by mixing, for example.

(Operation of Temperature Sensor)

The operations of the temperature sensor 1AJ are the same as those of the temperature sensor 1AI according to the ninth embodiment (illustrated in FIG. 9).

(Effect of Temperature Sensor)

The temperature sensor 1AJ exerts the same effects as those of the temperature sensor 1AI according to the ninth embodiment (illustrated in FIG. 9).

11th Embodiment

Figure 11:
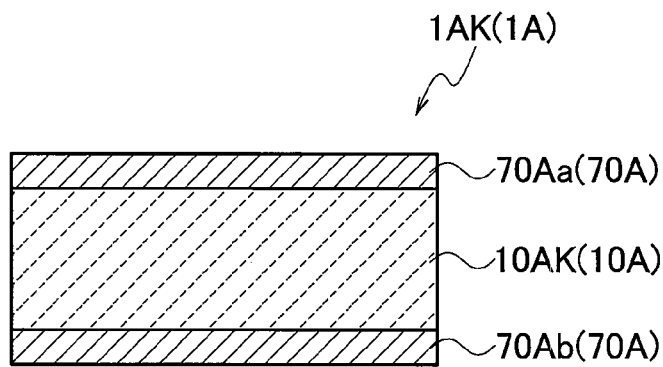
FIG. 11 is a schematic perspective view illustrating a temperature sensor according to an 11th embodiment.

FIG. 11 is a schematic cross-sectional view illustrating a temperature sensor according to an 11th embodiment. A temperature sensor 1AK (1A) illustrated in FIG. 11 includes a temperature sensor body 10AK (10A) and electrodes 70Aa and 70Ab (70A), which are in contact with the temperature sensor body 10AK. Specifically, the temperature sensor 1AK includes the temperature sensor body 10AK and, additionally, the two electrodes 70Aa and 70Ab, which are in contact with the temperature sensor body 10AK.

The temperature sensor body 10AK (10A) (illustrated in FIG. 11) has any shape. The shape of the temperature sensor body 10AK (10A) may be a cylindrical shape like the temperature sensor body 10AA (illustrated in FIG. 1) or a plate shape like the temperature sensor body 10AC (illustrated in FIG. 3A).

As illustrated in FIG. 11, the electrodes 70Aa and 70Ab are provided so as to sandwich the temperature sensor body 10AK. The electrodes 70Aa and 70Ab have any shape. The electrodes 70A which are in contact with the temperature sensor body 10AK can include two or more electrodes 70A (not illustrated).

The temperature sensor body 10AK constituting the temperature sensor 1AK is not limited particularly. Examples of the temperature sensor body 10AK include the temperature sensor bodies 10AA to 10AH, which constitute the temperature sensors 1AA to 1AH of the aforementioned first to eighth embodiments, respectively.

The material of the electrodes 70 constituting the temperature sensor 1AK is not limited particularly. Examples thereof are metals such as Al, Ag, and Au, conducting oxides such as ITO, conducting polymers, and carbon materials such as graphite.

(Operations of Temperature Sensor)

As described above, β-phase trititanium pentoxide (β-$Ti_3O_5$), λ-phase trititanium pentoxide (λ-$Ti_3O_5$), and titanium dioxide ($TiO_2$) have different electric conductivities. For example, β-phase trititanium pentoxide (β-$Ti_3O_5$) has an electric conductivity in the same range as that of many semiconductors while λ-phase trititanium pentoxide (λ-$Ti_3O_5$) has an electric conductivity in the same range as that of many metals. Titanium dioxide ($TiO_2$) has an electric conductivity in the same range as that of many insulators. Such differences in electric conductivity are maintained after the functional titanium oxide is cooled to room temperature.

The temperature sensor 1AK uses the electrodes 70Aa and 70Ab (70A) in contact with the temperature sensor body 10AK to measure the electric conductivity of the functional element 40A constituting the temperature sensor body 10AK. The temperature sensor 1AK thereby functions as a temperature sensor.

(Effect of Temperature Sensor)

The temperature sensor 1AK exerts the same effects as those of the temperature sensor 1AA (illustrated in FIG. 1) or the temperature sensor 1AC according to the third embodiment by using the electrodes 70A to measure the electric conductivity of the functional element 40A constituting the temperature sensor body 10AK.

12th Embodiment

Figure 12:
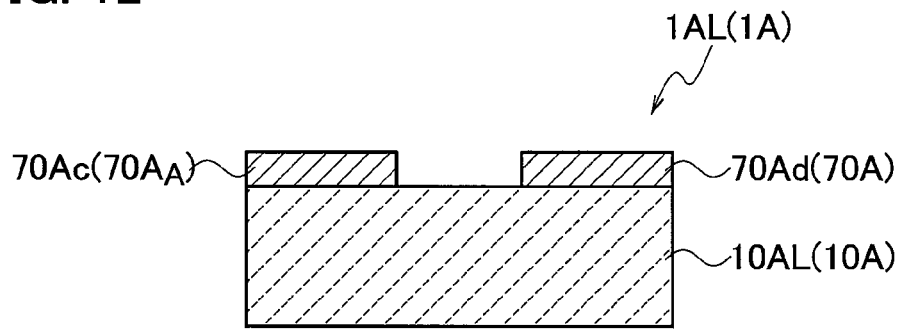
FIG. 12 is a schematic perspective view illustrating a temperature sensor according to a 12th embodiment.

FIG. 12 is a schematic cross-sectional view illustrating a temperature sensor according to a 12th embodiment. A temperature sensor 1AL (1A) (illustrated in FIG. 12) includes a temperature sensor body 10AL (10A) and electrodes 70Ac and 70Ad (70A), which are in contact with the temperature sensor body 10AL. Specifically, the temperature sensor 1AL includes the temperature sensor body 10AL and, additionally, the two electrodes 70Ac and 70Ad which are in contact with the temperature sensor body 10AL.

The temperature sensor body 10AL (10A) (illustrated in FIG. 12) has any shape. The shape of the temperature sensor body 10AL (10A) may be a cylindrical shape like the temperature sensor body 10AA (illustrated in FIG. 1) or a plate shape like the temperature sensor body 10AC (illustrated in FIG. 3A).

As illustrated in FIG. 12, the electrodes 70Ac and 70Ad are provided so as to sandwich the temperature sensor body 10AL. The electrodes 70Ac and 70Ad have any shape. The electrodes 70A which are in contact with the temperature sensor body 10AL can include two or more electrodes 70A (not illustrated).

The temperature sensor body 10AL constituting the temperature sensor 10AL is the same as the temperature sensor body 10AK constituting the temperature sensor 1AK of the aforementioned 11th embodiment, for example.
(Effect of Temperature Sensor)
The effects of the temperature sensor 1AL are the same as those of the temperature sensor 1AK according to the 11th embodiment (illustrated in FIG. 11).
(Effect of Temperature Sensor)
The temperature sensor 1AL exerts the same effects as those of the temperature sensor 1AK according to the 11th embodiment (illustrated in FIG. 11).

13th Embodiment

Figure 13:
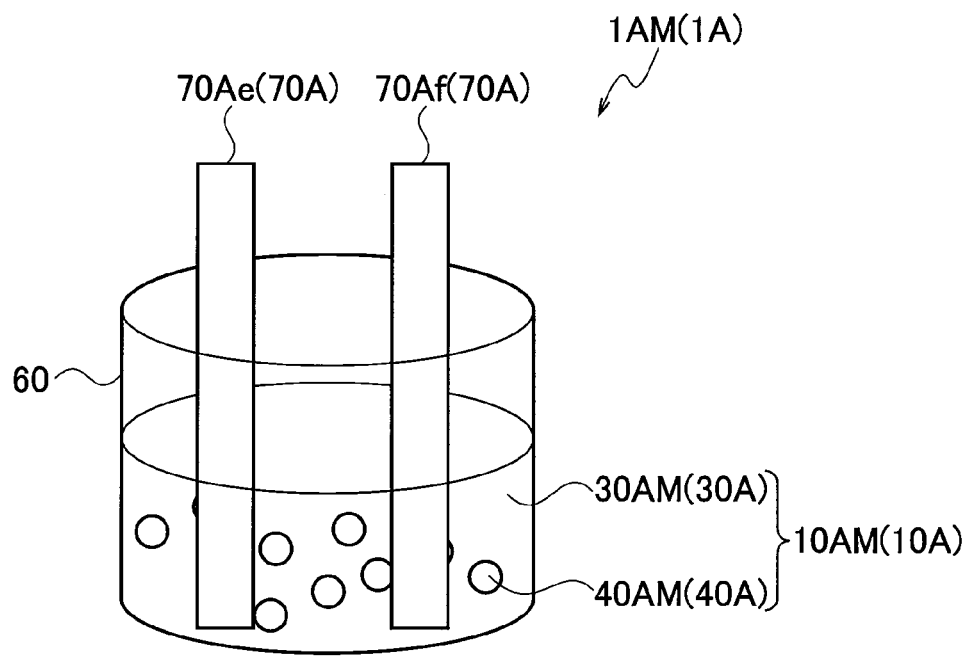
FIG. 13 is a schematic perspective view illustrating a temperature sensor according to a 13th embodiment.

FIG. 13 is a schematic perspective view illustrating a temperature sensor according to a 13th embodiment. A temperature sensor 1AM (1A) (illustrated in FIG. 13) includes a temperature sensor body 10AM (10A) and electrodes 70Ae and 70Af (70A) which are in contact with the temperature sensor body 10AM. Specifically, the temperature sensor 1AM includes the temperature sensor body 10AM and additionally the two electrodes 70Ae and 70Af, which are in contact with the temperature sensor body 10AM. As illustrated in FIG. 13, the electrodes 70Ae and 70Af are partially immersed in the temperature sensor body 10AM. The electrodes 70A which are in contact with the temperature sensor body 10AM can include two or more electrodes 70A, which are not illustrated.

The temperature sensor body 10AM includes a base material 30AM (30A) and a functional element 40AM (40A) contained in the base material 30AM. The temperature sensor body 10AM is in the form of slurry or gel. The temperature sensor body 10AM, which is fluid, is accommodated in the container 60. The temperature sensor 1AM includes the temperature sensor body 10AM and the container 60 accommodating the temperature sensor body 10AM.

The temperature sensor 1AM according to the 13th embodiments (illustrated in FIG. 13) includes the electrodes 70Ae and 70Af (70A) which are in contact with the temperature sensor body 10AM, in addition to the temperature sensor 1AI according to the ninth embodiment (illustrated in FIG. 9). The configuration of the temperature sensor 1AM is the same as that of the temperature sensor 1AI according to the ninth embodiment (illustrated in FIG. 9), excepting the configuration of the electrodes 70Ae and 70Af (70A). The description of the configurations other than the electrodes 70Ae and 70Af (70A) is omitted.

The material and operations of the electrodes 70Ae and 70Af (70A) are the same as those of the electrodes 70Aa and 70Ab (70A) of the temperature sensor 1AK according to the 11th embodiment (illustrated in FIG. 11) although the shape thereof is different. The description of the electrodes 70Ae and 70Af is omitted.
(Operation of Temperature Sensor)
The operations of the temperature sensor 1AM integrate the operations of the temperature sensor 1AI according to the ninth embodiment (illustrated in FIG. 9) and the operations of the temperature sensor 1AK according to the 11th embodiment (illustrated in FIG. 11). The description of the operations is omitted.
(Effect of Temperature Sensor)
The temperature sensor 1AM exerts the same effects as those of the temperature sensor 1AI according to the ninth embodiment (illustrated in FIG. 9) and the temperature sensor 1AK according to the 11th embodiment (illustrated in FIG. 11).

Modification of 13th Embodiment

In the temperature sensor body 10AM of the temperature sensor 1AM according to the 13th embodiment (illustrated in FIG. 13), the particles 40AM made of the functional titanium oxide are dispersed in the base material 30AM in a similar manner to the temperature sensor body 10AI of the temperature sensor 1AI according to the ninth embodiment (illustrated in FIG. 9).

As a modification of the 13th embodiment, the temperature sensor body 10AJ of the temperature sensor 1AJ according to the 10th embodiment (illustrated in FIG. 10) may be used instead of the temperature sensor body 10AM. As the modification of the 13th embodiment, in the temperature sensor 10A, the particles 40A made of the functional titanium oxide may be contained in the base material 30A so as to be interconnected in groups.

The operations of the temperature sensor according to the modification integrate the operations of the temperature sensor 1AJ according to the 10th embodiment, (illustrated in FIG. 10) and the operations of the temperature sensor 1AK according to the 11th embodiment, (illustrated in FIG. 11). The description of the effects is omitted.
(Effect of Temperature Sensor)
The temperature sensor 1AM exerts the same effects as those of the temperature sensor 1AJ according to the 10th embodiment (illustrated in FIG. 10) and the temperature sensor 1AK according to the 11th embodiment (illustrated in FIG. 11).
(Second Temperature Sensor)
Next, a second temperature sensor is described.
(Temperature Sensor)

14th Embodiment

Figure 19:
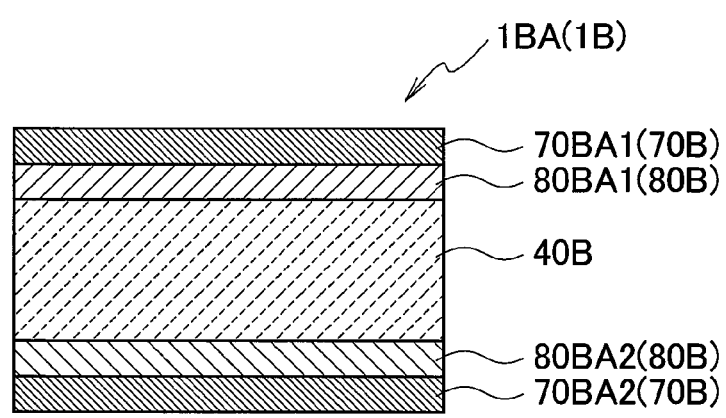
FIG. 19 is a schematic cross-sectional view illustrating a temperature sensor according to a 14th embodiment.

FIG. 19 is a schematic cross-sectional view illustrating a temperature sensor according to a 14th embodiment. A temperature sensor 1BA (1B) illustrated in FIG. 19 includes: a functional element 40B; electrodes 70BA1 and 70BA2, which are each provided at least a part of the surface of the functional element 40B; and a thermal stress relaxing layers 80BA1 and 80BA2, which are provided between the functional element 40B and respective electrodes 70B.

(Functional Element)

The functional element 40B is an element that changes in physical property with changes in temperature. Specifically, the functional element 40B is an element made of functional titanium oxide that changes in physical property with variation in crystalline structure of crystal grains due to changes in temperature. Examples of the physical property that changes with changes in temperature include one or more of electric conductivity and color. The functional titanium oxide needs to change in crystalline structure of crystal grains with at least changes in temperature and may change in crystalline structure of crystal grains with changes in condition other than changes in temperature. In addition to changes in temperature, the functional titanium oxide normally changes in crystalline structure of crystal grains in response to changes in light, pressure, and current applied to the functional titanium oxide and therefore changes in physical property.

Figure 16:
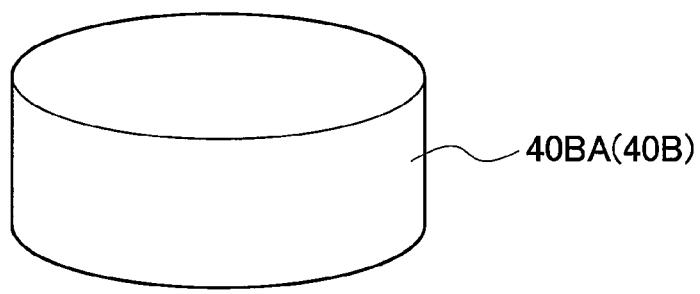
FIG. 16 is a schematic perspective view illustrating a functional element example.
Figure 17:
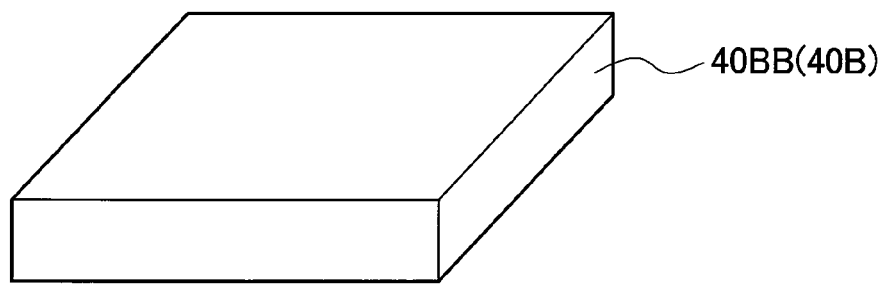
FIG. 17 is a schematic perspective view illustrating another functional element example.
Figure 18:
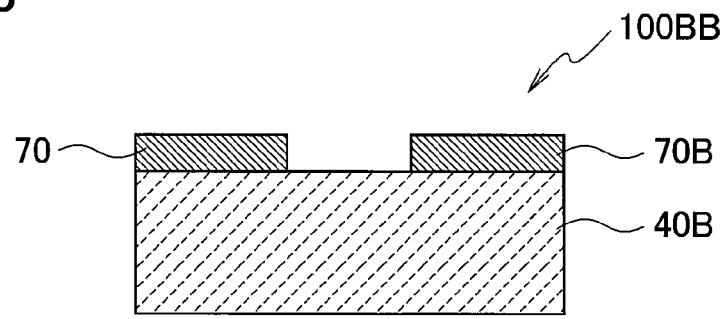
FIG. 18 is a schematic cross-sectional view illustrating another conventional temperature sensor example.

The functional element 40B is made of substantially only the functional titanium oxide. The minimum unit functioning as the functional titanium oxide is nanoparticles composed of crystal grains of the functional titanium oxide as described later. However, nanoparticles are difficult to handle. The functional titanium oxide is therefore normally powder composed of polycrystal of nanoparticles of crystal grains. On the other hand, the functional element 40B used in the temperature sensor 1BA needs to be large enough for the electrodes 70B to be formed on the surface thereof. The electrodes 70B cannot be formed on the surface if the functional element 40B is powder composed of polycrystal. Accordingly, the functional element 40B is normally composed of a compact or a thin film made of powder of polycrystal of the functional titanium oxide. Examples of such a compact include a pellet obtained by compressing powder of polycrystal of the functional titanium oxide, for example. The compact may be a molded body shaped using a mold. The functional element 40B has any shape. Examples of the shape of the functional element 40B include a cylindrical shape illustrated in FIG. 16 and a rectangular plate shape illustrated in FIG. 17.

The thickness of the functional element 40B is not limited particularly. When the functional element 40B has a shape other than thin-film form, such as a compact, the thickness of the functional element 40B is normally 0.01 to 10 mm and preferably 0.05 to 1.0 mm. The thickness of the functional element 40B, such as a compact, is preferably in the aforementioned range. This facilitates mechanical shape forming. When the functional element 40B is a thin film, the thickness of the functional element 40B is normally 0.01 to 10 μm and preferably 0.1 to 1.0 μm. The thickness of the thin-film functional element 40B is preferably in the aforementioned range so that less voltage is required in the process of applying electric current to change the crystalline structure, for example.

(Functional Titanium Oxide)

The functional titanium oxide as the material of the functional element 40B is the same as the functional titanium oxide as the material of the functional element 40A of the first temperature sensor, and the description thereof is omitted.

(Operation of Functional Element)

The functional element 40B is a pellet of powder of the functional titanium oxide and is made of the functional titanium oxide. The operations of the functional element 40B are the same as those of the functional titanium oxide. In the functional element 40B, when the crystalline structure of the crystal grains constituting the functional titanium oxide changes due to heating, the crystalline structure of the crystal grains having changed is maintained even after the functional element 40 is cooled.

When the functional element 40B including crystal grains of β-phase trititanium pentoxide at room temperature is heated to a temperature of not lower than 190° C. and lower than 350° C., for example, at least a portion of a large number of the crystal grains constituting the functional element 40B changes to λ-phase trititanium pentoxide at the heating. The crystal grains of λ-phase trititanium pentoxide generated at the heating are maintained in the functional element 40B even after the functional element 40B is cooled to room temperature.

When the functional element 40B at room temperature is heated to a temperature of not lower than 350° C. and not higher than 450° C., at least a portion of the large number of crystal grains constituting the functional titanium oxide of functional element 40B changes from λ- or β-phase trititanium pentoxide to titanium dioxide at the heating. Crystal grains of β-phase trititanium pentoxide undergo phase transition into crystal grains of λ-phase trititanium pentoxide and then further change into titanium dioxide. The crystal grains of titanium dioxide generated at heating are maintained in the functional element 40B even after the functional element 40B is cooled to room temperature.

When the functional element 40B at room temperature is heated to a temperature of higher than 450° C. and lower than 550° C., most of the large number of crystal grains constituting the functional element 40B change to crystal grains of titanium dioxide. The crystal grains of titanium dioxide generated at the heating are maintained in the functional element 40B after the functional element 40B is cooled to room temperature.

When the functional element 40B at room temperature is heated to a temperature of 550° C. or higher, substantially all of the large number of crystal grains constituting the functional titanium oxide which constitutes the functional element 40B change to crystal grains of titanium dioxide. The crystal grains of titanium dioxide generated at heating are preserved as the crystal grains of titanium dioxide in the functional element 40B after the functional element 40B is cooled to room temperature.

β-phase trititanium pentoxide, λ-phase trititanium pentoxide, and titanium dioxide described above are different in physical properties. In terms of color as the physical properties, for example, β-phase trititanium pentoxide, λ-phase trititanium pentoxide, and titanium dioxide are different in color, which are red, blue, and white, respectively. When the functional element 40B is red, it is found that the functional element 40B was heated to a temperature in a temperature range lower than 190° C. When the functional element 40B is blue, it is found that the functional element 40B was heated to a temperature in a temperature range not lower than 190° C. and lower than 350°. When the functional element 40B is white, it is found that the functional element 40B was heated to a temperature in a temperature range not lower than 350° C. The functional element 40B can be therefore used as a temperature sensor. The color is evaluated visually or evaluated based on an adsorption spectrum of the functional element 40B.

In terms of electric conductivity among the physical properties, for example, β-phase trititanium pentoxide, λ-phase trititanium pentoxide, and titanium dioxide are different in electric conductivity. For example, β-phase trititanium pentoxide has an electric conductivity in the same range as that of many semiconductors while the λ-phase trititanium pentoxide has an electric conductivity in the same range as that of many metals. Titanium dioxide has an electric conductivity in the same range as that of many insulators. Such differences in electric conductivity are maintained after the functional titanium oxide is cooled to room temperature. Measurement of the electric conductivity of the functional element 40B shows that the functional element 40B was heated to a temperature in a temperature range lower than 190° C., a temperature range not lower than 190° C. and lower than 350° C., or a temperature range not lower than 350° C., respectively. The functional element 40B can be therefore used as a temperature sensor.

Changes in crystalline structure of the functional titanium oxide constituting the functional element 40B, including β-phase trititanium pentoxide, λ-phase trititanium pentoxide, and titanium dioxide, are substantially not influenced by the atmosphere in which the functional element 40B is used. For example, the functional element 40B can be used in an atmosphere, such as air, oxygen atmosphere, or nitrogen atmosphere.

(Electrode)

The temperature sensor 1BA includes the electrodes 70BA1 and 70BA2 (70B). The electrodes 70B are electrically connected to the surface of the functional element 40B through the thermal stress relaxing layers 80B which are conducting. As described above, the functional element 40B changes in physical property, such as electric conductivity, with variation in crystalline structure of crystal grains due to changes in temperature. The electrodes 70BA1 and 70BA2 are members to detect the electric conductivity of the functional element 40B change with variation in crystalline structure of the crystal grains due to changes in temperature.

The electrodes 70BA1 and 70BA2 are provided at least a part of the surface of the functional element 40B. Specifically, the electrode 70BA1 is provided on the surface of the functional element 40B (on the upper side in FIG. 19) with the thermal stress relaxing layer 80BA1 interposed therebetween. The electrode 70BA2 is provided on the surface of the functional element 40B (on the lower side in FIG. 19) with the thermal stress relaxing layer 80BA2 interposed therebetween.

In the cross section illustrated in FIG. 19, the thermal stress relaxing layers 80BA1 and 80BA2 are provided so as to cover the entire surfaces (the upper and lower surfaces in FIG. 19) of the functional element 40B. However, the thermal stress relaxing layers 80BA1 and 80BA2 are unnecessarily provided in sections of the surfaces of the functional element 40B on the front and rear sides of the page in FIG. 19. In other words, the thermal stress relaxing layers 80BA1 and 80BA2 are provided on at least part of the surfaces (on the upper and lower sides in FIG. 19) of the functional element 40B.

The electrodes 70BA1 and 70BA2 are made of one or more materials selected from a group consisting of metals, conducting oxides, carbon materials, and conducting polymers, for example. The metals are Al, Ag, Au, Cu, Pt, and the like. The conducting oxides are ITO (indium tin oxide) and the like. The carbon materials are graphite (black lead) and the like. The conducting polymers are polythiophene polymers, polyaniline polymers, polyacetylene polymers, and the like. The electrodes 70B are preferably made of the aforementioned materials to facilitate electric conduction between the functional element 40B and the electrodes 70B.

The thickness of the electrodes 70BA1 and 70BA2 is not limited particularly and is normally 0.01 to 1000 μm and preferably 0.1 to 100 μm. The electrodes 70BA1 and 70BA2 preferably have thicknesses within the aforementioned range so that the electrodes ensure electric conduction.

(Thermal Stress Relaxing Layer)

The thermal stress relaxing layers 80BA1 and 80BA2 are provided between the functional element 40B and the electrodes 70BA1 and 70BA2, respectively. Specifically, the thermal stress relaxing layer 80BA1 is provided between the functional element 40B and electrode 70BA1 while the thermal stress relaxing layer 80BA2 is provided between the functional element 40B and electrode 70BA2.

In the cross section illustrated in FIG. 19, the thermal stress relaxing layers 80BA1 and 80BA2 are provided so as to cover the entire surfaces (all of the upper and lower surfaces in FIG. 19) of the functional element 40B. However, the thermal stress relaxing layers 80BA1 and 80BA2 are unnecessarily provided in sections of the surfaces of the functional element 40B on the front and rear sides of the page in FIG. 19. In other words, the thermal stress relaxing layers 80BA1 and 80BA2 are provided on at least part of the surfaces (the upper and lower surfaces in FIG. 19) of the functional element 40B.

The thermal stress relaxing layers 80BA1 and 80BA2 are layers that are electrically conducting and relax thermal stress generated between the functional element 40B and electrodes 70BA1 and 70BA2, respectively. Herein, the thermal stress generated between the functional element 40B and electrodes 70B refers to thermal stress generated due to a difference between the thermal expansion coefficients of the functional element 40B and the electrodes 70B. The thermal stress generated between the functional element 40B and electrodes 70B is generated when the temperature sensor 1BA is heated or cooled.

The thermal stress relaxing layers 80BA1 and 80BA2 are made of one or more materials selected from a group consisting of metals, conducting oxides, carbon materials, and conducting polymers, for example. The metals are Al, Ag, Au, Cu, Pt, and the like. The conducting oxides are ITO (indium tin oxide) and the like. The carbon materials are graphite (black lead) and the like. The conducting polymers are polythiophene polymers, polyaniline polymers, polyacetylene polymers, and the like. The thermal stress relaxing layers 80B are preferably made of the aforementioned materials because the difference in thermal expansion coefficient between the functional element 40B and thermal stress relaxing layers 80B tend to be small. Herein, the difference in thermal expansion coefficient refers to a difference in linear or volume expansion coefficient between the functional element 40B and thermal stress relaxing layers 80B.

The thermal expansion coefficient of the thermal stress relaxing layers 80BA1 and 80BA2 is preferably not less than that of the electrodes 70B and not greater than that of the functional element 40B. This enables the thermal stress relaxing layers 80BA1 and 80BA2 to efficiently relax thermal stress generated between the functional element 40B and electrodes 70B.

Specifically, it is preferable that $CTE_A$, $CTE_B$, and $CTE_C$ satisfy the following formula (1) where $CTE_A$, $CTE_B$, and $CTE_C$ are the thermal expansion coefficients (1/K) of the functional element 40B, the electrodes 70B, and the thermal stress relaxing layers 80, respectively.

$$CTE_B \leq CTE_C \leq CTE_A \tag{1}$$

Herein, the thermal expansion coefficients $CTE_A$, $CTE_B$, and $CTE_C$ are a linear expansion coefficient α or a volume expansion coefficient β. In the formula (1), when $CTE_A$ is a linear expansion coefficient $\alpha_A$, $CTE_B$ and $CTE_C$ are linear expansion coefficients $\alpha_B$ and $\alpha_C$, respectively. In the formula (1), when $CTE_A$ is a volume expansion coefficient $\beta_A$, $CTE_B$ and $CTE_C$ are volume expansion coefficients $\beta_B$ and $\beta_C$, respectively.

It is preferred that the thermal expansion coefficient $CTE_A$ of the functional element 40B, the thermal expansion coefficient $CTE_B$ of the electrodes 70B, and the thermal expansion coefficient $CTE_C$ of the thermal stress relaxing layers 80B satisfy the relationship of the formula (1). This can reduce the thermal stress generated between the functional element 40B and electrodes 70B.

The thickness of the thermal stress relaxing layers 80BA1 and 80BA2 is not limited particularly. The thickness thereof is normally 0.01 to 1000 μm and preferably 0.1 to 100 μm. The thickness of the thermal stress relaxing layers 80BA1 and 80BA2 is preferably within the aforementioned range so that the thermal stress relaxing layers 80BA1 and 80BA2 relax the thermal stress while ensuring the electric conduction thereof.

(Operation of Temperature Sensor)

The operations of the temperature sensor 1BA are described. The functional element 40B constituting the temperature sensor 1BA is made of the functional titanium oxide and changes in physical property, such as electric conductivity, with variation in crystalline structure of crystal grains due to changes in temperature. The operations of the functional element 40B are the same as described in "Effect of Functional Element" above.

Specifically, a number of crystal grains constituting the functional element 40B of the temperature sensor 1BA are normally β-phase trititanium pentoxide when the functional element 40B has not been heated to temperatures of not lower than 190° C. in the thermal history. When the functional element 40B is heated to a temperature of 190° C. or higher and lower than 350° C., at least a portion of the large number of crystal grains constituting the functional element 40B normally changes from β- to λ-phase trititanium pentoxide. When the functional element 40 is heated to a temperature of not lower than 350° C. and not higher than 450° C., at least a portion of the large number of crystal grains of λ-phase trititanium pentoxide changes in crystalline composition into crystal grains of titanium dioxide. The functional element 40B heated to a temperature of higher than 450° C. and lower than 550° C. normally includes mainly crystal grains of titanium dioxide and also includes very small amounts of crystal grains of λ- and β-phase trititanium pentoxides. The large number of crystal grains constituting the functional element 40B of the temperature sensor 1BA maintains the crystalline structure thereof at the maximum temperature after cooling.

The functional titanium oxide of the functional element 40B can include crystal grains of one or more of β- and λ-phase trititanium pentoxides in the temperature ranges lower than 190° C., not lower than 190° C. and lower than 350° C., and not lower than 350° C. and not higher than 450° C. as described above. On the other hand, the functional titanium oxide substantially does not include crystal grains of λ- and β-phase trititanium pentoxides in the temperature range higher than 450° C. and lower than 550° C. The functional titanium oxide thus substantially includes crystal grains of one or more of β- and λ-phase trititanium pentoxides at temperatures of not higher than 450° C.

Among the crystal grains of the functional titanium oxide constituting the functional element 40B of the temperature sensor 1BA, crystal grains of β-phase trititanium pentoxide, λ-phase trititanium pentoxide, and titanium dioxide described above have different electric conductivities. For example, crystal grains of β-phase trititanium pentoxide have an electric conductivity in the same range as that of many semiconductors while crystal grains of λ-phase trititanium pentoxide have an electric conductivity in the same range as that of many metals. Crystal grains of titanium dioxide have an electric conductivity in the same range as that of many insulators. Such differences in electric conductivity are maintained after the functional element 40B is cooled to room temperature. When the electric conductivity of the functional element 40 is measured after heating by using the electrodes 70B in the temperature sensor 1BA, therefore, it is found that the maximum temperature of the functional element 40B is in a temperature range lower than 190° C., a temperature range not lower than 190° C. and lower than 350° C., or a temperature range not lower than 350° C. The temperature sensor 1BA is useful as an inexpensive temperature sensor capable of measuring the maximum temperature in the thermal history. By measuring the electric conductivity of the functional element 40B during heating, the temperature sensor 1BA is also able to measure the maximum temperature in the thermal history of the functional element 40B in real time.

The functional element 40B, electrodes 70B, and thermal stress relaxing layers 80B constituting the temperature sensor 1BA, expand or shrink at different rates according to the respective thermal expansion coefficients thereof by heating or cooling. Among the aforementioned 40B, electrodes 70B, and thermal stress relaxing layers 80B, the functional element 40B and electrodes 70B generally have a large difference in thermal expansion coefficient. This produces large thermal stress acting between the functional element 40B and electrodes 70B. In a conventional temperature sensor fabricated by providing the functional element 40B directly on the electrodes 70B, heating and cooling thereof are likely to separate the electrodes 70B from the functional element 40B or produce cracks in the functional element 40B and electrodes 70B.

In the temperature sensor 1BA according to the 14th embodiment, thermal stress relaxing layers 80B, which relax thermal stress, are provided between the functional element 40B and respective electrodes 70B. This can reduce thermal stress generated between the functional element 40B and electrodes 70B. According to the temperature sensor 1BA, heating and cooling are less likely to separate the functional element 40B from the electrodes 70B or produce cracks in the functional element 40B and electrodes 70B.

Furthermore, in the temperature sensor 1BA, the electrodes 70BA1 and 70BA2 are provided so as to sandwich the functional element 40B. This facilitates measuring a change in electric conductivity of a section between the front and rear surfaces of the functional element 40B.

(Effect of Temperature Sensor)

According to the temperature sensor 1BA, it is possible to measure temperature by using changes in physical property due to variations in the crystalline structure of crystal grains of the functional titanium oxide constituting the functional element 40B.

The functional titanium oxide constituting the functional element 40B is inexpensive. According to the temperature sensor 1BA, it is therefore possible to provide an inexpensive temperature sensor.

According to the temperature sensor 1BA, heating and cooling are less likely to separate the functional element 40B from the electrodes 70B and produce cracks in the functional element 40B and electrodes 70B.

According to the temperature sensor 1BA, it is possible to measure temperature in a high-temperature range not lower than 350° C. According to the temperature sensor 1BA, it is therefore possible to measure temperature in electric furnaces, switchboards, and the like, which require temperature measurement in a high-temperature range not lower than 350° C.

According to the temperature sensor 1BA, the electrodes 70BA1 and 70BA2 are provided so as to sandwich the functional element 40B. This facilitates measuring changes in electric conductivity in a section between the front and rear surfaces of the functional element 40B.

Modification of 14th Embodiment

The temperature sensor 1BA according to the 14th embodiment (illustrated in FIG. 19) includes the thermal stress relaxing layers 80BA1 and 80BA2. However, when large thermal stress cannot be produced between the functional element 40B and electrodes 70B for a certain reason, such as the temperature distribution of the functional element 40B, the temperature sensor 1BA may be configured to not include one of the thermal stress relaxing layers 80BA1 and 80BA2 as a modification. According to the modification of the 14th embodiment, it is possible to fabricate a temperature sensor at lower cost than that of the temperature sensor 1BA according to the 14th embodiment.

15th Embodiment

Figure 20:
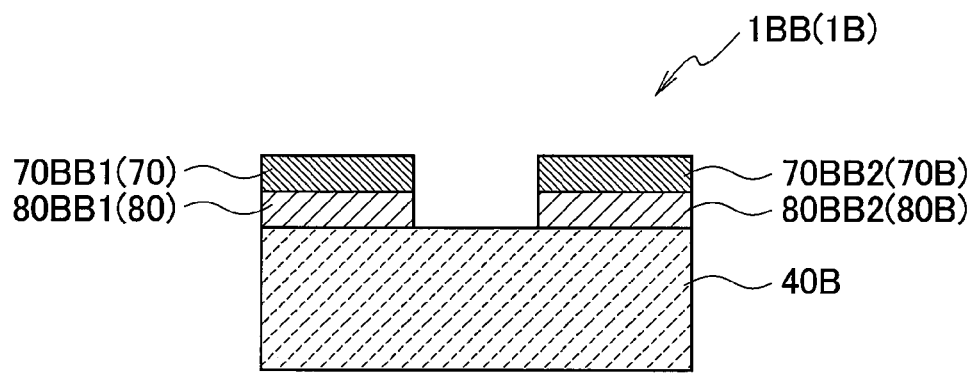
FIG. 20 is a schematic cross-sectional view illustrating a temperature sensor according to a 15th embodiment.

FIG. 20 is a schematic cross-sectional view illustrating a temperature sensor according to a 15th embodiment. A temperature sensor 1BB according to the 15th embodiment (illustrated in FIG. 20) is the same as the temperature sensor 1BA according to the 14th embodiment (illustrated in FIG. 19), excepting the arrangement of the electrodes 70B and thermal stress relaxing layers 80B. The same members of the temperature sensor 1BB according to the 15th embodiment (illustrated in FIG. 20) as those of the temperature sensor 1BA according to the 14th embodiment (illustrated in FIG. 19) are given the same reference symbols, and the description of the configurations and operations thereof are omitted or simplified.

(Electrode)

The temperature sensor 1BB includes electrodes 70BB1 and 70BB2 (70B). The electrodes 70B are electrically connected to the surface of the functional element 40B through the thermal stress relaxing layers 80B, which are electrically conducting.

The electrodes 70BB1 and 70BB2 are provided at least a part of the surface of the functional element 40B. Specifically, the electrodes 70BB1 and 70BB2 are provided on the surface (on the upper side in FIG. 20) of the functional element 40B apart from each other. The electrode 70BB1 is provided on the surface (on the upper side in FIG. 20) of the functional element 40B with the thermal stress relaxing layer 80BB1 interposed therebetween while the electrode 70BB2 is provided on the surface (on the upper side in FIG. 20) of the functional element 40B with the thermal stress relaxing layer 80BB2 interposed therebetween.

The material and thickness of the electrodes 70BB1 and 70BB2 are the same as those of the electrodes 70BA1 and 70BA2 of the temperature sensor 1BA according to the 14th embodiment (illustrated in FIG. 19), and the description thereof is omitted.

(Thermal Stress Relaxing Layer)

The thermal stress relaxing layers 80BB1 and 80BB2 are provided between the functional element 40B and the electrodes 70BB1 and 70BB2, respectively. Specifically, the thermal stress relaxing layer 80BB1 is provided between the functional element 40B and electrode 70BB1 while the thermal stress relaxing layer 80BB2 is provided between the functional element 40B and electrode 70BB2.

The material and thickness of the thermal stress relaxing layers 80BB1 and 80BB2 are the same as those of the thermal stress relaxing layers 80BA1 and 80BA2 of the temperature sensor 1BA according to the 14th embodiment (illustrated in FIG. 19), and the description thereof is omitted.

(Operation of Temperature Sensor)

The operations of the temperature sensor 1BB are described. The operations of the temperature sensor 1BB are the same as those of the temperature sensor 1BA (illustrated in FIG. 19), excepting the different operation due to the difference of the arrangement of the electrodes 70BB1 and 70BB2 and thermal stress relaxing layers 80BB1 and 80BB2 from that of the temperature sensor 1BA. Hereinafter, a description is given of the operation due to the difference of the arrangement of the electrodes 70BB1 and 70BB2 and thermal stress relaxing layers 80BB1 and 80BB2 from that of the temperature sensor 1BA.

In the temperature sensor 1BB according to the 15th embodiment, in a similar manner to the temperature sensor 1BA according to the 14th embodiment, the thermal stress relaxing layers 80B (80BB1, 80BB2) to relax thermal stress are provided between the functional element 40B and the respective electrodes 70B (70BB1, 70BB2). In the temperature sensor 1BB, similarly to the temperature sensor 1BA according to the 14th embodiment, thermal stress generated between the functional element 40B and electrodes 70B is relaxed. According to the temperature sensor 1BB, heating and cooling are less likely to separate the functional element 40B from the electrodes 70B or produce cracks in the functional element 40B and electrodes 70B.

In the temperature sensor 1BB, the electrodes 70BA1 and 70BA2 are provided on one of the surfaces of the functional element 40B. This facilitates fabrication of the electrodes 70B and facilitates employment of four-terminal sensing that allows for precise measurement.

(Effect of Temperature Sensor)

According to the temperature sensor 1BB, it is possible to measure temperature by using changes in physical property due to variation in the crystalline structure of crystal grains of the functional titanium oxide constituting the functional element 40B in a similar manner to the temperature sensor 1BA according to the 14th embodiment.

The functional titanium oxide constituting the functional element 40B is inexpensive. According to the temperature sensor 1BB, it is therefore possible to provide an inexpensive temperature sensor in a similar manner to the temperature sensor 1BA according to the 14th embodiment.

According to the temperature sensor 1BB, in a similar manner to the temperature sensor 1BA according to the 14th embodiment, heating and cooling are less likely to separate the functional element 40B from the electrodes 70B or produce cracks in the functional element 40B and electrodes 70B.

According to the temperature sensor 1BB, in a similar manner to the temperature sensor 1BA according to the 14th embodiment, it is possible to measure temperature in a high-temperature range not lower than 350° C. According to the temperature sensor 1BA, it is therefore possible to measure temperature in electric furnaces, switchboards, and the like, which require temperature measurement in a high-temperature range not lower than 350° C.

According to the temperature sensor 1BB, the electrodes 70BA1 and 70BA2 are provided on one of the surfaces of the functional element 40B. This facilitates fabrication of the electrodes 70B and facilitates employment of four-terminal sensing that enables precise measurement.

Modification of 15th Embodiment

The temperature sensor 1BB according to the 15th embodiment (illustrated in FIG. 20) includes the thermal stress relaxing layers 80BB1 and 80BB2. However, when large thermal stress cannot be produced between the functional element 40B and electrodes 70B for a certain reason, such as the temperature distribution of the functional element 40B, the temperature sensor 1BB may be configured to not include one of the thermal stress relaxing layers 80BB1 and 80BB2 as a modification. According to the modification of the 15th embodiment, it is therefore possible to fabricate a temperature sensor at lower cost than the temperature sensor 1BB according to the 15th embodiment.

16th Embodiment

Figure 21:
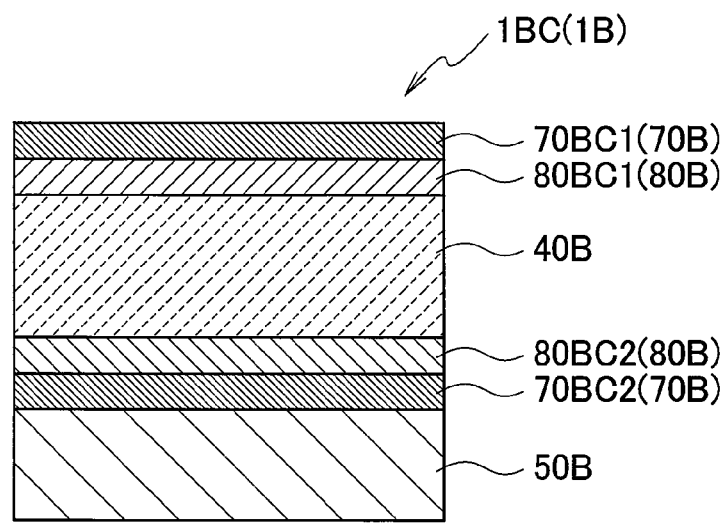
FIG. 21 is a schematic cross-sectional view illustrating a temperature sensor according to a 16th embodiment.

FIG. 21 is a schematic cross-sectional view illustrating a temperature sensor according to a 16th embodiment. The temperature sensor 1BC according to the 16th embodiment (illustrated in FIG. 21) is the same as the temperature sensor 1BA according to the 14th embodiment (illustrated in FIG. 19), excepting that the temperature sensor 1BC further includes a substrate 50B laid on the surface of one of the electrodes 70B. The same members of the temperature sensor 1BC according to the 16th embodiment (illustrated in FIG. 21) as those of the temperature sensor 1BA according to the 14th embodiment (illustrated in FIG. 19) are given the same reference symbols, and the description of the configurations and operations thereof are omitted or simplified.

A temperature sensor 1BC includes: the functional element 40B; electrodes 70BC1 and 70BC2 (70B) which are provided at least a part of the surface of the functional element 40B; and a thermal stress relaxing layers 80BC1 and 80BC2 (80B) which are provided between the functional element 40B and respective electrodes 70B. The temperature sensor 1BC further includes the substrate 50B. The substrate 50B is laid on the surface of the electrode 70BC2.

The functional element 40B, electrodes 70BC1 and 70BC2, and thermal stress relaxing layers 80BC1 and 80BC2 of the temperature sensor 1BC are the same as the functional element 40B, the electrodes 70BA1 and 70BA2, and thermal stress relaxing layers 80BA1 and 80BA2 of the temperature sensor 1BA, respectively. The description of the configurations thereof is omitted.

(Substrate)

The substrate 50B serves as the base to form the electrode 70BC2, functional element 40B, and the like at manufacturing of the temperature sensor 1BC. The substrate 50B includes the operations to give mechanical strength to the temperature sensor 1BC and control the properties such as thermal conduction and electric conduction.

The substrate 50B is made of one or more materials selected from a group consisting of glass, semiconductors, oxides, metals, resins, and fibers, for example. Such semiconductors are Si, SiC, GaN, and the like. Such oxides are inorganic oxides, such as sapphire, Nb—SrTiO$_3$, and La—SrTiO$_3$, and the like. Nb—SrTiO$_3$ and La—SrTiO$_3$ are strontium titanium oxides doped with Nb or La, respectively, and are conducting oxides. The metals are Al, Cu, Ti, Ni, Sn, Au, Ag, SUS, and the like. The resins are polyimide and the like. The fibers are glass fibers or carbon fibers. The substrate 50B is preferably made of the aforementioned materials. This facilitates formation of the electrodes 70B, functional element 40B, and the like and facilitates fabrication of a large number of identical elements on the same substrate.

Nb—SrTiO$_3$ and La—SrTiO$_3$ are electrically conducting. When the substrate 50B is made of Nb—SrTiO$_3$ or La—SrTiO$_3$, the temperature sensor 1BC may be configured as a temperature sensor configured to not include at least one of the electrode 70BC2 and thermal stress relaxing layer 80BC2 as a modification of the temperature sensor 1BC.

The thickness of the substrate 50B, which is not limited particularly, is normally 0.1 to 5.0 mm and preferably 0.2 to 0.8 mm. The thickness of the substrate 50B is preferably within this range so that the substrate 50B has high mechanical strength and is easily used in processing apparatuses.

(Manufacturing Method)

The temperature sensor 1BC can be manufactured by sequentially forming, on the surface of the substrate 50B, the electrode 70BC1, the thermal stress relaxing layer 80BC2, the functional element 40B, the thermal stress relaxing layer 80BC1, and the electrode 70BC1, for example.

(Operation of Temperature Sensor)

The operations of the temperature sensor 1BC are described. The operations of the temperature sensor 1BC are the same as those of the temperature sensor 1BA according to the 14th embodiment (illustrated in FIG. 19), excepting the operation due to provision of the substrate 50B. A description is given of only the operation due to the configuration in which the temperature sensor 1BC further includes the substrate 50B, and the description of the other operations is omitted.

In the temperature sensor 1BC, the substrate 50B is laid on the surface of the electrode 70BC2. The temperature sensor 1BC is manufactured easily because of including the substrate 50B. The temperature sensor 1BC is given mechanical strength because of including the substrate 50B. The thermal conduction, electric conduction, and the like of the temperature sensor 1BC can be controlled by adjusting the material and thickness of the substrate 50B.

(Effect of Temperature Sensor)

The temperature sensor 1BC exerts the same effects as those of the temperature sensor 1BA according to the 14th embodiment.

The temperature sensor 1BC is easily manufactured because of including the substrate 50B. The temperature sensor 1BC has high mechanical strength because of including the substrate 50B. According to the temperature sensor 1BC, it is possible to control the thermal conduction, electric conduction, and the like by adjusting the material and thickness of the substrate 50B.

Modification of 16th Embodiment

The temperature sensor 1BC according to a 16th embodiment (illustrated in FIG. 21) includes the thermal stress relaxing layers 80BC1 and 80BC2. However, when large thermal stress cannot be produced between the functional element 40B and electrodes 70B for a certain reason, such as the temperature distribution of the functional element 40B, the temperature sensor 1BC may be configured to not include one of the thermal stress relaxing layers 80BC1 and 80BC2 as a modification. According to the modification of the 16th embodiment, it is possible to fabricate a temperature sensor at lower cost than that of the temperature sensor 1BC according to the 16th embodiment.

17th Embodiment

Figure 22:
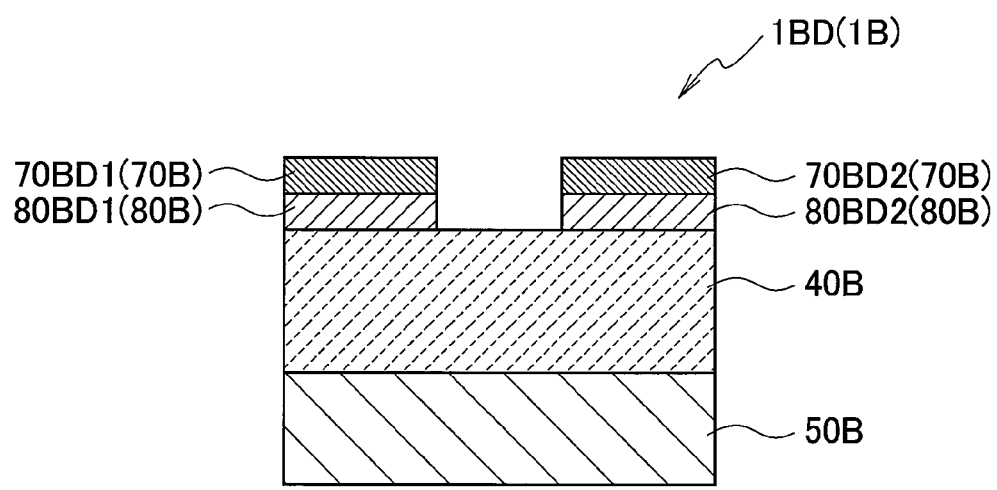
FIG. 22 is a schematic cross-sectional view illustrating a temperature sensor according to a 17th embodiment.

FIG. 22 is a schematic cross-sectional view illustrating a temperature sensor according a 17th embodiment. The temperature sensor 1BD according to the 17th embodiment (illustrated in FIG. 22) is the same as the temperature sensor 1BB according to the 15th embodiment (illustrated in FIG. 20), excepting that the temperature sensor 1BD further includes the substrate 50B laid on the exposed surface of the functional element 40B on which the electrodes 70B are not formed. The same members of the temperature sensor 1BD according to the 17th embodiment (illustrated in FIG. 22) as those of the temperature sensor 1BB according to the 15th embodiment (illustrated in FIG. 20) are given the same reference symbols, and the description of the configurations and operations thereof are omitted or simplified.

The temperature sensor 1BD includes: the functional element 40B; electrodes 70BD1 and 70BD2 (70B) which are provided on at least a part of the surface of the functional element 40B; and a thermal stress relaxing layers 80BD1 and 80BD2 (80B) which are provided between the functional element 40B and respective electrodes 70B.

Specifically, the electrodes 70BD1 and 70BD2 are provided on the surface of the functional element 40B on the upper side in FIG. 22, apart from each other. More specifically, in the temperature sensor 1BD, the thermal stress relaxing layers 80BD1 and 80BD2 are provided apart from each other on the surface (on the upper side in FIG. 22) of the functional element 40B. The electrode 70BD1 is provided on the surface (on the upper side in FIG. 22) of the functional element 40B with the thermal stress relaxing layer 80BD1 interposed therebetween while the electrode 70BD2 is provided on the surface (on the upper side in FIG. 22) of the functional element 40B with the thermal stress relaxing layer 80BD2 interposed therebetween.

The temperature sensor 1BD further includes the substrate 50B. The substrate 50B is laid on the exposed surface (on the lower side in FIG. 22) of the functional element 40 on which the electrodes 70B are not formed.

The functional element 40B, electrodes 70BD1 and 70BD2, and thermal stress relaxing layers 80BD1 and 80BD2 of the temperature sensor 1BD are the same as the functional element 40B, electrodes 70BB1 and 70BB2, and thermal stress relaxing layers 80BB1 and 80BB2 of the temperature sensor 1BB, respectively. The description of the configurations thereof is omitted.

The substrate 50B is the same as the substrate 50B of the temperature sensor 1BC according to the 16th embodiment (illustrated in FIG. 21). The description of the substrate 50B is omitted.

(Manufacturing Method)

The temperature sensor 1BD can be manufactured by sequentially forming, on the surface of the substrate 50B, the functional element 40B, the thermal stress relaxing layers 80BD1 and 80BD2, and the electrodes 70BD1 and 70BD2, for example.

(Operation of Temperature Sensor)

The operations of the temperature sensor 1BD are described. The operations of the temperature sensor 1BD are the same as those of the temperature sensor 1BB according to the 15th embodiment (illustrated in FIG. 20), excepting the operation due to the configuration in which the temperature sensor 1BD further includes the substrate 50B. A description is given of only the operation due to the configuration in which the temperature sensor 1BC further includes the substrate 50B, and the description of the other operations is omitted.

In the temperature sensor 1BD, the substrate 50B is laid on the surface (on the lower side in FIG. 22) of the functional element 40B. The temperature sensor 1BD is manufactured easily because of including the substrate 50B. The temperature sensor 1BD is given mechanical strength because of including the substrate 50B. The thermal conduction, electric conduction, and the like of the temperature sensor 1BD can be controlled by adjusting the material and thickness of the substrate 50B.

(Effect of Temperature Sensor)

The temperature sensor 1BD exerts the same effects as those of the temperature sensor 1BB according to the 15th embodiment.

The temperature sensor 1BD is easily manufactured because of including the substrate 50B. The temperature sensor 1BD has high mechanical strength because of including the substrate 50B. According to the temperature sensor 1BD, it is possible to control the thermal conduction, electric conduction, and the like by adjusting the material and thickness of the substrate 50B.

Modification of 17th Embodiment

The temperature sensor 1BD according to the 17th embodiment (illustrated in FIG. 21) includes the thermal stress relaxing layers 80BD1 and 80BD2. However, when large thermal stress cannot be produced between the functional element 40B and the electrodes 70B for a certain reason, such as the temperature distribution of the functional element 40B, the temperature sensor 1BD may be configured to not include one of the thermal stress relaxing layers 80BD1 and 80BD2 as a modification. According to the modification of the 17th embodiment, it is therefore possible to fabricate a temperature sensor at lower cost than that of the temperature sensor 1BD according to the 17th embodiment.

18th Embodiment

Figure 23:
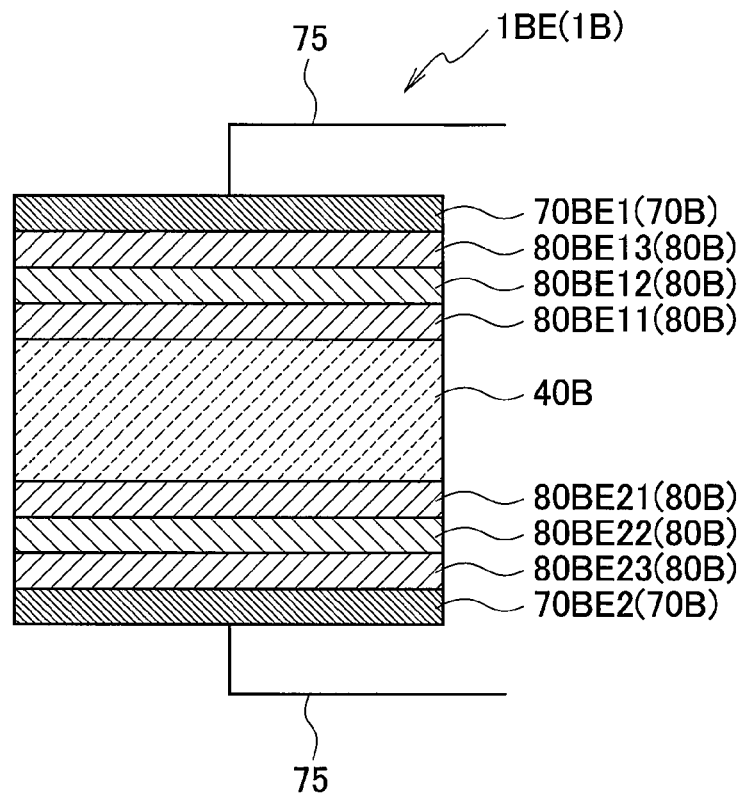
FIG. 23 is a schematic cross-sectional view illustrating a temperature sensor according to an 18th embodiment.

FIG. 23 is a schematic cross-sectional view illustrating a temperature sensor according to an 18th embodiment. A temperature sensor 1BE according to the 18th embodiment (illustrated in FIG. 23) is different from the temperature sensor 1BA according to the 14th embodiment (illustrated in FIG. 19) in that a plurality of thermal stress relaxing layers 80BB are provided in the interface between the functional element 40B and each of the electrodes 70BE1 and 70BE2 (70B). The temperature sensor 1BE according to the 18th embodiment is also different from the temperature sensor 1BA according to the 14th embodiment in that the electrodes 70B connect to respective leads 75.

The temperature sensor 1BE according to the 18th embodiment is the same as the temperature sensor 1BA according to the 14th embodiment excepting the aforementioned two differences. The same members of the temperature sensor 1BE according to the 18th embodiment (illustrated in FIG. 23) as those of the temperature sensor 1BA according to the 14th embodiment (illustrated in FIG. 19) are given the same reference symbols, and the description of the configurations and operations thereof are omitted or simplified.

The temperature sensor 1BE includes the plurality of thermal stress relaxing layers 80B provided between the functional element 40B and each of the electrodes 70BE1 and 70BE2 (70B), which are each provided on at least a part of the corresponding surface of the functional element 40B. Specifically, the electrode 70BE1 is provided on the surface (on the upper side in FIG. 23) of the functional element 40B with three thermal stress relaxing layers 80BE11, 80BE12, and 80BE13 interposed therebetween. The electrode 70BE2 is provided on the surface (on the lower side in FIG. 23) of the functional element 40B, with three thermal stress relaxing layers 80BE21, 80BE22, and 80BE23 interposed therebetween. In the example illustrated in FIG. 23, the number of thermal stress relaxing layers 80B interposed between the functional element 40B and each electrode 70B is three. In the temperature sensor 1BE, the number of thermal stress relaxing layers 80B interposed between the functional element 40B and each electrode 70B is any value not less than two.

The functional element 40B and electrodes 70BE1 and 70BE2 of the temperature sensor 1BE are the same as the functional element 40B and electrodes 70BA1 and 70BA2 of the temperature sensor 1BA according to the 14th embodiment, respectively. The description of the configurations thereof is omitted.

The six thermal stress relaxing layers 80BE11, 80BE12, 80BE13, 80BE21, 80BE22, and 80BE23, which are provided for the temperature sensor 1BE, include the same material, thermal expansion coefficient, and thickness as those of the thermal stress relaxing layers 80BA1 and 80BA2 of the temperature sensor 1BA (illustrated in FIG. 19). For example, it is preferred that the thermal expansion coefficients of the thermal stress relaxing layers 80BE11, 80BE12, 80BE13, 80BE21, 80BE22, and 80BE23 individually satisfy the aforementioned formula (1). The description of the material, thermal expansion coefficient, and thickness of the thermal stress relaxing layers 80BE11, 80BE12, 80BE13, 80BE21, 80BE22, and 80BE23 of the temperature sensor 1BE is omitted.

The thermal expansion coefficient of the plural thermal stress relaxing layers 80B of the temperature sensor 1BE are preferably as follows. Specifically, the thermal expansion coefficient of the thermal stress relaxing layer 80B closer to the functional element 40B has a numerical value closer to that of the functional element 40B while the thermal expansion coefficient of the thermal stress relaxing layer 80B closer to the electrode 70B has a numerical value closer to that of the electrode 70B.

The leads 75 can be publicly-known leads.

(Operation of Temperature Sensor)

The operations of the temperature sensor 1BE are described. The operations of the temperature sensor 1BE are the same as those of the temperature sensor 1BA (illustrated in FIG. 19), excepting the operations due to the configuration in which the plural thermal stress relaxing layers 80B are interposed between the functional element 40B and each electrode 70B and the configuration in which the electrodes 70B connect to the respective leads 75. Hereinafter, the description is given of only the operations due to the configuration in which the plural thermal stress relaxing layers 80B are interposed between the functional element 40B and each electrode 70B and the configuration in which the electrodes 70B connect to the leads 75, and the description of the other operations is omitted.

The temperature sensor 1BE includes the plural thermal stress relaxing layers 80B between the functional element 40B and each electrode 70B. It is therefore possible to finely control the value of the thermal expansion coefficient and the thickness of each thermal stress relaxing layer 80B. In the temperature sensor 1BE, the differences in thermal expansion coefficient can be easily reduced between the thermal stress relaxing layers 80B adjacent to each other, between the functional element 40B and thermal stress relaxing layers 80B adjacent thereto, and between the electrodes 70B and thermal stress relaxing layers 80B adjacent thereto, by controlling the thermal expansion coefficient and thickness of each thermal stress relaxing layer 80B, for example.

In the temperature sensor 1BE, it is therefore possible to finely control thermal stress between the thermal stress relaxing layers 80B adjacent to each other, between the functional element 40B and thermal stress relaxing layers 80B adjacent thereto, and between the electrodes 70B and thermal stress relaxing layers 80B adjacent thereto.

In the temperature sensor 1BE, current flowing in the electrodes 70BE1 and 70BE2 is outputted to the outside through the leads 75.

(Effect of Temperature Sensor)

The temperature sensor 1BE exerts the same effects as those of the temperature sensor 1BA according to the 14th embodiment.

According to the temperature sensor 1BE, it is possible to finely control the thermal stress between the thermal stress relaxing layers 80B adjacent to each other, between the functional element 40B and thermal stress relaxing layers 80B adjacent thereto, and between the electrodes 70B and thermal stress relaxing layer 80B adjacent thereto.

19th Embodiment

Figure 24:
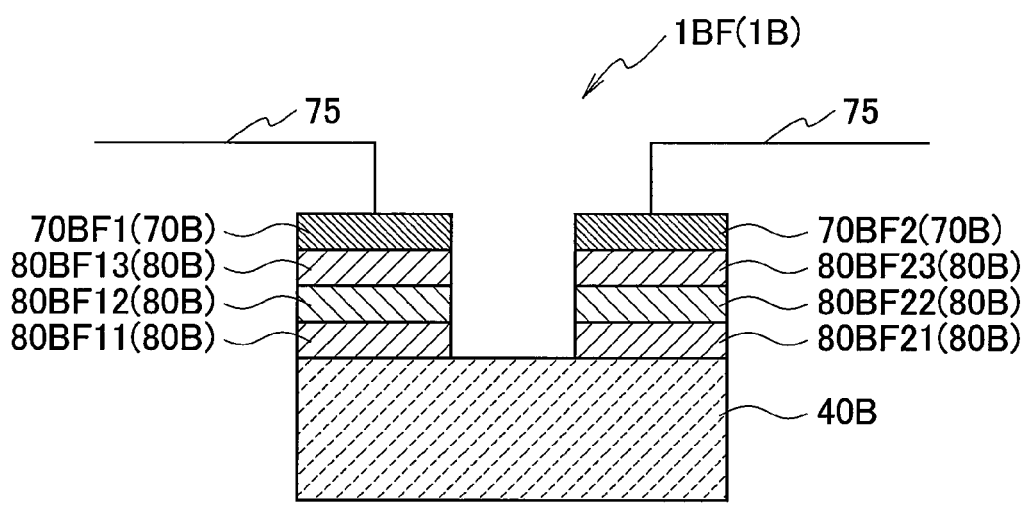
FIG. 24 is a schematic cross-sectional view illustrating a temperature sensor according to a 19th embodiment.

FIG. 24 is a schematic cross-sectional view illustrating a temperature sensor according to a 19th embodiment. A temperature sensor 1BF according to the 19th embodiment (illustrated in FIG. 24) is different from the temperature sensor 1BB according to the 15th embodiment (illustrated in FIG. 20) in that a plurality of thermal stress relaxing layers 80B are provided in the interface between the functional element 40B and each of the electrode 70BF1 and 70BF2 (70B). The temperature sensor 1BF according to the 19th embodiment is also different from the temperature sensor 1BB according to the 15th embodiment in that the electrodes 70B connect to respective leads 75.

The temperature sensor 1BF according to the 19th embodiment is the same as the temperature sensor 1BB according to the 15th embodiment excepting the aforementioned two differences. The same members of the temperature sensor 1BF according to the 19th embodiment (illustrated in FIG. 24) as those of the temperature sensor 1BB according to the 15th embodiment (illustrated in FIG. 20) are given the same reference symbols, and the description of the configurations and operations thereof are omitted or simplified.

The temperature sensor 1BF includes the plurality of thermal stress relaxing layers 80B provided between the functional element 40B and each of the electrodes 70BF1 and 70BF2 (70B), which are each provided on at least a part of the surface of the functional element 40B. Specifically, the electrodes 70BF1 and 70BF2 are provided on the surface (on the upper side in FIG. 24) of the functional element 40B apart from each other. More specifically, the electrode 70BF1 is provided on the surface (on the upper side in FIG. 24) of the functional element 40B with three thermal stress relaxing layers 80BF11, 80BF12, and 80BF13 interposed therebetween. The electrode 70BF2 is provided apart from the electrode 70BF1 on the surface (on the upper side in FIG. 24) of the functional element 40B with three thermal stress relaxing layers 80BF21, 80BF22, and 80BF23 interposed therebetween. In the example illustrated in FIG. 24, the number of thermal stress relaxing layers 80B interposed between the functional element 40B and each electrode 70B is three. In the temperature sensor 1BF, the number of thermal stress relaxing layers 80B interposed between the functional element 40B and each electrode 70B is any value not less than two.

The functional element 40B and electrodes 70BF1 and 70BF2 of the BF1 are the same as the functional element 40B and electrodes 70BB1 and 70BB2 of the temperature sensor 1BB according to the 15th embodiment, respectively. The description of the configurations thereof is therefore omitted.

The six thermal stress relaxing layers 80BF11, 80BF12, 80BF13, 80BF21, 80BF22, and 80BF23 include the same material, thermal expansion coefficient, and thickness as those of the thermal stress relaxing layers 80BB1 and 80BB2 of the temperature sensor 1BB (illustrated in FIG. 20). The material, thermal expansion coefficient, and thickness of the six thermal stress relaxing layers 80B provided for the temperature sensor 1BF are the same as those of the thermal stress relaxing layers 80BA1 and 80BA2 of the temperature sensor 1BA according to the 14th embodiment (illustrated in FIG. 19). For example, it is preferred that the thermal expansion coefficients of the thermal stress relaxing layers 80BF11, 80BF12, 80BF13, 80BF21, 80BF22, and 80BF23 individually satisfy the aforementioned formula (1). The description of the material, thermal expansion coefficient, and thickness of the thermal stress relaxing layers 80BF11, 80BF12, 80BF13, 80BF21, 80BF22, and 80BF23 of the temperature sensor 1BF is omitted.

The thermal expansion coefficient of the plural thermal stress relaxing layers 80B of the temperature sensor 1BF are preferably as follows. Specifically, the thermal expansion coefficient of the thermal stress relaxing layer 80B closer to the functional element 40B has a numerical value closer to that of the functional element 40B while the thermal expansion coefficient of the thermal stress relaxing layer 80B closer to the electrode 70B has a numerical value closer to that of the electrode 70B.

The leads 75 can be publicly-known leads.

(Operation of Temperature Sensor)

The operations of the temperature sensor 1BF are described. The operations of the temperature sensor 1BF are the same as those of the temperature sensor 1BB (illustrated in FIG. 20), excepting the operations due to the configuration in which the plural thermal stress relaxing layers 80B are interposed between the functional element 40B and each electrode 70B and the configuration in which the electrodes 70B connect to the respective leads 75. Hereinafter, the description is given of only the operations due to the configuration in which the plural thermal stress relaxing layers 80B are interposed between the functional element 40B and each electrode 70B and the configuration in which the electrodes 70B connect to the leads 75, and the description of the other operations is omitted.

The temperature sensor 1BF includes the plural thermal stress relaxing layers 80B between the functional element 40B and each electrode 70B. This enables fine control of the value of the thermal expansion coefficient and the thickness of each thermal stress relaxing layer 80B. In the temperature sensor 1BF, for example, it is possible to easily reduce the differences in thermal expansion coefficient between the thermal stress relaxing layers 80B adjacent to each other, between the functional element 40B and the thermal stress relaxing layers 80B adjacent thereto, and between the electrodes 70B and thermal stress relaxing layers 80B adjacent thereto, by controlling the thermal expansion coefficient and thickness of each thermal stress relaxing layer 80B.

In the temperature sensor 1BF, it is therefore possible to finely control thermal stress between the thermal stress relaxing layers 80B adjacent to each other, between the functional element 40B and the thermal stress relaxing layers 80B adjacent thereto, and between the electrodes 70B and the thermal stress relaxing layers 80B adjacent thereto.

In the temperature sensor 1BF, current flowing in the electrode 70BF1 and 70BF2 is outputted to the outside through the leads 75.

(Effect of Temperature Sensor)

The temperature sensor 1BF exerts the same effects as those of the temperature sensor 1BB according to the 15th embodiment.

According to the temperature sensor 1BF, it is possible to finely control thermal stress between the thermal stress relaxing layers 80B adjacent to each other, between the functional element 40B and the thermal stress relaxing layers 80B adjacent thereto, and between the electrodes 70B and the thermal stress relaxing layers 80B adjacent thereto.

20th Embodiment

Figure 25:
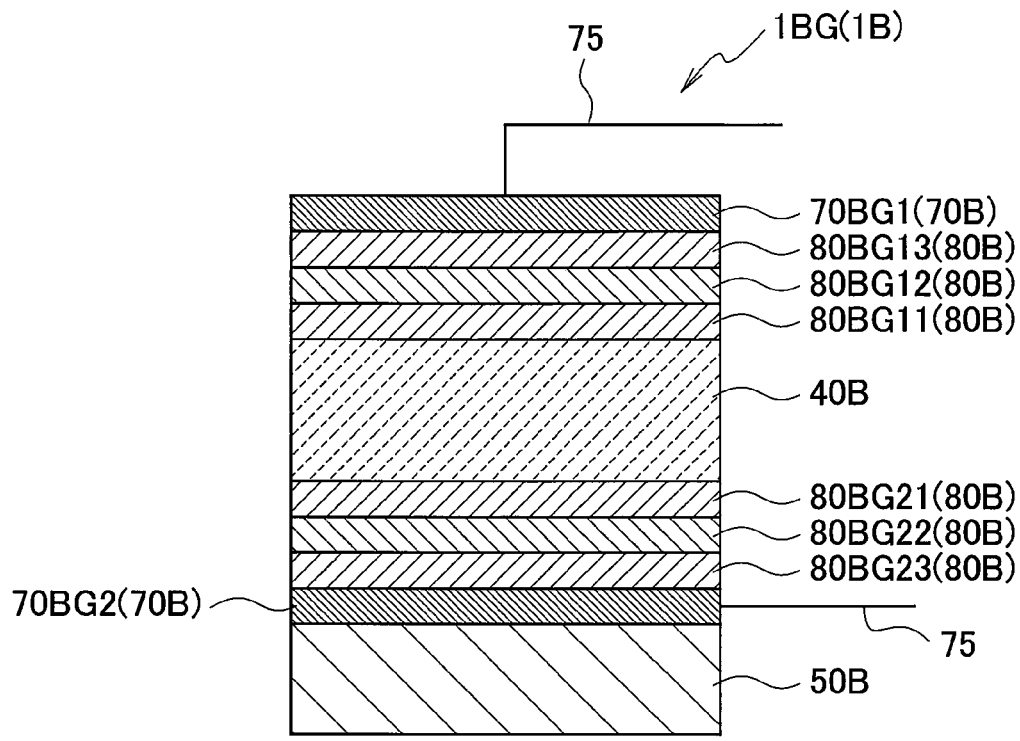
FIG. 25 is a schematic cross-sectional view illustrating a temperature sensor according to a 20th embodiment.

FIG. 25 is a schematic cross-sectional view illustrating a temperature sensor according to a 20th embodiment. A temperature sensor 1BG according to the 20th embodiment (illustrated in FIG. 25) is the same as the temperature sensor 1BE according to the 18th embodiment (illustrated in FIG. 23) excepting that the temperature sensor 1BG further includes the substrate 50B laid on the surface of one of the electrodes 70B. The same members of the temperature sensor 1BG according to the 20th embodiment (illustrated in FIG. 25) as those of the temperature sensor 1BE according to the 18th embodiment (illustrated in FIG. 23) are given the same reference symbols, and the description of the configurations and operations thereof are omitted or simplified.

The functional element 40B and electrodes 70BG1 and 70BG2 of the temperature sensor 1BG are the same as the functional element 40B and electrodes 70BE1 and 70BE2 of the temperature sensor 1BE according to the 18th embodiment, respectively. The description of the configurations thereof is therefore omitted.

Three thermal stress relaxing layers 80BG11, 80BG12, and 80BG13 of the temperature sensor 1BG are the same as the three thermal stress relaxing layers 80BE11, 80BE12, and 80BE13 of the temperature sensor 1BE according to the 18th embodiment, respectively. Three thermal stress relaxing layers 80BG21, 80BG22, and 80BG23 of the temperature sensor 1BG are the same as the three thermal stress relaxing layers 80BE21, 80BE22, and 80BE23 of the temperature sensor 1BE according to the 18th embodiment, respectively. The description of the configurations thereof is therefore omitted.

The temperature sensor 1BG further includes the substrate 50B. The substrate 50B is laid on the surface of the electrode 70BG2. The substrate 50B is the same as the substrate 50B of the temperature sensor 1BC according to the 16th embodiment (illustrated in FIG. 21). The description of the substrate 50 is omitted.

(Manufacturing Method)

The temperature sensor 1BG can be manufactured by sequentially forming, on the surface of the substrate 50B, the electrode 70BG2, the thermal stress relaxing layers 80BG23, 80BG22, and 80BG21, the functional element 40B, the thermal stress relaxing layers 80BG11, 80BG12, and 80BG13, and the electrode 70BG1, for example. The electrodes 70BG1 and 70BG2 are then connected to the leads 75.

(Operation of Temperature Sensor)

The operations of the temperature sensor 1BG are described. The operations of the temperature sensor 1BG are the same as those of the temperature sensor 1BE according to the 18th embodiment (illustrated in FIG. 23), excepting the operation due to the configuration in which the temperature sensor 1BG further includes the substrate 50B. A description is given of only the operation due to the configuration in which the temperature sensor 1BG further includes the substrate 50B, and the description of the other operations is omitted.

In the temperature sensor 1BG, the substrate 50B is laid on the surface of the electrode 70BG2. The temperature sensor 1BG is manufactured easily because of including the substrate 50B. The temperature sensor 1BG is given mechanical strength because of including the substrate 50B. The properties, such as the thermal conduction ad electric conduction, of the temperature sensor 1BG can be controlled by adjusting the material and thickness of the substrate 50B.
(Effect of Temperature Sensor)

The temperature sensor 1BG exerts the same effects as those of the temperature sensor 1BE according to the 18th embodiment.

The temperature sensor 1BG is easily manufactured because of including the substrate 50B. The temperature sensor 1BG has high mechanical strength because of including the substrate 50B. According to the temperature sensor 1BG, it is possible to control the properties, such as the thermal conduction and electric conduction, by adjusting the material and thickness of the substrate 50B.

Modification of 20th Embodiment

The temperature sensor 1BG according to the 20th embodiment (illustrated in FIG. 25) includes the thermal stress relaxing layers 80BG11, 80BG12, and 80BG13 between the surface (on the upper side in FIG. 25) of the functional element 40B and the electrode 70BG1. The temperature sensor 1BG includes the thermal stress relaxing layers 80BG21, 80BG22, and 80BG23 between the surface (on the lower side in FIG. 25) of the functional element 40B and the electrode 70BG2. However, when no large thermal stress is produced between the functional element 40B and the electrodes 70B for a certain reason, such as the temperature distribution of the functional element 40B, the temperature sensor 1BG may be configured to not include any of the thermal stress relaxing layers 80B as a modification. As the modification, the temperature sensor 1BG may be configured to not include the thermal stress relaxing layers 80B between the surface (on the upper or lower side in FIG. 25) of the functional element 40B and the corresponding electrode 70B. According to the modification of the 20th embodiment, it is possible to fabricate a temperature sensor at lower cost than that of the temperature sensor 1BG according to the 20th embodiment.

21st Embodiment

Figure 26:
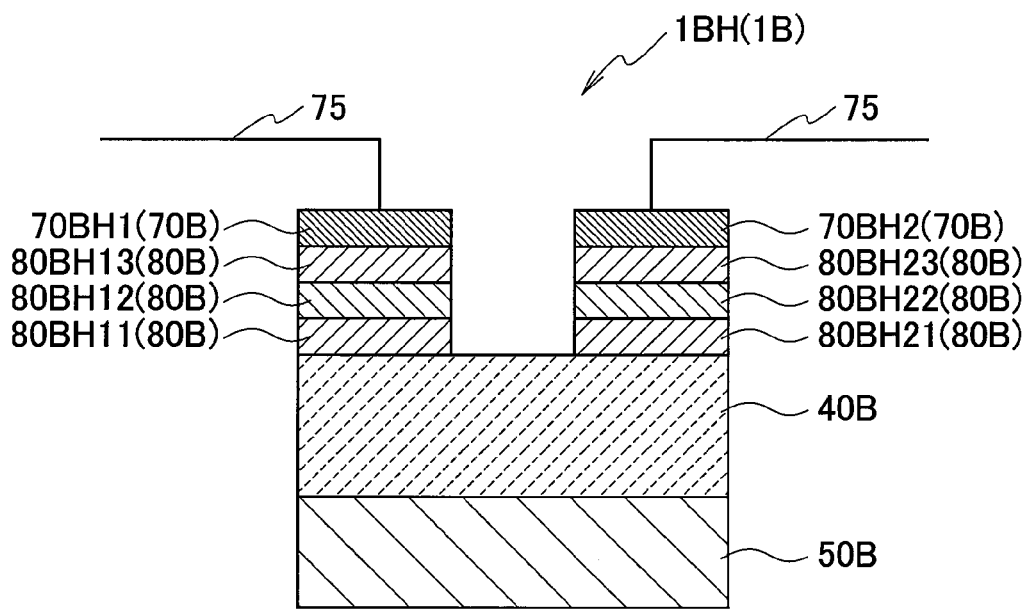
FIG. 26 is a schematic cross-sectional view illustrating a temperature sensor according to a 21st embodiment.
Figure 27:
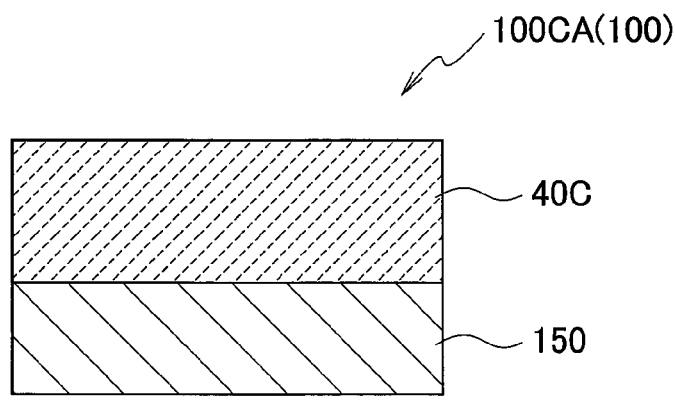
FIG. 27 is a schematic cross-sectional view illustrating a conventional temperature sensor example.

FIG. 26 is a schematic cross-sectional view illustrating a temperature sensor according to a 21st embodiment. A temperature sensor 1BH according to the 21st embodiment (illustrated in FIG. 26) is the same as the temperature sensor 1BF according to the 19th embodiment (illustrated in FIG. 24), excepting that the temperature sensor 1BH further includes the substrate 50B laid on the exposed surface of the functional element 40B on which the electrodes 70B are not formed. The same members of the temperature sensor 1BH according to the 21st embodiment (illustrated in FIG. 26) as those of the temperature sensor 1BF according to the 19th embodiment (illustrated in FIG. 24) are given the same reference symbols, and the description of the configurations and operations thereof are omitted or simplified.

The functional element 40B and electrodes 70BH1 and 70BH2 of the temperature sensor 1BH are the same as the functional element 40B and electrodes 70BF1 and 70BF2 of the temperature sensor 1BF according to the 19th embodiment, respectively. The description of the configurations thereof is therefore omitted.

Three thermal stress relaxing layers 80BH11, 80BH11, and 80BH13 of the temperature sensor 1BH are the same as the three thermal stress relaxing layers 80BF11, 80BF12, and 80BF13 of the temperature sensor 1BF according to the 19th embodiment, respectively. Three thermal stress relaxing layers 80BH21, 80BH22, and 80BH23 of the temperature sensor 1BH are the same as the three thermal stress relaxing layers 80BF21, 80BF22, and 80BF23 of the temperature sensor 1BF according to the 19th embodiment, respectively. The description of the configurations thereof is therefore omitted.

The temperature sensor 1BH further includes the substrate 50B. The substrate 50B is laid on the exposed surface (on the lower side in FIG. 26) of the functional element 40B, on which the electrodes 70B are not formed. The substrate 50B is the same as the substrate 50B of the temperature sensor 1BC according to the 16th embodiment (illustrated in FIG. 21). The description of the substrate 50B is omitted.
(Manufacturing Method)

The temperature sensor 1BH is manufactured in such a manner, for example: first, the functional element 40B is formed on the surface of the substrate 50B, and on the surface of the functional element 40B, the thermal stress relaxing layers 80BH11 and 80BH21 are then formed. Next, on the surface of the thermal stress relaxing layer 80BH11, the thermal stress relaxing layers 80BH12 and 80BH13 and electrode 70BH1 are sequentially formed. On the surface of the thermal stress relaxing layer 80BH21, the thermal stress relaxing layers 80BH22 and 80BH23 and electrode 70BH2 are sequentially formed. The electrodes 70BH1 and 70BH2 are connected to the leads 75.
(Operation of Temperature Sensor)

The operations of the temperature sensor 1BH are described. The operations of the temperature sensor 1BH are the same as those of the temperature sensor 1BF according to the 19th embodiment (illustrated in FIG. 24), excepting the operation due to the configuration in which the temperature sensor 1BH further includes the substrate 50B. A description is given of only the operation due to the configuration in which the temperature sensor 1BH further includes the substrate 50B, and the description of the other operations is omitted.

In the temperature sensor 1BH, the substrate 50B is laid on the surface (on the lower side in FIG. 26) of the functional element 40B. The temperature sensor 1BH is manufactured easily because of including the substrate 50B. The temperature sensor 1BH is given mechanical strength because of including the substrate 50B. It is possible to control the properties, such as the thermal conduction and electric conduction, of the temperature sensor 1BH by adjusting the material and thickness of the substrate 50B.
(Effect of Temperature Sensor)

The temperature sensor 1BH exerts the same effects as those of the temperature sensor 1BF according to the 19th embodiment.

The temperature sensor 1BH is easily manufactured because of including the substrate 50B. The temperature sensor 1BH has high mechanical strength because of including the substrate 50B. According to the temperature sensor 1BH, it is possible to control the properties, such as the thermal conduction and electric conduction, by adjusting the material and thickness of the substrate 50B.

Modification of 21st Embodiment

The temperature sensor 1BH according to the 21st embodiment (illustrated in FIG. 26) includes the thermal stress relaxing layers 80BH11, 80BH12, and 80BH13 between the surface (on the upper side in FIG. 26) of the functional element 40B and the electrode 70BH1. The temperature sensor 1BH includes the thermal stress relaxing layers 80BH21, 80BH22, and 80BH23 between the surface of the functional element 40B on the upper side in FIG. 26 and the electrode 70BH2. However, when large thermal stress cannot be produced between the functional element 40B and the electrodes 70B for a certain reason, such as the temperature distribution of the functional element 40B, the temperature sensor 1BH may be configured to not include any of the thermal stress relaxing layers 80B as a modification. As the modification, the temperature sensor 1BH may be configured to not include the thermal stress relaxing layers 80B between the surface (on the upper side in FIG. 26) of the functional element 40B and the electrodes 70B. According to the modification of the 21st embodiment, it is possible to fabricate a temperature sensor at lower cost than that of the temperature sensor 1BH according to the 21st embodiment.

(Third Temperature Sensor)

Next, a third temperature sensor is described.

Hereinafter, a description is given of temperature sensors according to embodiments with reference to the drawings. The temperature sensors according to 22nd to 24th embodiments are sensors that each function as a temperature sensor and a pressure sensor and detect temperature and pressure. Each of the temperature sensors according to the 22nd and 23rd embodiments is configured so that a substrate thin film section 51 of a substrate 50C and a functional element 40C are in physical contact. This allows the functional element 40C to detect slight pressure applied to the substrate thin-film section 51 through the substrate thin-film section 51. The temperature sensors according to the 22nd and 23rd embodiments function as pressure sensors capable of detecting slight pressure, such as ultrasonic pressure, in particular.

(Temperature Sensor)

22nd Embodiment

Figure 32:
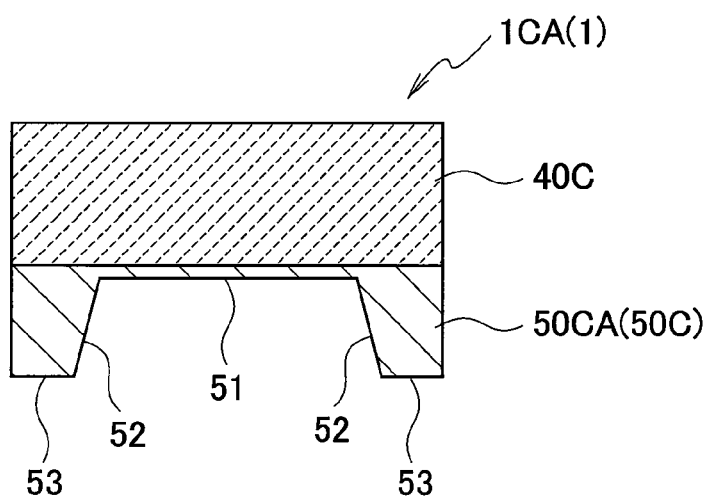
FIG. 32 is a schematic cross-sectional view illustrating a temperature sensor according to a 22nd embodiment.

FIG. 32 is a schematic cross-sectional view illustrating a temperature sensor according to the 22nd embodiment. The temperature sensor 1CA (1C) (illustrated in FIG. 32) includes a substrate 50CA (50C) and a functional element 40C laid on the substrate 50CA. The substrate 50CA includes a substrate thin-film section 51, that is in form of thin-film and has a small thickness in the stacking direction of the substrate 50CA and the functional element 40C. The substrate thin-film section 51 of the substrate 50CA is in physical contact with the functional element 40C.

(Functional Element)

The functional element 40C is an element that changes in physical property with changes in temperature. Specifically, the functional element 40C is an element composed of the functional titanium oxide that changes in physical property with variation in crystalline structure of crystal grains due to changes in temperature. The physical properties that vary with changes in temperature are one or more of electric conductivity and color, for example.

The functional titanium oxide refers to a titanium oxide material including a function of changing in crystalline structure of crystal grains in response to at least heating and maintaining after cooling, the crystal grains of the crystalline structure generated by the heating. Specifically, the functional titanium oxide includes the following function: the functional titanium oxide is heated to form crystal grains having a crystalline structure different from that before heating; and maintains the crystal grains of the crystalline structure after cooling.

The functional titanium oxide may vary in crystalline structure of crystal grains with a change in condition other than heating or may maintain the crystalline structure having varied, even after the change in condition is removed. In addition to changes in temperature, the functional titanium oxide normally varies in crystalline structure of crystal grains with changes in pressure, light, and current applied to the functional titanium oxide. Specifically, the functional titanium oxide further includes the function of: generating crystal grains having a crystalline structure different from that before application of pressure; and maintaining the generated crystal grains of the different crystalline structure after the application of pressure is removed. Furthermore, the functional titanium oxide may include the function of: generating crystal grains having a crystalline structure different from that before supply of current, light and the like; and maintaining the generated crystal grains of the different crystalline structure after the supply of current, light and the like is stopped.

The functional titanium oxide changes in physical property with variation in crystalline structure. The physical properties that change with variation in crystalline structure are color, electric conductivity, and the like. The relationship between variation in crystalline structure and physical properties, such as color and electric conductivity, in the functional titanium oxide is described later.

Figure 28:
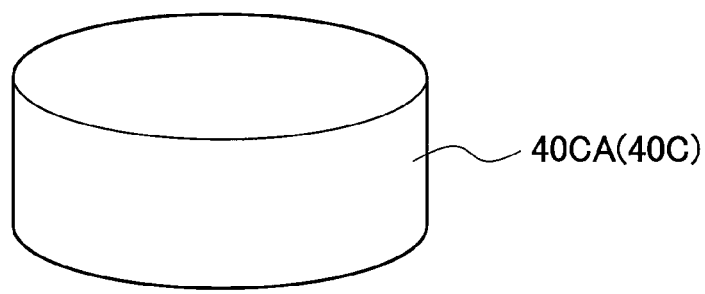
FIG. 28 is a schematic perspective view illustrating a functional element example.
Figure 29:
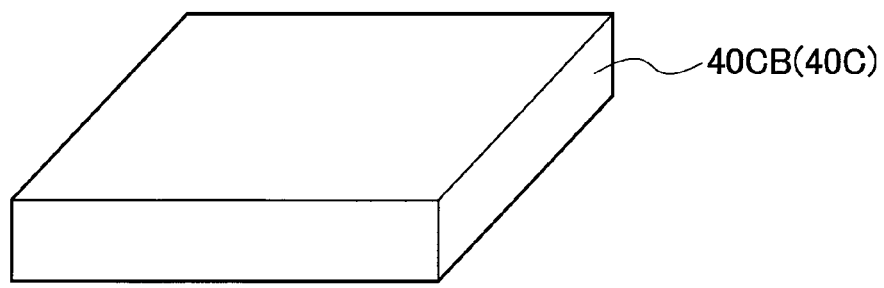
FIG. 29 is a schematic perspective view illustrating another functional element example.
Figure 30:
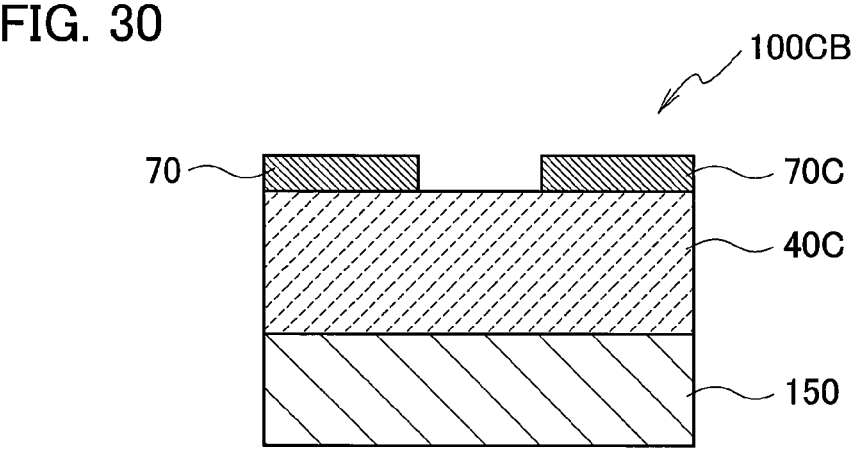
FIG. 30 is a schematic cross-sectional view illustrating another conventional temperature sensor example.
Figure 31:
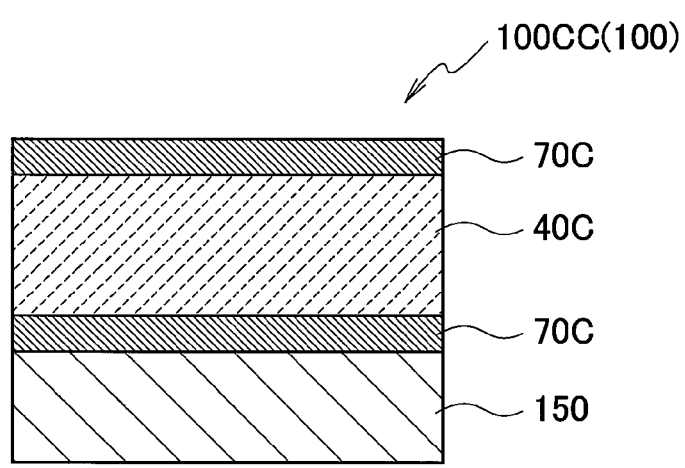
FIG. 31 is a schematic cross-sectional view illustrating still another conventional temperature sensor example.

The functional element 40C is substantially composed of only the functional titanium oxide. The minimum unit functioning as the functional titanium oxide is nanoparticles composed of crystal grains of the functional titanium oxide as described later. However, nanoparticles are difficult to handle. The functional titanium oxide is normally powder composed of polycrystal of nanoparticles of crystal grains. On the other hand, the functional element 40C used in the temperature sensor 1CA requires an area large enough to be laid on the substrate 50C. The powder composed of polycrystal does not form a large enough area. The functional element 40C is normally composed of a compact or a thin film made of powder of polycrystal of the functional titanium oxide. Such a compact is a thin plate-shaped pellet obtained by compressing powder of polycrystal of the functional titanium oxide, for example. The compact may be a molded body formed using a mold. The functional element 40C has any shape. Examples of the shape of the functional element 40C include a cylindrical shape illustrated in FIG. 28 and a rectangular plate shape illustrated in FIG. 29. FIGS. 28 and 29 exaggerate the thickness for convenience of explanation. The thin film made of powder of polycrystal of the functional titanium oxide is a thin film formed by sputtering powder of polycrystal of the functional titanium oxide, for example.

The thickness of the functional element 40C is not limited particularly and is normally 1 nm to 10 μm and preferably 0.1 to 1.0 μm. The thickness of the functional element 40C is preferably within this range so that the functional element 40C sensitively detects slight changes in temperature and pressure.

(Crystalline Structure of Functional Titanium Oxide)

A description is given of the crystalline structure of the functional titanium oxide as the material of the functional element 40C. The functional titanium oxide normally includes crystal grains of one or more of β-phase trititanium pentoxide (β-$Ti_3O_5$) and λ-phase trititanium pentoxide (λ-$Ti_3O_5$) at 450° C. or lower and at normal pressure. The functional titanium oxide includes the following property: at least a portion of crystal grains of one or more of β-phase trititanium pentoxide and λ-phase trititanium pentoxide change into crystal grains of titanium oxide ($TiO_2$) when the functional titanium oxide is heated to 350° C. or higher at normal pressure.

(Operation of Functional Titanium Oxide due to Temperature Change at Normal pressure)

A description is given of the operations of the functional titanium oxide with changes in temperature at normal pressure. When the functional element 40C composed of the functional titanium oxide of the embodiment is used as the temperature sensor, the functional element 40C generally used as follows: the functional element 40C is normally treated at room temperature and normal pressure and measures the maximum temperature when the functional element 40C placed at high temperature. In the following description, it is assumed that the crystal grains of the functional titanium oxide are at normal pressure; have not been heated to 190° C. or higher in the thermal history and are at lower than 190° C.; and are composed of only β-phase trititanium pentoxide.

The functional titanium oxide can take one or more of three forms of β-phase trititanium pentoxide, λ-phase trititanium pentoxide, and titanium dioxide from a low-temperature range to a high-temperature range.

Specifically, the functional titanium oxide normally includes only crystal grains of β-phase trititanium pentoxide at lower than 190° C. The functional titanium oxide composed of β-phase trititanium pentoxide is normally polycrystal of crystal grains of β-phase trititanium pentoxide.

When the functional titanium oxide is heated to a temperature of not lower than 190° C. and lower than 350° C., at least a portion of the large number of crystal grains of β-phase trititanium pentoxide constituting the functional titanium oxide undergoes phase transition into crystal grains of λ-phase trititanium pentoxide. Specifically, when the functional titanium oxide is heated to 190° C. or higher, 5 mol % or more of the crystal grains of β-phase trititanium pentoxide undergo phase transition into crystal grains of λ-phase trititanium pentoxide.

In a temperature range not lower than 190° C. and lower than 350° C., a large number of crystal grains constituting the functional titanium oxide undergo phase transition from β- to λ-phase trititanium pentoxide at varying times. The functional titanium oxide heated to a temperature of not lower than 190° C. and lower than 350° C. normally includes mainly crystal grains of λ-phase trititanium pentoxide and also includes crystal grains of β-phase trititanium pentoxide.

When the functional titanium oxide is heated to a temperature of not lower than 350° C. and not higher than 450° C., at least a portion of the large number of crystal grains of λ-phase trititanium pentoxide constituting the functional titanium oxide change in crystalline composition into crystal grains of titanium dioxide. Specifically, when λ-phase trititanium pentoxide is heated to 350° C. or higher, 5 mol % or more thereof undergoes phase transition into crystal grains of titanium dioxide.

Herein, titanium dioxide is an idea including rutile, anatase, and brookite. In a temperature range not lower than 350° C. and not higher than 450° C., the crystalline composition of the large number of crystal grains constituting the functional titanium oxide changes from λ-phase trititanium pentoxide to titanium dioxide at varying times. The functional titanium oxide heated to a temperature of not lower than 350° C. and not hither than 450 ° C. normally includes mainly crystal grains of titanium dioxide and also includes λ- and β-phase trititanium pentoxide.

When the functional titanium oxide including mainly crystal grains of λ-phase trititanium pentoxide and also including crystal grains of β-phase trititanium pentoxide is heated to a temperature of not lower than 350° C. and not higher than 450° C., similarly, crystal grains of titanium dioxide are generated in the functional titanium oxide. Specifically, crystal grains of β-phase trititanium pentoxide are heated to undergo phase transition into crystal grains of λ-phase trititanium pentoxide and then further change into crystal grains of titanium dioxide.

When heated to a temperature of higher than 450° C. and lower than 550° C., at least a portion of the large number of crystal grains of λ-phase trititanium pentoxide constituting the functional titanium oxide change into crystal grains of titanium dioxide, most crystal grains of which are white.

In a temperature range higher than 450° C. and lower than 550° C., the large number of crystal grains constituting the functional titanium oxide from λ-phase trititanium pentoxide to titanium dioxide undergo phase transition at varying times. The functional titanium oxide heated to a temperature of higher than 450° C. and lower than 550° C. normally includes mainly crystal grains of titanium dioxide and also includes small amounts of crystal grains of λ- and β-phase trititanium pentoxide.

The temperature at which all of the large number of crystal grains of λ-phase trititanium pentoxide constituting the functional titanium oxide change to crystal grains of titanium dioxide is about 550° C. or higher. The functional titanium oxide heated to 550° C. or higher normally includes only crystal grains of titanium dioxide.

As described above, the stable crystalline structure of the functional titanium oxide depends on the temperature range. Once heated, the functional titanium oxide has the property of maintaining the crystalline structure of crystal grains generated by the heating, after cooling. Once the functional titanium oxide is heated to a high-temperature range and crystal grains of titanium dioxide are formed in crystal grains constituting the functional titanium oxide, the composition of the generated titanium dioxide is maintained even if the functional titanium oxide is cooled to room temperature.

β-phase trititanium pentoxide, λ-phase trititanium pentoxide, and titanium dioxide described above are different in physical properties. In terms of color among the physical properties, for example, β-phase trititanium pentoxide, λ-phase trititanium pentoxide, and titanium dioxide are different in color, which are red or brownish red, blue, and white, respectively.

When the functional titanium oxide used in a place changing in temperature is red or brownish red, blue, or white, it is possible to detect the maximum temperature in the thermal history of the functional titanium oxide. Specifically, when the functional titanium oxide is red or brownish red, blue, or white, the functional titanium oxide is found to be β-phase trititanium pentoxide, λ-phase trititanium pentoxide, or titanium dioxide, respectively. When the functional titanium oxide is red or brownish red, the functional titanium oxide is found to have a thermal history with a maximum temperature lower than 190° C. When the functional titanium oxide is blue, the functional titanium oxide is found to have a thermal history with a maximum temperature not lower than 190° C. and lower than 350° C. When the functional titanium oxide is white, the functional titanium oxide is found to have a thermal history with a maximum temperature not lower than 350° C. The functional titanium oxide can be therefore used as the material of temperature sensors by examining variation in color.

Specifically, the functional titanium oxide not heated to 190° C. or higher in the thermal history normally includes only β-phase trititanium pentoxide and is red or brownish red.

When the functional titanium oxide is heated to a temperature of not lower than 190° C. and lower than 350° C. in the thermal history, at least a portion of crystal grains of red or brownish red β-phase trititanium pentoxide of the functional titanium oxide undergo phase transition into crystal grains of blue λ-phase trititanium pentoxide.

When the functional titanium oxide is heated to a temperature of not lower than 350° C. and not higher than 450° C., at least a portion of crystal grains of blue λ-phase trititanium pentoxide of the functional titanium oxide change in crystalline composition into crystal grains of white titanium dioxide.

When the functional titanium oxide is heated to a temperature of higher than 450° C. and lower than 550° C., most of the crystal grains of the functional titanium oxide change into crystal grains of white titanium dioxide.

The functional titanium oxide heated to a temperature of not lower than 550° C. in the thermal history normally includes only crystal grains of white titanium dioxide.

The color of the functional titanium oxide is evaluated visually or evaluated based on an adsorption spectrum thereof. The functional titanium oxide can be therefore used as the material of temperature sensors by examining variation in color.

In terms of electric conductivity among the physical properties that change with variation in crystalline structure of the functional titanium oxide, β-phase trititanium pentoxide, λ-phase trititanium pentoxide, and titanium dioxide are different in electric conductivity. For example, β-phase trititanium pentoxide has an electric conductivity in the same range as that of many semiconductors while the λ-phase trititanium pentoxide has an electric conductivity in the same range as that of many metals. Titanium dioxide has an electric conductivity in the same range as that of many insulators. Such differences in electric conductivity are maintained even after the functional titanium oxide is cooled to room temperature. Changes in electric conductivity of the functional titanium oxide are known by measuring electric resistance between two or more electrodes across the functional titanium oxide, for example.

Measurement of the electric conductivity of the functional titanium oxide shows that the functional titanium oxide was heated to a temperature in a temperature range lower than 190° C., a temperature range not lower than 190° C. and lower than 350° C., or a temperature range not lower than 350° C., respectively. The functional titanium oxide can be therefore used as the material of temperature sensors.

Changes in crystalline structure of the functional titanium oxide between β-phase trititanium pentoxide, λ-phase trititanium pentoxide, and titanium dioxide are not substantially influenced by the atmosphere in which the functional titanium oxide is used. For example, the functional titanium oxide can be used in an atmosphere, such as air, oxygen atmosphere, or nitrogen atmosphere.

As described above, the functional titanium oxide includes the function of: changing in crystalline structure of crystal grains in response to at least heating; and maintaining the crystal grains of the crystalline structure generated by the heating, after cooling. The function of changing in crystalline structure of: crystal grains in response to at least heating; and maintaining the crystal grains of the crystalline structure generated by the heating, after cooling is also referred to as a "function as the functional titanium oxide" hereinafter.

(Average Grain Size of Functional Titanium Oxide Grain)

In the functional titanium oxide, the minimum unit including the function as the functional titanium oxide is nanoparticles of crystal grains. The crystal grains constituting the functional titanium oxide not heated to 190° C. or higher in the thermal history at normal pressure are normally composed of only β-phase trititanium pentoxide as described above.

The average grain size (median size) of crystal grains of β-phase trititanium pentoxide, that is, crystal grains of the functional titanium oxide is normally 1 to 100 nm, preferably 5 to 50 nm, and more preferably 10 to 20 nm. When the average particle size of crystal grains of β-phase trititanium pentoxide is in the aforementioned range, the functional titanium oxide includes the aforementioned function as the aforementioned functional titanium oxide. The functional titanium oxide is suitable for temperature sensors capable of showing the maximum temperature in the thermal history after cooling.

In the functional titanium oxide, the minimum unit including the function as the functional titanium oxide is crystal grains having an average grain size in the aforementioned range. However, crystal grains as nanoparticles are difficult to handle, and the functional titanium oxide is preferably polycrystal of nanoparticles of crystal grains. This polycrystal of nanoparticles of the crystal grains can take any form and is granular, for example. The average particle size (median size) of the granular polycrystal of crystal grains is typically 50 nm to 500 μm, preferably 1 to 50 μm, and more preferably 3 to 8 μm, for example. If the average particle size (median size) of the granular polycrystal of crystal grains is in the aforementioned range, the functional titanium oxide is easy to handle.

The functional element 40C of the temperature sensor 1CA according to the 22th embodiment is a thin-plate pellet obtained by compressing polycrystal of crystal grains of the functional titanium oxide, such as the above granular polycrystal of crystal grains.

The size of the crystal grains of β-phase trititanium pentoxide constituting the functional titanium oxide is thought to substantially not change even if phase transition from β- to λ-phase trititanium pentoxide is caused by heating. The size of crystal grains of β-phase trititanium pentoxide constituting the functional titanium oxide can be therefore considered equal to the size of crystal grains of β- and λ-phase trititanium pentoxide constituting the functional titanium oxide.

On the other hand, conventional trititanium pentoxide, such as trititanium pentoxide composed of polycrystal of crystal grains which are not nanoparticles and monocrystalline trititanium pentoxide, does not have the property of maintaining the crystalline structure of crystal grains generated by heating, after cooling, unlike the functional titanium oxide. This is considered to be because, crystal grains of normal trititanium pentoxide reversibly and easily change in crystalline structure between β-phase trititanium pentoxide, λ-phase trititanium pentoxide, and titanium dioxide. Conventional trititanium pentoxide is not a suitable material for temperature sensors that show the maximum temperature in the thermal history after cooling.

On the other hand, trititanium pentoxide constituting the temperature sensor 1CA according to the 22nd embodiment is the functional titanium oxide and is suitable as the material of temperature sensors.

(Operation of Functional Titanium Oxide due to Pressure Change at Room Temperature)

In addition to the aforementioned function of changing in crystalline structure due to heating, the functional titanium oxide further includes the function of: generating crystal grains having a crystalline structure different from that before application of pressure; and maintaining the generated crystal grains of the different crystalline structure after the application of pressure is removed.

A description is given of the operations of the functional titanium oxide upon changes in pressure at room temperature. In the following description, it is assumed that crystal grains constituting the functional titanium oxide are at room temperature and are not pressurized to 60 MPa or greater in the pressure history thereof. The functional titanium oxide can take two forms among λ-phase trititanium pentoxide, β-phase trititanium pentoxide, and titanium dioxide from a low-pressure region to a middle-to-high pressure region.

Specifically, the functional titanium oxide normally includes only crystal grains of λ-phase trititanium pentoxide at lower than 60 MPa. The functional titanium oxide composed of λ-phase trititanium pentoxide is normally polycrystal of crystal grains of λ-phase trititanium pentoxide. When the functional titanium oxide is pressurized to pressurized to 60 MPa or higher, at least a portion of the large number of crystal grains of λ-phase trititanium pentoxide constituting the functional titanium oxide undergoes phase transition into crystal grains of β-phase trititanium pentoxide. Specifically, when the functional titanium oxide is pressurized to 60 MPa or higher, not less than 5 mol % of the crystal grains of λ-phase trititanium pentoxide of the functional titanium oxide undergo phase transition into crystal grains of β-phase trititanium pentoxide.

As described above, the stable crystalline structure of the functional titanium oxide depends on the pressure range. Once pressurized, the functional titanium oxide includes the property of maintaining the crystalline structure of crystal grains generated by the pressurization after the applied pressure is removed. Once crystal grains of λ-phase trititanium pentoxide of the functional titanium oxide are pressurized to 60 MPa or higher to change into crystal grains of β-phase trititanium pentoxide, the composition of generated β-phase trititanium pentoxide is maintained after the applied pressure is reduced to lower than 60 MPa.

Specifically, the functional titanium oxide not pressurized to 60 MPa or higher in the pressure history is normally composed of only λ-phase trititanium pentoxide and is blue.

When the functional titanium oxide is pressurized to 60 MPa or higher in the pressure history, at least a portion of the crystal grains of blue λ-phase trititanium pentoxide of the functional titanium oxide undergoes phase transition into crystal grains of red or brownish red β-phase trititanium pentoxide.

The color of the functional titanium oxide is evaluated visually or evaluated with the adsorption spectrum thereof. The functional titanium oxide can be also used as the material of pressure sensors by examining variation in color.

(Operation of Functional Element)

The functional element 40C is a thin-plate pellet of powder of the functional titanium oxide and is composed of the functional titanium oxide. The operations of the functional element 40C are the same as those of the functional titanium oxide. Specifically, the functional element 40C provides the same operations as "Operation of Functional Titanium Oxide due to Temperature Change at Normal pressure" and "Operation of Functional Titanium Oxide due to Pressure Change at Room Temperature" of the functional titanium oxide and operates as a temperature sensor and a pressure sensor. The operations of the functional element 40 are the same as those of the functional titanium oxide, and the description thereof is omitted.

(Substrate)

The substrate 50CA (50C) serves as the base to form the functional element 40C in the process of manufacturing the temperature sensor 1CA. The substrate 50CA includes an operation of giving the temperature sensor 1CA mechanical strength and controlling the properties including the thermal conduction and electric conduction. In addition, the substrate 50CA includes a substrate thin-film section 51 having a thin film form, through which the functional element 40C easily detects slight changes in temperature and pressure sensitively.

As illustrated in FIG. 32, the substrate 50CA includes: the substrate thin-film section 51 having a thin film form; a substrate peripheral section 53 which does not have a thin film form; and a substrate wall section 52 connecting the substrate thin-film section 51 and the substrate peripheral section 53.

The substrate 50CA includes: the substrate thin-film section 51 which has a disk-shaped or rectangular thin-film form; the substrate wall section 52 which diagonally stands up from the outer edge of the substrate thin-film section 51; and the substrate peripheral section 53 which is formed so as to extend horizontally in the outside from the outer circumference of the outer edge of the substrate wall section 52 and has a non-thin-film form.

The substrate thin-film section 51 is a thin film-like section having a smaller thickness in the stacking direction of the substrate 50CA and the functional element 40C, in the substrate 50CA. In FIG. 32, the stacking direction of the substrate 50CA and functional element 40C corresponds to the vertical direction. The thickness of the substrate thin-film section 51 in the stacking direction of the substrate 50CA and the functional element 40C is normally 1 to 100 μm, preferably 5 to 50 μm, more preferably 7 to 15 μm, and still more preferably 8 to 12 μm. The thickness of the substrate 50C is preferably within this range so that the functional element 40C detects a slight change in temperature and pressure easily and sensitively.

The substrate wall section 52 and substrate peripheral section 53 are sections to reinforce the substrate 50CA including the substrate thin-film section 51 and keep the form of the substrate thin-film section 51. The substrate 50CA is able to support the functional element 40C with high strength by including the substrate wall section 52 and substrate peripheral section 53 of high mechanical strength in addition to the substrate thin-film section 51.

The thickness of the substrate peripheral section 53 in the stacking direction of the substrate 50CA and functional element 40C, which is not limited particularly, is 0.1 to 5.0 mm and preferably 0.7 to 1.0 mm, for example. The thickness of the substrate peripheral section 53 is preferably within this range so that substrate 50CA has high mechanical strength and is easily used in processing apparatuses.

In the substrate 50CA, the substrate thin-film section 51 is an essential component while the substrate wall section 52 and substrate peripheral section 53 are optional components. As a not-illustrated modification of the substrate 50CA, the substrate 50C can be composed of only the substrate thin-film section 51.

The substrate 50CA is made of one or more materials selected from a group consisting of semiconductors, silicon on insulator (SOI), oxides, metals, and polyimide resins, for example. The semiconductors are Si, SiC, GaN, and the like. Examples of the SOI include publicly-known SOI. The oxides are inorganic oxides, such as sapphire, Nb—$SrTiO_3$, and La—$SrTiO_3$. Nb—$SrTiO_3$ and La—$SrTiO_3$ are strontium titanium oxide doped with Nb or La and are conducting oxides. The metals are Al, Cu, Ti, Ni, Sn, Au, Ag, SUS, and the like. The fibers are glass fibers or carbon fibers. The substrate 50CA is preferably made of the aforementioned materials. This facilitates formation of the functional element 40C and the like and facilitates fabrication of a number of identical elements on the same substrate.

SOI includes two or more components, including an Si substrate and an embedding insulator layer. When the substrate 50CA is made of SOI, the SOI structure is not necessarily composed of only the substrate thin-film section 51 and only needs to be configured as the whole substrate 50CA including sections other than the substrate thin-film section 51.

(Formation of Substrate Thin-film Section)

The substrate 50CA including the substrate thin-film section 51 can be fabricated by a publicly-known method. Specifically, the substrate 50CA is fabricated by a method of: using as the raw material, a flat substrate on which the substrate thin-film section 51 is not formed; and thinning a part of the flat substrate to form the substrate thin-film section 51. The thinning method can be a publicly-known method. Specific examples of the thinning method are wet etching using anisotropy of Si and dry etching such as reactive ion etching. In the case of using wet etching, the etching stop layer can be oxide film, such as $SiO_2$ included in the SOI wafer and nitride film such as $Si_3N_4$, for example. The thinning is normally performed for a part of the surface of the flat substrate. The functional element is then laid on the substrate.

(Operation of Temperature Sensor)

Among the operations of the temperature sensor 1CA, the operations of the functional element 40C are as described in "Operation of Functional Element" above. The functional element 40C of the temperature sensor 1CA then operates as a temperature sensor and a pressure sensor. The temperature sensor 1CA including the functional element 40C therefore operates as a temperature sensor and a pressure sensor. Among the operations of the temperature sensor 1CA, the operations of the functional element 40C, and the description thereof is omitted.

In addition to the operations of the functional element 40C, the temperature sensor 1CA includes the operations due to the substrate 50CA. Hereinafter, the operations due to the substrate 50CA are described.

In the temperature sensor 1CA, the substrate 50CA and functional element 40C are made of different materials and have different interatomic spacings. When the substrate 50CA is laid on the functional element 40C so as to be in contact with the same, therefore, shear stress occurs in the interface between the substrate 50CA and functional element 40C. Specifically, shear stress is normally applied to the functional element 40C due to the substrate 50CA so as to increase the interatomic spacing in the interface of the functional element 40C. In a temperature sensor including a conventional flat substrate having a thickness of about 0.7 to 1.0 mm, therefore, separation of the substrate from the functional element 40C, cracks in the functional element 40C, and the like are more likely to occur due to the shear stress.

In the temperature sensor 1CA, the substrate thin-film section 51 having a thin-film form occupies most of the area of the interface between the substrate 50CA and functional element 40C. This reduces the shear stress applied by the substrate thin-film section 51 to the interface between the substrate thin-film section 51 and functional element 40C when the temperature sensor 1CA is not heated or cooled. In addition, the substrate thin-film section 51 has a thin-film form. This reduces the shear stress due to the difference in thermal expansion coefficient between the substrate thin-film section 51 and functional element 40C by heating or cooling. In the temperature sensor 1CA, it is therefore possible to prevent or reduce separation of the substrate 50CA from the functional element 40C and cracks in the functional element 40C when the temperature sensor 1CA is heated or cooled and is not heated or cooled.

When the substrate has a thickness of about 0.7 to 1.0 mm like the conventional technique, strong shear stress acts on the entire functional element 40C due to the substrate, and the functional element 40C is less likely to bend. In the temperature sensor 1CA, the substrate thin-film section 51, which is in physical contact with the functional element 40C, has a thin-film form. This reduces shear stress applied to the functional element 40C by the substrate 50CA, and the functional element 40C is more likely to bend. The functional element 40C is likely to bend with slight pressure such as ultrasonic pressures, and the temperature sensor 1CA can be thereby used as a pressure sensor capable of detecting slight pressure such as ultrasonic pressures.

(Effect of Temperature Sensor)

According to the temperature sensor 1CA, it is possible to measure temperature and pressure by using changes in physical property with variation in the crystalline structure of crystal grains of the functional titanium oxide constituting the functional element 40C. According to the temperature sensor 1CA, it is possible to provide a temperature and pressure sensor.

The functional titanium oxide constituting the functional element 40C is inexpensive. According to the temperature sensor 1CA, it is possible to provide an inexpensive temperature and pressure sensor.

In addition, in the temperature sensor 1CA, the substrate thin-film section 51, which is in physical contact with the functional element 40C, has a thin-film form. This reduces the shear stress produced by heating or cooling due to the difference in thermal expansion coefficient between the substrate thin-film section 51 and functional element 40C. According to the temperature sensor 1CA, it is therefore possible to prevent or reduce separation of the substrate 50CA from the functional element 40C and cracks in the functional element 40C in the process of heating or cooling.

In the temperature sensor 1CA, since the substrate thin-film section 51, which is in physical contact with the functional element 40C, has a thin-film form, shear stress applied to the functional element 40C by the substrate 50CA is small when the temperature sensor 1CA is not cooled or heated. According to the temperature sensor 1CA, it is therefore possible to prevent or reduce separation of the substrate 50CA from the functional element 40C and cracks in the functional element 40C when the temperature sensor 1CA is not heated or cooled.

The temperature sensor 1CA is able to measure temperature in a high-temperature range not lower than 350° C. According to the temperature sensor 1CA, it is possible to measure temperature in electric furnaces, switchboards, and the like, which require temperature measurement in a high-temperature range not lower than 350° C.

In the temperature sensor 1CA, since the substrate thin-film section 51, which is in physical contact with the functional element 40C, has a thin-film form, the functional element 40 is more likely to bend. The temperature sensor 1CA is thereby used as a pressure sensor capable of detecting slight pressure such as ultrasonic pressure.

According to the temperature sensor 1CA, it is possible to provide an inexpensive temperature and pressure sensor which includes the inexpensive functional element that changes in physical properties with changes in temperature and in which separation of the substrate from the functional element and cracks in the functional element are prevented or reduced.

23rd Embodiment

Figure 33:
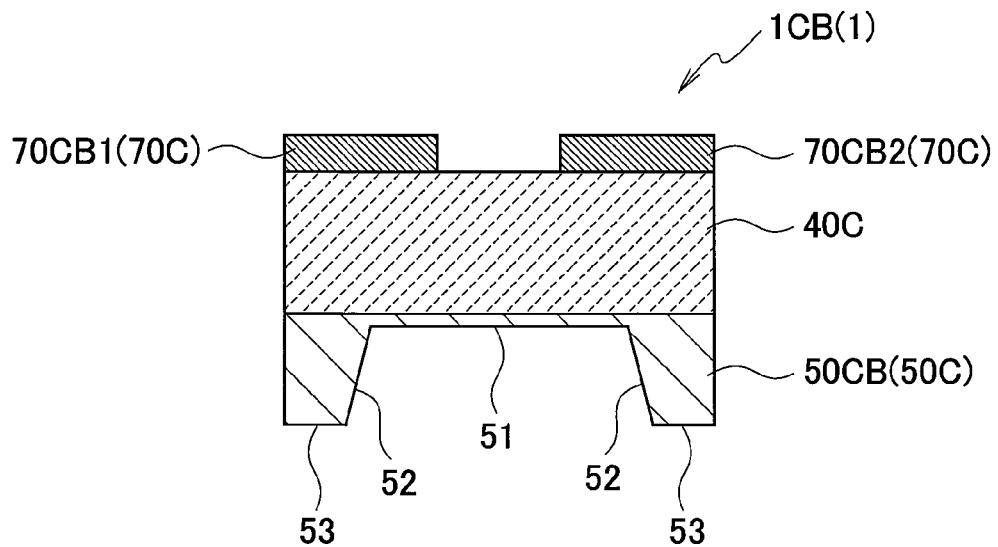
FIG. 33 is a schematic cross-sectional view illustrating a temperature sensor according to a 23rd embodiment.

FIG. 33 is a schematic cross-sectional view illustrating a temperature sensor according to a 23rd embodiment. The temperature sensor 1CB (1C) (illustrated in FIG. 33) includes a substrate 50CB (50C) and a functional element 40C laid on the substrate 50CB. The substrate 50CB includes a substrate thin-film section 51 of a thin-film form having a small thickness in the stacking direction of the substrate 50CB and functional element 40C. The substrate thin-film section 51 of the substrate 50CB is in physical contact with the functional element 40C. The temperature sensor 1CB further includes electrodes 70C, which include two electrodes 70CB1 and 70CB2 on the surface of the functional element 40C.

The temperature sensor 1CB according to the 23rd embodiment (illustrated in FIG. 33) is the same as the temperature sensor 1CA according to the 22nd embodiment (illustrated in FIG. 32), excepting that the electrodes 70CB1 and 70CB2 are provided on the surface of the functional element 40C. The same members of the temperature sensor 1CB according to the 23rd embodiment (illustrated in FIG. 33) as those of the temperature sensor 1CA according to the 22nd embodiment (illustrated in FIG. 32) are given the same reference symbols, and the description of the configurations and operations thereof are omitted or simplified.

The substrate 50CB (50C) of the temperature sensor 1CB according to the 23rd embodiment is the same as the substrate 50CA (50C) of the temperature sensor 1CA according to the 22nd embodiment, and the description thereof is omitted.

(Electrode)

The temperature sensor 1CB further includes the electrodes 70CB1 and 70CB2 (70C) on the surface of the functional element 40C. The electrodes 70C electrically connect to the surface of the functional element 40C. As described above, the functional element 40C changes in physical property, such as electric conductivity, with variation in crystalline structure of crystal grains due to changes in temperature or pressure. The electrodes 70CB1 and 70CB2 detect changes in electric conductivity near the surface of the functional element 40C with variation in crystalline structure of crystal grains due to changes in temperature and pressure.

In the temperature sensor 1CB, the above-described arrangement of the electrodes 70CB1 and 70CB2 allows for detection of changes in electric conductivity near the surface of the functional element 40C.

The electrodes 70CB1 and 70CB2 are arranged in at least a part of the surface of the functional element 40C. Specifically, the electrodes 70CB1 and 70CB2 are provided apart from each other on the surface (on the upper side in FIG. 33) of the functional element 40C. The number of the electrodes 70C can be two or more, including the electrodes 70CB1 and 70CB2. As a modification of the temperature sensor 1CB, not-illustrated two electrodes 70C may be further provided on the surface (on the upper side in FIG. 33) of the functional element 40C, in addition to the electrodes 70CB1 and 70CB2, for example. By providing the four electrodes 70C on the surface (on the upper side in FIG. 33) of the functional element 40C as described above, changes in electric conductivity of the functional element 40C can be precisely detected with four-terminal sensing.

The electrodes 70CB1 and 70CB2 are made of one or more materials selected from a group consisting of metals, conducting oxides, carbon materials, and conducting polymers, for example. The metals are Al, Ag, Au, Cu, Pt, and the like. The conducting oxides are ITO (indium tin oxide) and the like. The carbon materials are graphite (black lead) and the like. The conducting polymers are polythiophene polymers, polyaniline polymers, polyacetylene polymers, and the like. The electrodes 70C are preferably made of the aforementioned materials for easy electric conduction between the functional element 40C and electrodes 70C.

The thickness of the electrodes 70CB1 and 70CB2, which is not limited particularly, is normally 0.01 to 1000 μm and preferably 0.1 to 100 μm. The electrodes 70CB1 and 70CB2 preferably have thicknesses within the aforementioned range so that the electrodes can ensure electric conduction.

(Operation of Temperature Sensor)

The temperature sensor 1CB according to the 23rd embodiment (illustrated in FIG. 33) exerts the same operations as those of the temperature sensor 1CA according to the 22nd embodiment (illustrated in FIG. 32).

In the temperature sensor 1CB, the substrate thin-film section 51 having a thin-film form occupies most of the area of the interface of the substrate 50CB which is laid on and is in physical contact with the functional element 40C. This reduces the shear stress applied by the substrate thin-film section 51 to the interface between the substrate thin-film section 51 and functional element 40C when the temperature sensor 1CB is not heated or cooled. In addition, the substrate thin-film section 51 has a thin-film form. This reduces the shear stress generated by heating or cooling due to the difference in thermal expansion coefficient between the substrate thin-film section 51 and functional element 40. In the temperature sensor 1CB, it is therefore possible to prevent or reduce separation of the substrate 50CB from the functional element 40C and cracks in the functional element 40C or electrodes 70C when the temperature sensor 1CB is heated or cooled and is not heated or cooled.

The temperature sensor 1CB, which includes the electrodes 70CB1 and 70CB2, detects a change in electric conductivity near the surface of the functional element 40C to detect the crystalline structure of crystal grains of the functional element 40C, thus detecting the maximum temperature in the thermal history and the maximum pressure in the pressure history.

The electrodes 70CB1 and 70CB2 (70C) are located on the opposite side of the functional element 40C from the substrate thin-film section 51. These electrodes 70CB1 and 70CB2 (70C) do not interfere with transmission of slight pressure applied to the substrate thin-film section 51, such as ultrasonic pressures, to the functional element 40C which is in physical contact with the substrate thin-film section 51. According to the temperature sensor 1CB, it is possible to detect slight pressure applied to the substrate thin-film section 51, such as ultrasonic pressure, based on change in electric conductivity of the functional element 40C and thereby detect the maximum temperature in the thermal history and the maximum pressure in the pressure history.

In the temperature sensor 1CB, the substrate thin-film section 51 receives ultrasonic waves, and the pressure of the ultrasonic waves is transmitted to the functional element 40C through the substrate thin-film section 51. The functional element 40C changes in electric conductivity due to the ultrasonic pressure, and the change in electric conductivity of the functional element 40C is known by measuring electric resistance between two or more electrodes across the functional element 40C, for example. The temperature sensor 1CB can be used as a pressure sensor in such a manner that ultrasonic waves are received through the substrate thin-film section 51 and electric resistance between the two or more electrodes 70C across the functional element 40C is measured.

(Effect of Temperature Sensor)

The temperature sensor 1CB exerts the same effects as those of the temperature sensor 1CA according to the 22nd embodiment (illustrated in FIG. 32).

In addition, the substrate thin-film section 51, which is in physical contact with the functional element 40C, has a thin-film form. The temperature sensor 1CB is less subject to occur shear stress generated by heating or cooling due to the difference in thermal expansion coefficient between the substrate thin-film section 51 and functional element 40C. According to the temperature sensor 1CB, it is therefore possible to prevent or reduce separation of the substrate 50CB from the functional element 40 and electrodes 70C and cracks in the functional element 40C and electrodes 70C in the process of heating or cooling.

Furthermore, in the temperature sensor 1CB, since the substrate thin-film section 51, which is in physical contact with the functional element 40C, has a thin-film form, shear stress applied to the functional element 40C by the substrate thin-film section 51 is small when the temperature sensor 1CA is not cooled or heated. According to the temperature sensor 1CB, it is therefore possible to prevent or reduce separation of the substrate 50CB from the functional element 40C or electrodes 70C and cracks in the functional element 40C and electrodes 70C in the process of heating or cooling.

Stull furthermore, the temperature sensor 1CB includes the electrodes 70CB1 and 70CB2 (70C). According to the temperature sensor 1CB, it is possible to detect a change in electric conductivity near the surface of the functional element 40C to detect the crystalline structure of crystal grains of the functional element 40C, thus detecting the maximum temperature in the thermal history and the maximum pressure in the pressure history.

According to the temperature sensor 1CB, it is possible to provide an inexpensive temperature and pressure sensor which includes the inexpensive functional element that changes in physical properties with changes in temperature and in which separation of the substrate from the functional element or electrodes and cracks in the functional element and electrodes are prevented or reduced.

24th Embodiment

Figure 34:
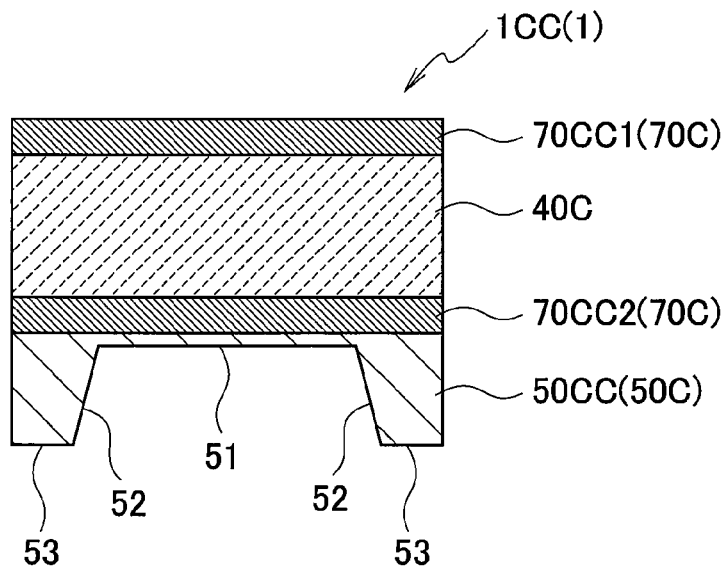
FIG. 34 is a schematic cross-sectional view illustrating a temperature sensor according to a 24th embodiment.

FIG. 34 is a schematic cross-sectional view illustrating a temperature sensor according to a 24th embodiment. A temperature sensor 1CC(1C) (illustrated in FIG. 34) includes a substrate 50CC (50C) and the functional element 40C laid on the substrate 50CC with an electrode 70CC2 interposed therebetween. The substrate 50CC includes a substrate thin-film section 51 of a thin-film form having a small thickness in the stacking direction of the substrate 50CC and functional element 40C. The temperature sensor 1CC further includes electrodes 70C. The electrodes 70C include: an electrode 70CC1 provided on the surface of the functional element 40C; and the electrode 70CC2 provided in the interface between the substrate 50CC and functional element 40C. The substrate thin-film section 51 of the substrate 50CC is not in physical contact with the functional element 40C since the electrode 70C is interposed.

The temperature sensor 1CC according to the 24th embodiment (illustrated in FIG. 34) is different from the temperature sensor 1CB (illustrated in FIG. 33) in that the electrode 70CC1 is provided on the surface of the functional element 40C while the electrode 70CC2 is provided in the interface between the substrate 50CC and functional element 40C. The temperature sensor 1CC according to the 24th embodiment is the same as the temperature sensor 1CB according to the 23th embodiment in the other points. The same members of the temperature sensor 1CC according to the 24th embodiment (illustrated in FIG. 34) as those of the temperature sensor 1CB according to the 23rd embodiment (illustrated in FIG. 33) are given the same reference symbols, and the description of the configurations and operations thereof are omitted or simplified.

The substrate 50CC (50C) of the temperature sensor 1CC according to the 24th embodiment is the same as the substrate 50CA (50C) of the temperature sensor 1CA according to the 22nd embodiment, and the description thereof is omitted.

(Electrode)

The temperature sensor 1CC includes: the electrode 70CC1 provided on the surface of the functional element 40C; and the electrode 70CC2 provided in the interface between the substrate 50CC and functional element 40C. The electrode 70CC2 is provided in the interface between the substrate 50CC and functional element 40C. The electrodes 70CC1 and 70CC2 are arranged so as to sandwich the functional element 40C.

In the temperature sensor 1CC, the above-described arrangement of the electrodes 70CC1 and 70CC2 allows for detection of a change in electric conductivity in the vertical direction to the surface of the functional element 40C.

The electrodes 70CC1 and 70CC2 are arranged so as to cover the entire front and back surfaces of the functional element 40C. In other words, the lengths of the electrode 70CC1 and 70CC2 in width and depth in FIG. 34 are the same as those of the functional element 40C in width and depth.

As a modification of the temperature sensor 1CC, one or more of the electrodes 70CC1 and 70CC2 can be formed so as to partially cover the surface of the functional element 40C. In other words, the lengths of the electrodes 70CC1 and 70CC2 in width and depth in FIG. 34 may be shorter than those of the functional element 40C in width and depth. According to this modification, it is possible to measure the electric conductivity of the functional element 40C or the like in a section sandwiched by the electrodes 70CC1 and 70CC2 in the functional element 40C.

The electrodes 70C electrically connect to the front and rear surfaces of the functional element 40C. As described above, the functional element 40C changes in physical properties, such as electric conductivity, with variation in crystalline structure of crystal grains due to changes in temperature or pressure. The electrodes 70CC1 and 70CC2 detect a change in electric conductivity in the vertical direction to the surfaces of the functional element 40C produced with variation in crystalline structure of crystal grains due to changes in temperature and pressure.

The number of the electrodes 70C can be two or more, including the electrodes 70CC1 and 70CC2. Specifically, one or more of the electrodes 70C may be provided on the surface of the functional element 40C while one or more of the electrodes 70C is provided in the interface between the substrate 50CC and functional element 40C. More specifically, as a modification of the temperature sensor 1CC, one or more not-illustrated electrodes 70C may be further provided apart from the electrodes 70CC1 and 70CC2, in addition to the electrodes 70CC1 and 70CC2, for example. The many electrodes 70C provided in such a manner allow for precise detection of changes in electric conductivity of the functional element 40C.

The electrodes 70CC1 and 70CC2 are made of the same material as that of the electrodes 70CB1 and 70CB2 of the temperature sensor 1CB according to the 23rd embodiment (illustrated in FIG. 33). The thickness of the electrodes 70CC1 and 70CC2 is the same as that of the electrodes 70CB1 and 70CB2 of the temperature sensor 1CB according to the 23rd embodiment (illustrated in FIG. 33).

(Operation of Temperature Sensor)

The temperature sensor 1CC according to the 24th embodiment (illustrated in FIG. 34) exerts the same operations as those of the temperature sensor 1CA according to the 22nd embodiment (illustrated in FIG. 32).

In the temperature sensor 1CC, the substrate thin-film section 51 is not in contact with the functional element 40C unlike the temperature sensor 1CB according to the 23th embodiment (illustrated in FIG. 33). In the temperature sensor 1CC, therefore, shear stress is not applied to the functional element 40C by the substrate thin-film section 51 in the interface between the substrate thin-film section 51 and functional element 40C when the temperature sensor 1CB is not cooled or heated. In addition, the shear stress due to the difference in thermal expansion coefficient between the substrate thin-film section 51 and functional element 40C is not produced in the process of heating or cooling. In the temperature sensor 1CC, it is therefore possible to prevent or reduce occurrence of separation of the substrate 50CA from the functional element 40C or electrodes 70C and cracks in the functional element 40C and electrodes 70C.

The temperature sensor 1CC, which includes the electrodes 70CC1 and 70CC2, detects a change in electric conductivity in the vertical direction to the surface of the functional element 40C to detect the crystalline structure of crystal grains of the functional element 40C, thus detecting the maximum temperature in the thermal history and the maximum pressure in the pressure history.

In the temperature sensor 1CC, the electrode 70CC2 is provided in the interface between the substrate thin-film section 51 and functional element 40C, and the substrate thin-film section 51 and functional element 40C are not in physical contact. In the temperature sensor 1CC, slight pressure applied to the substrate thin-film section 51, such as ultrasonic pressure, can be therefore attenuated by the electrode 70CC2 before reaching the functional element 40C. This can degrade the ability of the temperature sensor 1CC to detect slight pressure, such as ultrasonic pressure, compared with the temperature sensors 1CA and 1CB according to the 22nd and 23rd embodiments. However, the temperature sensor 1CC has an ability to detect pressure greater than ultrasonic pressure.

(Effect of Temperature Sensor)

The temperature sensor 1CC exerts the same effects as those of the temperature sensor 1CA according to the 22nd embodiment (illustrated in FIG. 32).

In addition, in the temperature sensor 1CC, since the substrate thin-film section 51 is not in physical contact with the functional element 40C, shear stress due to the difference in thermal expansion coefficient between the substrate thin-film section 51 and functional element 40C is not produced in the process of heating or cooling. According to the temperature sensor 1CC, it is therefore possible to prevent or reduce separation of the substrate 50CC from the functional element 40C or electrodes 70C and cracks in the functional element 40C and electrodes 70C in the process of heating or cooling.

In the temperature sensor 1CC, since the substrate thin-film section 51 is not in physical contact with the functional element 40C, shear stress is not applied to the interface between the substrate thin-film section 51 and functional element 40C by the substrate thin-film section 51 when the temperature sensor 1CA is not cooled or heated. According to the temperature sensor 1CC, it is therefore possible to prevent or reduce separation of the substrate 50CC from the functional element 40C or electrodes 70C and cracks in the functional element 40C and electrodes 70C when the temperature sensor 1CC is not heated or cooled.

The temperature sensor 1CC includes the electrodes 70CC1 and 70CC2 (70C). According to the temperature sensor 1CC, it is possible to detect a change in electric conductivity in the vertical direction to the surface of the functional element 40C to detect the crystalline structure of crystal grains of the functional element 40C, thus detecting the maximum temperature in the thermal history and the maximum pressure in the pressure history.

According to the temperature sensor 1CC, it is possible to provide an inexpensive temperature and pressure sensor which includes the inexpensive functional element that changes in physical properties with changes in temperature and in which separation of the substrate from the functional element and electrodes and cracks in the functional element and electrodes are prevented or reduced.

EXAMPLES

Hereinafter, the embodiments are further described through examples but are not limited to the examples.

Example 1

(Preparation of Functional Titanium Oxide)

Figure 14:
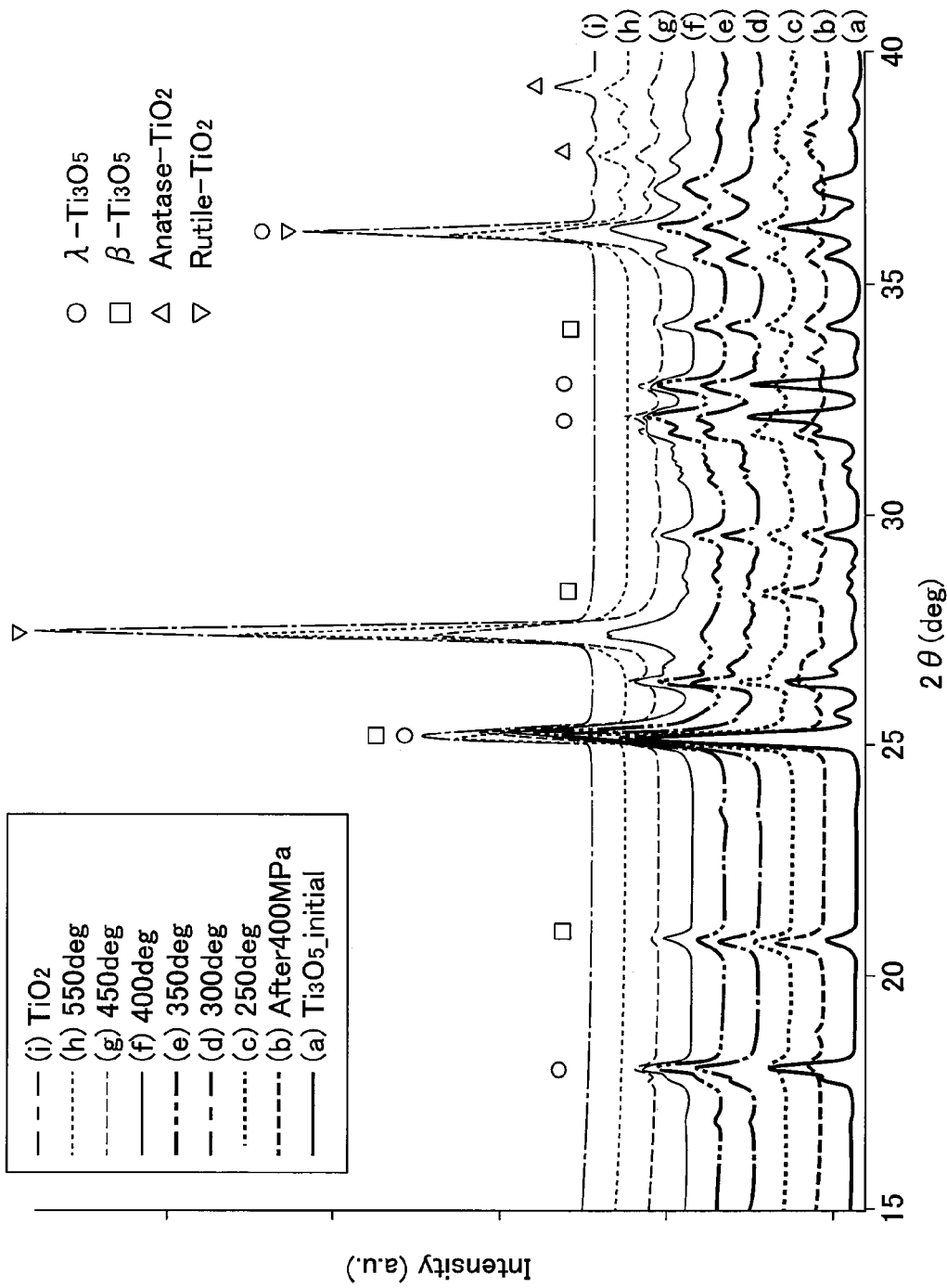
FIG. 14 is a diagram illustrating X-ray diffraction analysis results.
Figure 15:
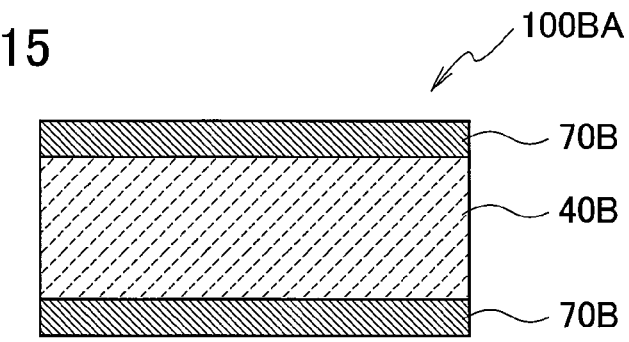
FIG. 15 is a schematic cross-sectional view illustrating a conventional temperature sensor example.

First, $TiO_2$ including rutile and anatase was prepared as the raw material. The result of X-ray diffraction for the prepared $TiO_2$ is illustrated in (i) of FIG. 14. Next, the $TiO_2$ was baked at 1140° C. for two hours in hydrogen gas atmosphere to form $Ti_3O_5$ powder. The result of X-ray diffraction for the obtained $Ti_3O_5$ powder is illustrated in (a) of FIG. 14. The result of X-ray diffraction in (a) of FIG. 14 has revealed that each powder sample of the obtained $Ti_3O_5$ powder included a mixture of λ-phase $Ti_3O_5$ and β-phase $Ti_3O_5$. As shown in the later-described heating test result, the obtained $Ti_3O_5$ powder was heated to change into $TiO_2$, which was then maintained as it was after cooling. The $Ti_3O_5$ was therefore the functional titanium oxide.

(Preparation of Functional Titanium Oxide Molded Body)

Next, using a hydraulic press and a die, the obtained $Ti_3O_5$ was exposed to a pressure of 20 to 400 MPa, preparing columnar molded bodies illustrated in FIG. 1. The prepared molded bodies were pellets of the $Ti_3O_5$ powder. The result of X-ray diffraction for the molded bodies is illustrated in (b) of FIG. 14. The (b) of FIG. 14 has revealed that the molded bodies were composed of a mixture of $\lambda$-phase $Ti_3O_5$ and $\beta$-phase $Ti_3O_5$ in a similar manner to the $Ti_3O_5$ powder illustrated in (a) of FIG. 14.

(Heating Test of Functional Titanium Oxide Molded Body)

The obtained molded bodies were subjected to heating tests at different heating temperatures in air. Specifically, plural molded bodies made of $Ti_3O_5$ were prepared as samples, which were subjected to heating tests to be heated to 250, 300, 350, 400, 450, and 550° C. The samples after the heating tests were subjected to X-ray diffraction. The results of X-ray diffraction for the samples heated to 250, 300, 350, 400, 450, and 550° C. are illustrated in (c), (d), (e), (f), (g), and (h) of FIG. 14, respectively. These results of X-ray diffraction have revealed that the $\beta$-phase $Ti_3O_5$ decreased with increasing of the heating temperature while the $\lambda$-phase $Ti_3O_5$ increased. It has been also revealed that when the heating temperature exceeded 350° C., the diffraction peaks of $TiO_2$ appeared. When the heating temperature reached 550° C., only diffraction peaks of $TiO_2$ were observed similarly to (i) of FIG. 14.

In such a manner, the obtained molded bodies and the $Ti_3O_5$ powder constituting the molded bodies included crystal grains of one or more of $\beta$-phase $Ti_3O_5$ and $\lambda$-phase $Ti_3O_5$ before heating. The obtained molded bodies and the $Ti_3O_5$ powder constituting the molded bodies had the property that at least a portion of crystal grains of one or more of $\beta$-$Ti_3O_5$ and $\lambda$-$Ti_3O_5$ changed into crystal grains of $TiO_2$ when heated to 350° C. or higher. Furthermore, it was revealed that the crystalline structure having changed by heating was maintained after cooling. Accordingly, the materials of the molded bodies and the $Ti_3O_5$ powder constituting the molded bodies were found to be the functional titanium oxide. The molded bodies were found to be the functional element 40AA made of the functional titanium oxide and be the temperature sensor body 10AA constituting the temperature sensor 1AA. The molded bodies were found to be also the functional elements 40B and 40C made of the functional titanium oxide.

(Preparation of Temperature Sensor)

Central part of the surface of a plate-shaped Si substrate was etched by reactive ion etching. In the central part of the surface of the plate-shaped Si substrate, the substrate thin-film section 51 with a thickness of 10 μm was formed. Next, the aforementioned functional element 40C (40AA, 40B) was laid on the plate-shaped Si substrate with a thickness of 1.0 mm so as to be in physical contact with the same. The plate-shaped Si substrate and functional element 40 were thereby integrated. This resulted in production of temperature sensor 1CA illustrated in FIG. 32. Since the substrate thin-film section 51 was as thin as 10 μm, the temperature sensor 1CA was found to function as a pressure sensor capable of detecting slight pressure such as ultrasonic pressures.

The entire contents of Japanese Patent Application Publications No. 2016-170756 (filed on: Sep. 1, 2016), No. 2016-187923 (filed on: Sep. 27, 2016), and No. 2016-208521 (filed on: Oct. 25, 2016) are incorporated by reference herein.

The embodiments are described through the examples. However, it should be obvious to those skilled in the art that the embodiments are not limited to these descriptions and various modifications and improvements can be made for the embodiments.

INDUSTRIAL APPLICABILITY

According to the functional element included in the first temperature sensor and the first temperature sensor, it is possible to measure temperature by using changes in physical property due to variation in the crystalline structure of crystal grains of the functional titanium oxide constituting the functional element. The physical properties that change with variation in crystalline structure of the crystal grains of the functional titanium oxide include one or more of electric conductivity and color, for example.

According to the functional element included in the first temperature sensor and the first temperature sensor, it is possible to measure temperature in a high-temperature range not lower than 350° C. According to the functional element and temperature sensor of the invention, it is therefore possible to measure temperature in electric furnaces, switchboards, and the like, which require temperature measurement in a high-temperature range not lower than 350° C.

The functional element included in the first temperature sensor and first temperature sensor can be used in electric furnaces, switchboards, tubes, and the like, which require temperature measurement in a high-temperature range not lower than 350° C., for example.

According to the second temperature sensor, it is possible to provide an inexpensive temperature sensor which includes the inexpensive functional element that changes in physical properties with changes in temperature and in which separation of the functional element from the electrodes and cracks in the functional element and electrodes are prevented or reduced.

The second temperature sensor can be used in electric furnaces, switchboards, tubes, and the like, which require temperature measurement in a high-temperature range not lower than 350° C., for example.

According to the third temperature sensor, it is possible to provide an inexpensive temperature and pressure sensor which includes the inexpensive functional element that changes in physical properties with changes in temperature and in which separation of the substrate from the functional element or electrodes and cracks in the functional element and electrodes are prevented or reduced.

The third temperature sensor can be used in electric furnaces, switchboards, tubes, and the like, which require temperature measurement in a high-temperature range not lower than 350° C., for example. The third temperature sensor can be also used as a pressure sensor capable of detecting slight pressure, such as ultrasonic pressures.

REFERENCE SIGNS LIST 1A, 1AA, 1AB, 1AC, 1AD, 1AE, 1AF, 1AG, 1AH, 1AI, 1AJ, 1AK, 1AL, 1AM, 1B, 1BA, 1BB, 1BC, 1BD, 1BE, 1BF, 1BG, 1BH, 100BA, 100BB, 1C, 1CA, 1CB, 1CC, 100CA, 100CB, 100CC TEMPERATURE SENSOR 10A, 10AA, 10AB, 10AC, 10AD, 10AE, 10AF, 10AG, 10AH, 10AI, 10AJ, 10AK, 10AL, 10AM TEMPERATURE SENSOR BODY 30A, 30AC, 30AD, 30AE, 30AF, 30AG, 30AH, 30AI, 30AJ BASE MATERIAL 40A, 40AA, 40AB, 40AC, 40AD, 40AE, 40AF, 40AG, 40AH, 40AI, 40AJ, 40B, 40C FUNCTIONAL ELEMENT

45 FUNCTIONAL-TITANIUM-OXIDE-PARTICLE CONNECTED BODY
50A, 50B, 50C, 150 SUBSTRATE
51 SUBSTRATE THIN-FILM SECTION
52 SUBSTRATE WALL SECTION
53 SUBSTRATE PERIPHERAL SECTION
60 CONTAINER
70A, 70Aa, 70Ab, 70Ac, 70Ad, 70Ae, 70Af, 70B, 70C ELECTRODE
75 LEAD
80B THERMAL STRESS RELAXING LAYER

The invention claimed is:

1. A temperature sensor, comprising a temperature sensor body:
which includes the functional element comprising functional titanium oxide including crystal grains of one or more of β-phase trititanium pentoxide (β-$Ti_3O_5$) and λ-phase trititanium pentoxide (λ-$Ti_3O_5$); and
changes in physical property with changes in temperature.

2. The temperature sensor according to claim 1, wherein the functional titanium oxide includes the property that at least a portion of crystal grains of one or more of β-phase trititanium pentoxide (β-$Ti_3O_5$) and λ-phase trititanium pentoxide (λ-$Ti_3O_5$) changes into crystal grains of titanium oxide ($TiO_2$) when the functional titanium oxide is heated to 350° C. or higher.

3. The temperature sensor according to claim 1, wherein the temperature sensor body is composed of the functional element, and
the functional element is a compact made of the functional titanium oxide.

4. The temperature sensor according to claim 1, wherein the temperature sensor body is composed of the functional element,
the functional element is a thin film made of the functional titanium oxide, and
the thin film is formed on a substrate.

5. The temperature sensor according to claim 1, wherein the temperature sensor body includes a base material and the functional element contained in the base material,
the base material is made of resin,
the functional element is particles made of the functional titanium oxide, and
the particles made of the functional titanium oxide are contained in the base material to be dispersed or interconnected in groups.

6. The temperature sensor according to claim 1, wherein the temperature sensor body includes a base material and the functional element contained in the base material,
the base material is a film,
the functional element includes particles made of the functional titanium oxide, and
the particles made of the functional titanium oxide are contained in the base material to be dispersed or interconnected in groups.

7. The temperature sensor according to claim 1, wherein the temperature sensor body includes a base material and the functional element contained in the base material,
the base material is a sheet composed of woven or non-woven fabric,
the functional element is particles made of the functional titanium oxide, and
the particles made of the functional titanium oxide are contained in the base material to be dispersed or interconnected in groups.

8. The temperature sensor according to claim 1, wherein the temperature sensor body includes a base material and the functional element contained in the base material,
the base material is liquid or gel,
the functional element is particles made of the functional titanium oxide, and
the particles made of the functional titanium oxide are contained in the base material to be dispersed or interconnected in groups.

9. The temperature sensor according to claim 1, comprising:
the functional element;
an electrode provided on at least a part of the surface of the functional element; and
a thermal stress relaxing layer which is interposed between the functional element and the electrode and relaxes thermal stress produced between the functional element and the electrode.

10. The temperature sensor according to claim 9, further comprising a substrate, wherein
the substrate is laid on the surface of the electrode or the surface of the functional element on which the electrode is not formed and which is exposed.

11. The temperature sensor according to claim 9, wherein $CTE_A$, $CTE_B$, and $CTE_C$ satisfy the following formula (1):
$CTE_B \leq CTE_C \leq CTE_A$ ... (1)
where the $CTE_A$ is the thermal expansion coefficient (1/K) of the functional element, the $CTE_B$ is the thermal expansion coefficient (1/K) of the electrode, and the $CTE_C$ is the thermal expansion coefficient (1/K) of the thermal stress relaxing layer.

12. The temperature sensor according to claim 9, wherein the thermal stress relaxing layer is made of one or more materials selected from a group consisting of metals, conducting oxides, carbon materials, and conducting polymers.

13. The temperature sensor according to claim 9, wherein the thermal stress relaxing layer includes a plurality of thermal stress relaxing layers in the interface between the functional element and the electrode.

14. A temperature sensor, comprising:
a substrate; and
a functional element that is laid on the substrate and is composed of functional titanium oxide which includes crystal grains of one or more of β-phase trititanium pentoxide (β-$Ti_3O_5$) and λ-phase trititanium pentoxide (λ-$Ti_3O_5$) and which includes the property that at least a portion of crystal grains of one or more of β-phase trititanium pentoxide (β-$Ti_3O_5$) and λ-phase trititanium pentoxide (λ-$Ti_3O_5$) changes into crystal grains of titanium oxide ($TiO_2$) when the functional titanium oxide is heated to 350° C. or higher; wherein
the substrate includes a substrate thin-film section having a thin-film form with a small thickness in the stacking direction of the substrate and the functional element.

15. The temperature sensor according to claim 14, further comprising at least an electrode, wherein
the at least an electrode includes two or more electrodes on the surface of functional element.

16. The temperature sensor according to claim 15, wherein the at least an electrode is made of one or more materials selected from a group consisting of metals, conducting oxides, carbons, and conducting polymers.

17. The temperature sensor according to claim 14, further comprising at least an electrode, wherein
the at least an electrode includes one or more electrodes on the surface of the functional element and includes one or more electrodes in the interface between the substrate and functional element.

18. The temperature sensor according to claim 14, wherein the substrate is made of one or more materials selected from a group consisting of semiconductors, SOI, oxides, metals, and polyimide resins.

* * * * *